United States Patent
Hirst et al.

(10) Patent No.: US 11,891,558 B2
(45) Date of Patent: Feb. 6, 2024

(54) SOLID FOAM COMPRISING MESOGENIC LIGAND-FUNCTIONALIZED NANOPARTICLES AND METHODS OF MAKING AND USING THE SAME

(71) Applicant: The Regents Of The University Of California, Oakland, CA (US)

(72) Inventors: Linda Hirst, Merced, CA (US); Tayebeh Riahinasab, Merced, CA (US); Benjamin J. Stokes, Merced, CA (US)

(73) Assignee: The Regents of the University of California, Oakland, CA (US)

( * ) Notice: Subject to any disclaimer, the term of this patent is extended or adjusted under 35 U.S.C. 154(b) by 252 days.

(21) Appl. No.: 16/756,793

(22) PCT Filed: Oct. 17, 2018

(86) PCT No.: PCT/US2018/056363
§ 371 (c)(1),
(2) Date: Apr. 16, 2020

(87) PCT Pub. No.: WO2019/079507
PCT Pub. Date: Apr. 25, 2019

(65) Prior Publication Data
US 2020/0239781 A1  Jul. 30, 2020

Related U.S. Application Data

(60) Provisional application No. 62/574,028, filed on Oct. 18, 2017.

(51) Int. Cl.
*C09K 19/52* (2006.01)
*C09K 19/12* (2006.01)
(Continued)

(52) U.S. Cl.
CPC .............. *C09K 19/52* (2013.01); *C09K 19/12* (2013.01); *C09K 19/2028* (2013.01);
(Continued)

(58) Field of Classification Search
CPC .................... B29K 2105/0079; C09K 19/2007
See application file for complete search history.

(56) References Cited

U.S. PATENT DOCUMENTS 9,201,010 B2   12/2015   Naciri et al.

FOREIGN PATENT DOCUMENTS

| WO | WO 2016/106377 | 6/2016 | |
|----|----------------|--------|-|
| WO | WO-2016106377 A1 * | 6/2016 | ......... B29C 35/0805 |
| WO | WO 2018/078078 | 5/2018 | |

OTHER PUBLICATIONS

Lewandowski et al. (Langmuir, 2013, vol. 29, pp. 3404-3410) (Year: 2013).*

(Continued)

*Primary Examiner* — Chanceity N Robinson
(74) *Attorney, Agent, or Firm* — Rudy J. Ng; Michael Blessent; Bozicevic, Field & Francis LLP

(57) ABSTRACT

Solid foam structures having multiple compartments comprising mesogenic ligand-functionalized nanoparticles are provided. Compositions that include these structures, as well as methods of making the structures are also provided. The structures, compositions and methods find use in a variety of applications, such as, photonics, luminescent coatings and multi-compartment encapsulation technologies.

39 Claims, 12 Drawing Sheets

(51) Int. Cl.
*C09K 19/20* (2006.01)
*B82Y 20/00* (2011.01)
*B82Y 30/00* (2011.01)
*B82Y 40/00* (2011.01)
*C08K 3/08* (2006.01)
*C08K 3/30* (2006.01)
*C08K 9/04* (2006.01)

(52) U.S. Cl.
CPC ............... *B82Y 20/00* (2013.01); *B82Y 30/00* (2013.01); *B82Y 40/00* (2013.01); *C08K 3/08* (2013.01); *C08K 3/30* (2013.01); *C08K 9/04* (2013.01); *C08K 2003/3036* (2013.01); *C08K 2201/011* (2013.01); *C09K 2019/123* (2013.01); *C09K 2019/2042* (2013.01); *C09K 2019/521* (2013.01)

(56) References Cited

OTHER PUBLICATIONS

Chen ("Discrete Charge Transfer in Nanoparticle Solid Films", Journal of Materials Chemistry, 2007, vol. 17, pp. 4115-4121) (Year: 2007).*

Chen et al., (2007) "Discrete Charge Transfer in Nanoparticle Solid Films", Journal of Materials Chemistry vol. 17 4115-4121.

\* cited by examiner

SOLID FOAM COMPRISING MESOGENIC LIGAND-FUNCTIONALIZED NANOPARTICLES AND METHODS OF MAKING AND USING THE SAME

CROSS-REFERENCE

This application claims the benefit of U.S. Provisional Patent Application No. 62/574,028, filed Oct. 18, 2017, which application is incorporated herein by reference in its entirety.

STATEMENT REGARDING FEDERALLY SPONSORED RESEARCH

This invention was made with government support under Grant Number 1507551 awarded by the National Science Foundation, Chemical, Bioengineering, Environmental, and Transport Systems (CBET). The government has certain rights in the invention.

INTRODUCTION

The unique electronic, magnetic, and optical properties of nanoparticles (NPs) distinguish them from bulk materials. By combining these properties with the huge diversity of available compositions and morphologies, many new NP applications have been developed in optoelectronics, photovoltaics, nanomedicines, and cosmetics, to name but a few. One of the most exciting frontiers in nanoscience is the use of nanoscale building blocks to generate new meta-materials, wherein novel properties emerge as nanoparticle-based materials are assembled from the ground up. Recent developments include materials for electromagnetic cloaking, optical band gap structures, and localized plasmon resonance.

One approach to controlled nanoparticle assembly involves ligand mediation on a flat substrate to form well-ordered particle arrays. This approach can yield 2D superlattices containing different particle types. Such structures require monodisperse NPs and careful growth and deposition techniques can lead to extremely well ordered structures over micron-length-scales. An alternative route to much larger scale, but poorly ordered structures is through the use of soft materials (e.g. biopolymers, biomolecules, or block copolymers) as templates. These materials exhibit ordered phase structures that can be used to segregate particles by chemical or physical characteristics. Since many applications do not require a well-ordered nanoparticle lattice structure, soft-phase templating is an attractive low cost approach for the production of macro-scale materials.

Micron-sized nanoparticle shells can spontaneously form in liquid crystalline liquid (e.g. liquid crystals). Liquid crystals (LCs) are optically anisotropic fluids in which the constituent molecules exhibit local ordered orientation. Optical anisotropy makes LC materials particularly useful for display and photonics applications, and they can be manipulated to produce macroscopic domains with a defined optical axis. When nanoparticles are dispersed into a nematic liquid crystal phase, an elastic deformation is locally imposed. Depending on the surface anchoring strength of the enclosed particle, the surrounding liquid crystal director will therefore be forced to align relative to the particle surface (usually radially in the case of a radial ligand), in opposition to the overall preferred alignment of the liquid crystal far away from the particle. Spatial frustration effects near the surface result in the formation of characteristic topological defects close to the particle. The net elastic energy cost for a particle to be located in the anisotropic nematic phase when compared to location in the isotropic phase provides a mechanism for nanoparticle spatial organization. Nanoscale particles tend to be expelled from nucleating nematic domains at the isotropic-to-nematic (I-N) phase transition, thus the dynamics of the moving phase interface can determine particle spatial organization. Further development of this technique as the basis for a robust method to form and control micron-scale structures, such as solid foam structures, is of interest.

SUMMARY

Solid foams having multiple compartments, wherein the solid foam includes mesogenic ligand-functionalized nanoparticles are provided. Compositions that include these foams, as well as methods of making the foams are also provided. The foams, compositions and methods find use in a variety of applications, such as, photonics, luminescent coatings and multi-compartment encapsulation technologies.

Embodiments of the present disclosure include a composite comprising, a multi-compartment solid foam, wherein the solid foam comprises mesogenic ligand-functionalized nanoparticles.

In some embodiments, the solid foam is a closed-cell foam. In some embodiments, the solid foam is an open-cell foam.

In some embodiments, the solid foam has a dimension (e.g., length) of 1 µm to 50 µm.

In some embodiments, the nanoparticles have an average diameter of 1 nm to 100 nm.

In some embodiments, the nanoparticles are composed of a material selected from a semiconductor material, a metal, a metal oxide, a metalloid, a metal coated material, an oxide, a magnetic material, a nanosome, a dielectric material and a polymer, or combinations thereof.

In some embodiments, the nanoparticles are composed of cadmium selenide (CdSe), zinc sulfide (ZnS), or combinations thereof.

In some embodiments, the nanoparticles are composed of gold nanoparticles.

In some embodiments, the mesogenic ligand-functionalized nanoparticles further comprise non-mesogenic ligands. In some embodiments, the ratio of mesogenic ligands to non-mesogenic ligands on the nanoparticle surface is 9:1. In other embodiments, the ratio of mesogenic ligands to non-mesogenic ligands on the nanoparticle surface is 6:4.

In some embodiments, the mesogenic ligand has a structure of formula (I):

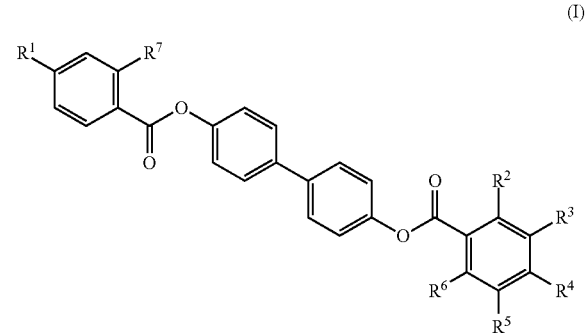

wherein

R[1] and R[7] are each independently selected from, $C_1$-$C_8$ alkoxy, and $C_1$-$C_8$ alkoxy substituted with an amine or thiol group; and R[2], R[3], R[4], R[5] and R[6] are each independently selected from H, halogen, hydroxyl, azido, alkyl, substituted alkyl, alkenyl, substituted alkenyl, alkynyl, substituted alkynyl, $C_1$-$C_{12}$ alkoxy, substituted alkoxy, amino, substituted amino, cycloalkyl, substituted cycloalkyl, heterocycloalkyl, substituted heterocycloalkyl, aryl, substituted aryl, heteroaryl and substituted heteroaryl and combinations thereof.

In some embodiments, the mesogenic ligand is one of the following ligands:

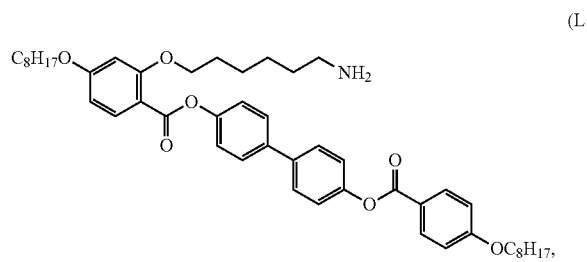
(L1)

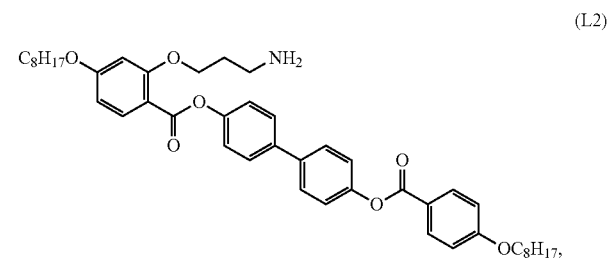
(L2)

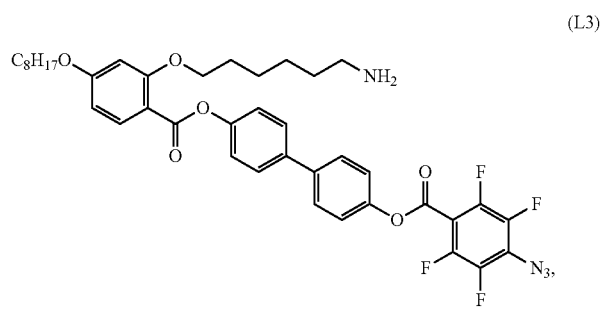
(L3)

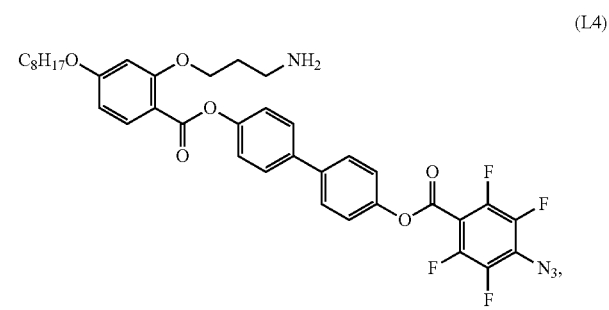
(L4)

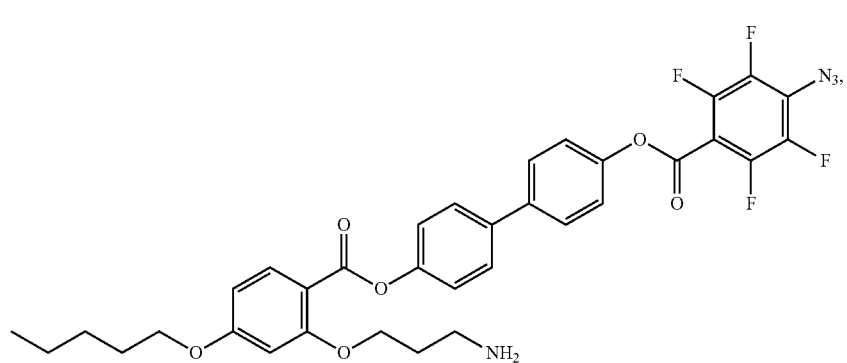
(L5)

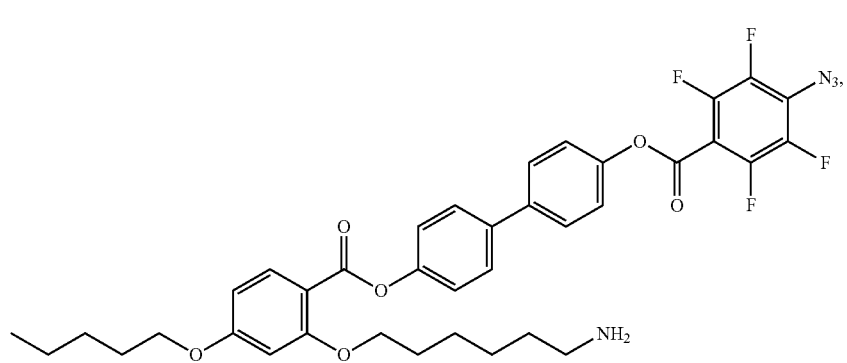
(L6)

-continued
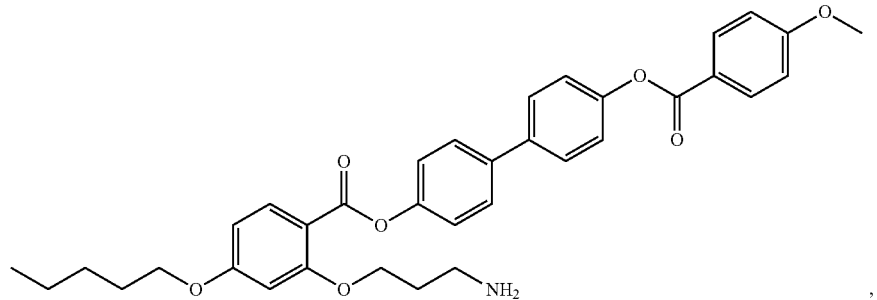
(L7)
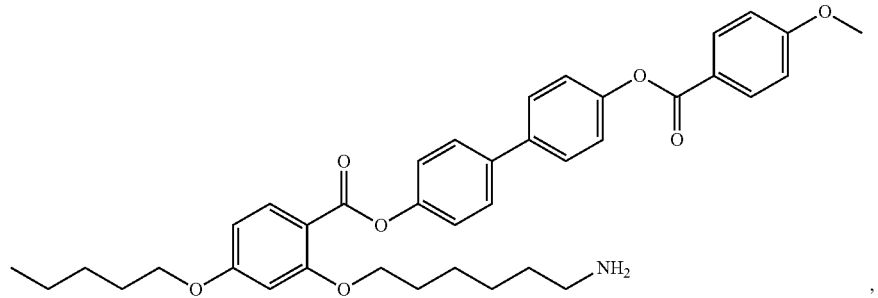
(L8)
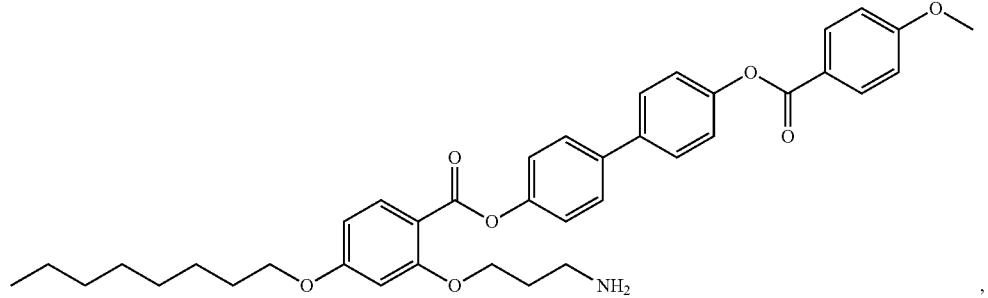
(L9)
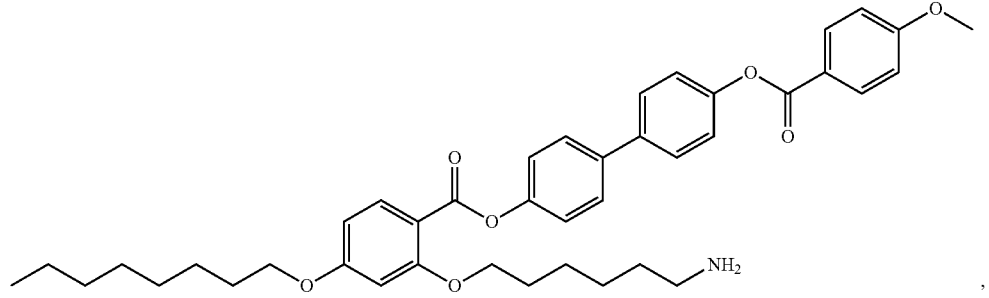
(L10)
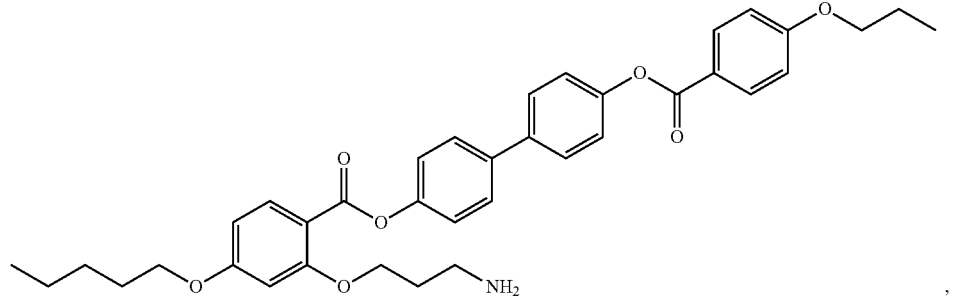
(L11)

-continued
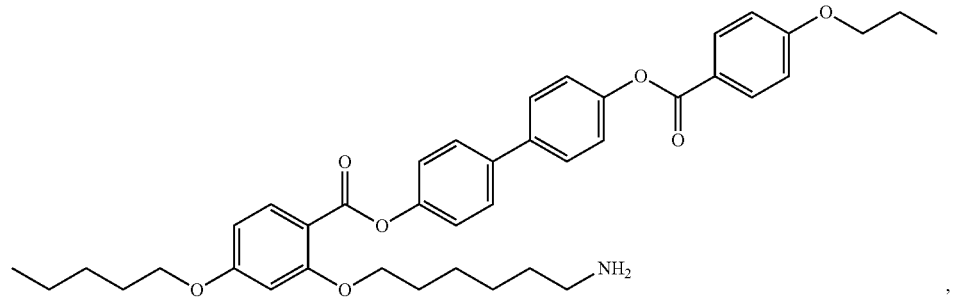
(L12)
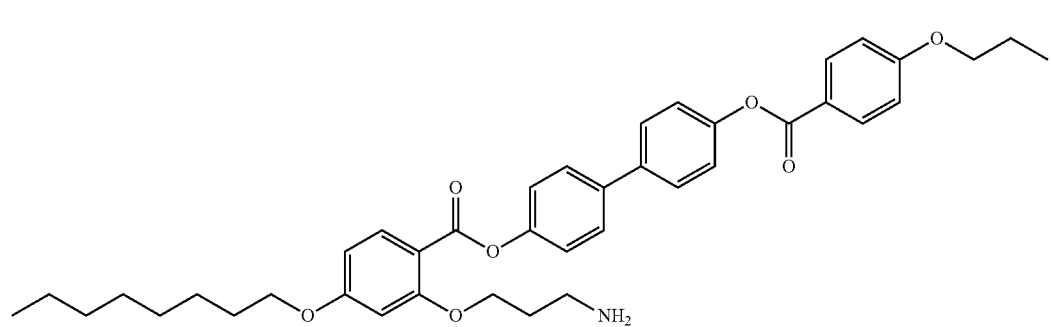
(L13)
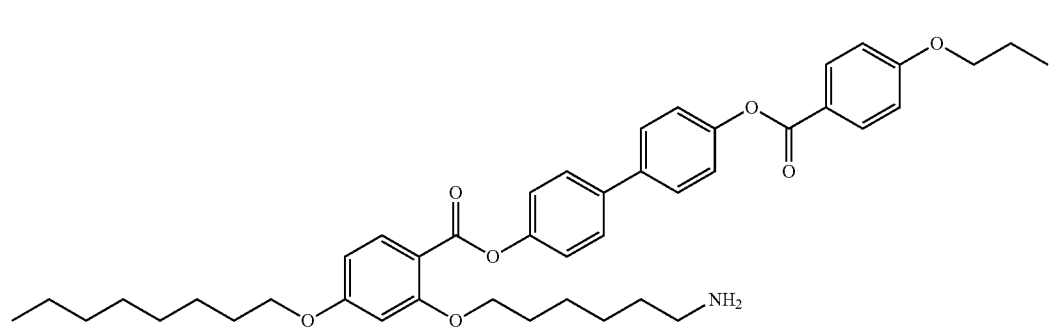
(L14)
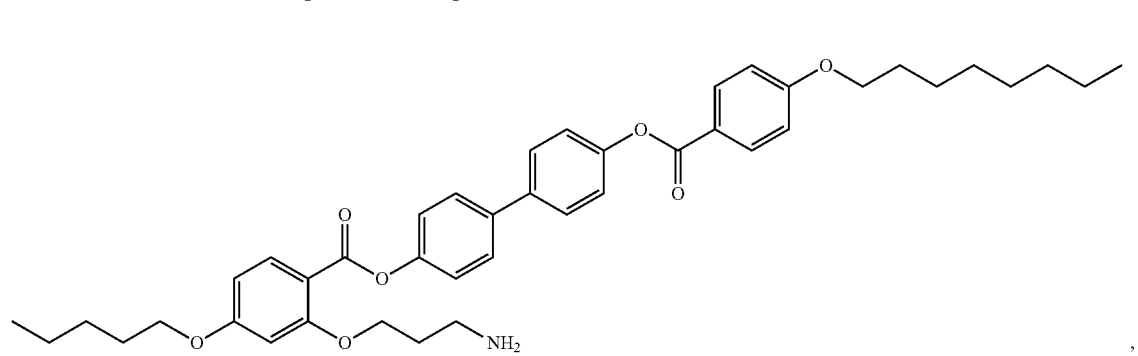
(L15)
, or
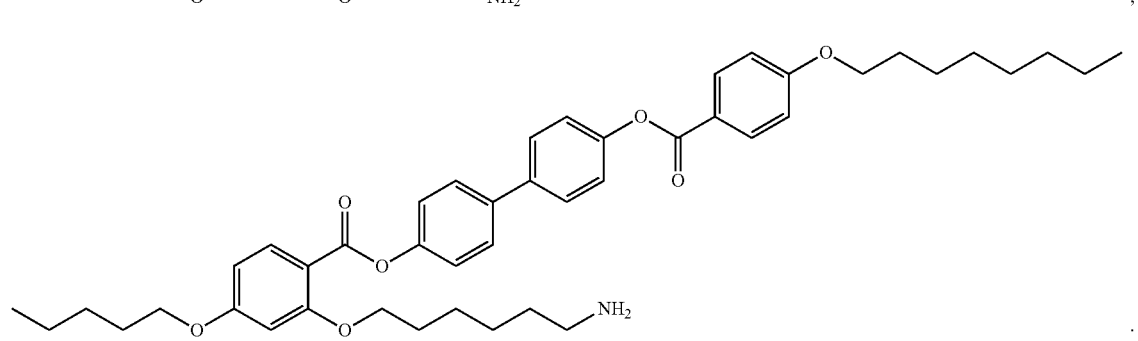
(L16)
.

In some embodiments, the mesogenic ligand has a structure of formula (II):

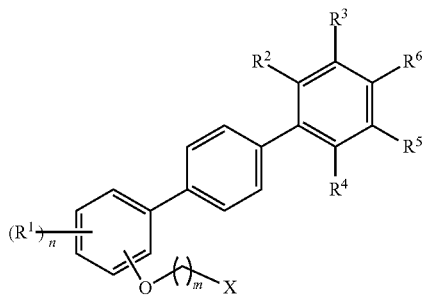

wherein:

R¹ are each independently selected H, halogen, hydroxyl, azido, alkyl, substituted alkyl, alkenyl, substituted alkenyl, alkynyl, substituted alkynyl, alkoxy, substituted alkoxy, amino, and substituted amino;

$R^2$, $R^3$, $R^4$, $R^5$, and $R^6$ are each independently selected from H, halogen, hydroxyl, azido, alkyl, substituted alkyl, alkenyl, substituted alkenyl, alkynyl, substituted alkynyl, alkoxy, substituted alkoxy, amino, substituted amino, cycloalkyl, substituted cycloalkyl, heterocycloalkyl, substituted heterocycloalkyl, aryl, substituted aryl, heteroaryl, substituted heteroaryl, phosphate, substituted phosphate, phosphoryl, substituted phosphoryl, thiol and substituted thiol and combinations thereof;

X is an amine or a thiol group;

n is an integer from 1 to 4; and m is an integer from 1 to 14.

In some embodiments, the mesogenic ligand is one of the following ligands:

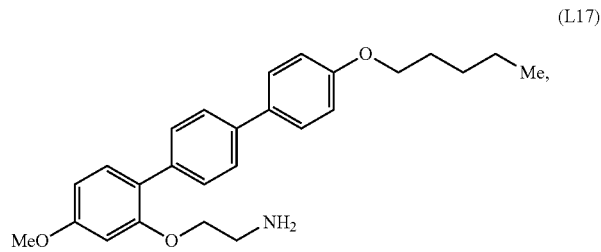
(L17)

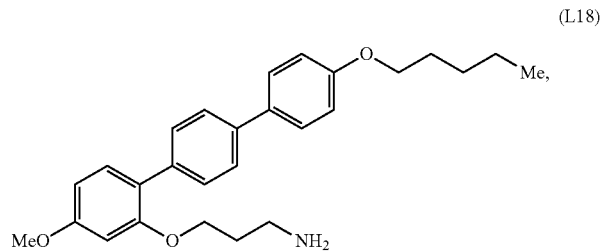
(L18)

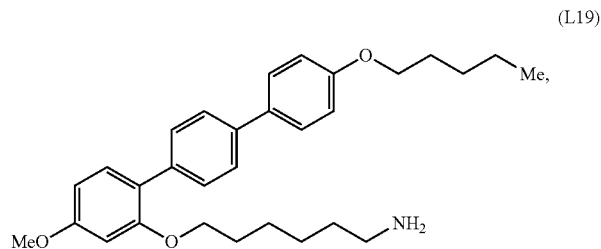
(L19)

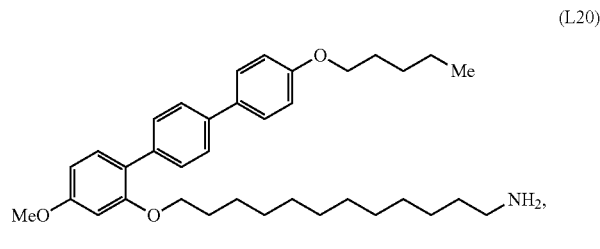
(L20)

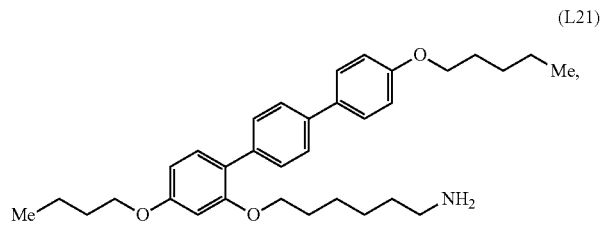
(L21)

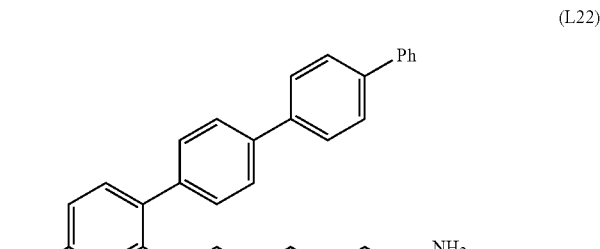
(L22)

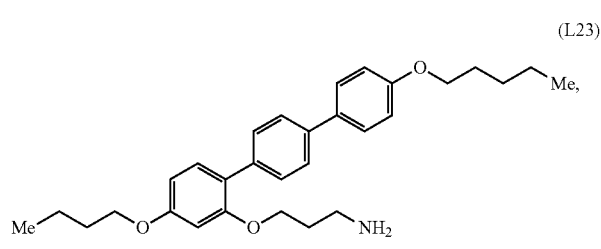
(L23)

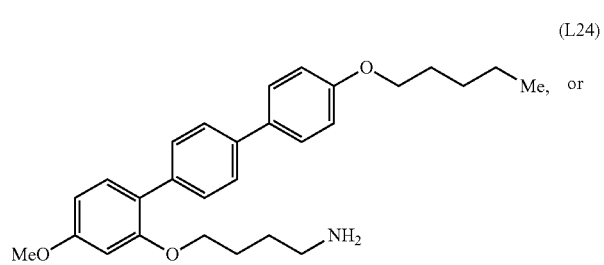
(L24) or

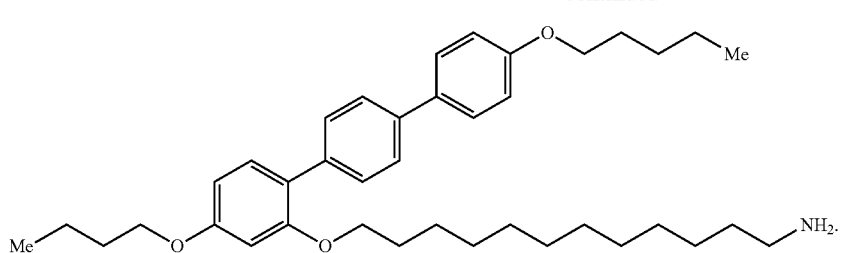

(L25)

In some embodiments, the mesogenic ligand is the following ligand:

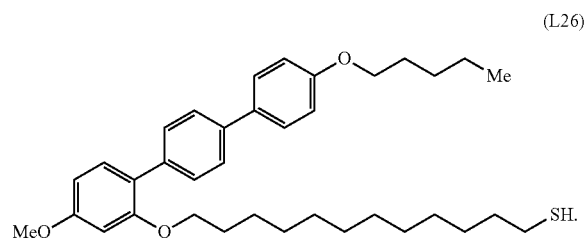

(L26)

Aspects of the present disclosure include a composition that includes a subject composite comprising a multi-compartment solid foam comprising mesogenic ligand functionalized nanoparticles, and a liquid crystalline liquid. In some embodiments, the concentration of mesogenic ligand-functionalized nanoparticles in the liquid crystalline liquid is from 0.075 wt % to 0.3 wt %.

In some embodiments, the foam in the composition is a closed-cell foam. In some embodiments, the foam in the composition is an open-cell foam.

In some embodiments, the foam has a droplet configuration suspended in the liquid crystalline liquid. In some embodiments, the droplet has a spherical surface. In some cases, the spherical surface has an average diameter of 1 μm to 50 μm. In other embodiments, the spherical surface has an average diameter of 50 μm or greater.

In certain embodiments, the composition comprises nanoparticles which have an average diameter of 1 nm to 100 nm.

In some embodiments, the composition comprises nanoparticles that are composed of a material selected from a semiconductor material, a metal, a metal oxide, a metalloid, a metal coated material, an oxide, a magnetic material, a nanosome, a dielectric material and a polymer, or combinations thereof.

In some embodiments, the composition comprises nanoparticles that are composed of cadmium selenide (CdSe), zinc sulfide (ZnS), or combinations thereof.

In some embodiments, the composition comprises nanoparticles that are composed of gold nanoparticles.

In some embodiments, the composition comprises mesogenic ligand-functionalized nanoparticles that include non-mesogenic ligands. In some embodiments, the ratio of mesogenic ligands to non-mesogenic ligands on the nanoparticle surface is 9:1. In some embodiments, the ratio of mesogenic ligands to non-mesogenic ligands on the nanoparticle surface is 9:1 or less, such as 8:1, or 7:1, or 6:1, or 5:1, or 4:1, or 3:1, or 2:1 or 1:1. In some embodiments, the ratio of mesogenic ligands to non-mesogenic ligands on the nanoparticle surface is 6:4. In some embodiments, the ratio of mesogenic ligands to non-mesogenic ligands on the nanoparticle surface is 6:4 or less, such as 5:4, or even less. In certain embodiments, the composition comprises mesogenic ligand-functionalized nanoparticles that include more non-mesogenic ligands than mesogenic ligands on the nanoparticle surface.

In some embodiments, the mesogenic ligand in the composition has a structure of formula (I) as defined herein. In certain embodiments, the mesogenic ligand in the composition has a structure selected from any of (L1) to (L16) as defined herein. In certain embodiments, the mesogenic ligand in the composition has a structure selected from any of (L1) to (L16), wherein the amine moiety is replaced with a thiol moiety.

In some embodiments, the mesogenic ligand in the composition has a structure of formula (II) as defined herein. In certain embodiments, the mesogenic ligand in the composition has a structure selected from any of (L17) to (L26) as defined herein. In certain embodiments, the mesogenic ligand in the composition has a structure selected from any of (L17) to (L25), wherein the amine moiety is replaced with a thiol moiety. In certain embodiments, the mesogenic ligand in the composition is of the structure (L26).

Aspects of the present disclosure include a method of producing a multi-compartment solid foam comprising mesogenic ligand functionalized nanoparticles. The method includes dispersing mesogenic ligand-functionalized nanoparticles in a liquid crystalline liquid, inducing a phase transition from an isotropic phase to a nematic phase, and cooling the dispersion at a rate configured to produce a multi-compartment solid foam comprising mesogenic ligand-functionalized nanoparticles.

In some embodiments, the mesogenic ligand in the method has a structure of formula (I) as defined herein. In certain embodiments, the mesogenic ligand in the method has a structure selected from any of (L1) to (L16) as defined herein. In certain embodiments, the mesogenic ligand in the method has a structure selected from any of (L1) to (L16), wherein the amine moiety is replaced with a thiol moiety.

In some embodiments, the mesogenic ligand in the method has a structure of formula (II) as defined herein. In certain embodiments, the mesogenic ligand in the method has a structure selected from any of (L17) to (L26) as defined herein. In certain embodiments, the mesogenic ligand in the method has a structure selected from any of (L17) to (L25), wherein the amine moiety is replaced with a thiol moiety. In certain embodiments, the mesogenic ligand in the method is of the structure (L26).

In some embodiments of the method, multiple nematic domains nucleate within the shrinking isotropic phase during the phase transition from the isotropic phase to the nematic phase.

In some embodiments of the method, the cooling rate is from 7° C./min to 30° C./min. In some cases, the cooling rate is 7° C./min. In some cases, the cooling rate is 15° C./min. In some cases, the cooling rate is 20° C./min. In some cases, the cooling rate is 30° C./min.

In some embodiments of the method, the concentration of mesogenic ligand-functionalized nanoparticles in the liquid crystalline liquid is from 0.075 wt % to 0.3 wt %. In some cases, the concentration of mesogenic ligand-functionalized nanoparticles in the liquid crystalline liquid is 0.075 wt %. In some cases, the concentration of mesogenic ligand-functionalized nanoparticles in the liquid crystalline liquid is 0.15 wt %. In other cases, the concentration of mesogenic ligand-functionalized nanoparticles in the liquid crystalline liquid is 0.3 wt %.

In some embodiments of the method, the dispersing comprises applying sound energy to the mesogenic ligand-functionalized nanoparticles in the liquid crystalline liquid.

In some embodiments of the method, the mesogenic ligand-functionalized nanoparticles are dispersed in a solvent before adding to the liquid crystalline liquid. In some cases, the solvent is selected from the group consisting of toluene, dimethylbenzene, methylisopropylbenzene, chloroform and mixtures thereof. In certain cases, the solvent is toluene.

Aspects of the present disclosure include a composition that includes a multi-compartment solid foam comprising mesogenic ligand-functionalized nanoparticles produced by the methods disclosed herein.

Aspects of the present disclosure include a photonic material that includes a composition, or a composite as disclosed herein.

These and other advantages and features of the disclosure will become apparent to those persons skilled in the art upon reading the details of the composites, compositions and methods of preparation, which are more fully described below.

BRIEF DESCRIPTION OF THE DRAWINGS

FIG. 1, panel B, shows $^1$H NMR spectra for the ligand exchange showing non-mesogenic quantum dots (bottom), an exemplary pure mesogenic ligand (middle), and quantum dots after the ligand exchange where both non-mesogenic and mesogenic ligands are present (top). FIG. 1, panel C, shows the molecular structure of 5CB (4-cyano-4'-pentylbiphenyl).

FIG. 2, panel B, shows a fluorescence microscopy image of nanoparticle hollow shell capsules formed at a cooling rate of 200° C./min. FIG. 2, panel C, shows a fluorescence microscopy image of nanoparticle solid closed cell foam formed at a cooling rate of 30° C./min. All structures in FIG. 2 are composed of 620 nm Cd/ZnS mesogenic-ligand functionalized quantum dots suspended in nematic liquid crystal initially at a concentration of 0.15 wt % at room temperature.

FIG. 3, panel D-F, shows representative fluorescence microscopy images of spherical shells formed from mesogenic-ligand functionalized quantum dots at a cooling rate of 200° C., at the indicated concentrations in 5CB. FIG. 3, panel G, shows a plot of average shell diameter vs. cooling rate, error bars show standard deviation. FIG. 3, panel H, shows a plot of average shell diameter vs. concentration, error bars show standard deviation. FIG. 3, panel I, shows a phase diagram for the three distinct morphologies predominantly observed as a function of cooling rate and concentration. General morphological zones on the phase diagram are indicated by the boxes and average shell size is indicated by circle diameter.

FIG. 4, panel F, shows a confocal microscope z projection image of a large foam structure (z depth=91.90 microns).

FIG. 5, panel G, shows a zoomed in view from panel E with an arrow indicating inner nematic domain nucleation. FIG. 5, panel H, shows a confocal microscope image of several foam structures suspended in 5CB. Images taken from stack of 40 images, Max projected and false colored using Fiji software. FIG. 5, panel I, shows a schematic drawing of a single compartment capsules forming when a single domain nucleates. FIG. 5, panel J, shows a schematic drawing of the transition from the isotropic phase to the nematic phase.

TERMS

Figure 1:
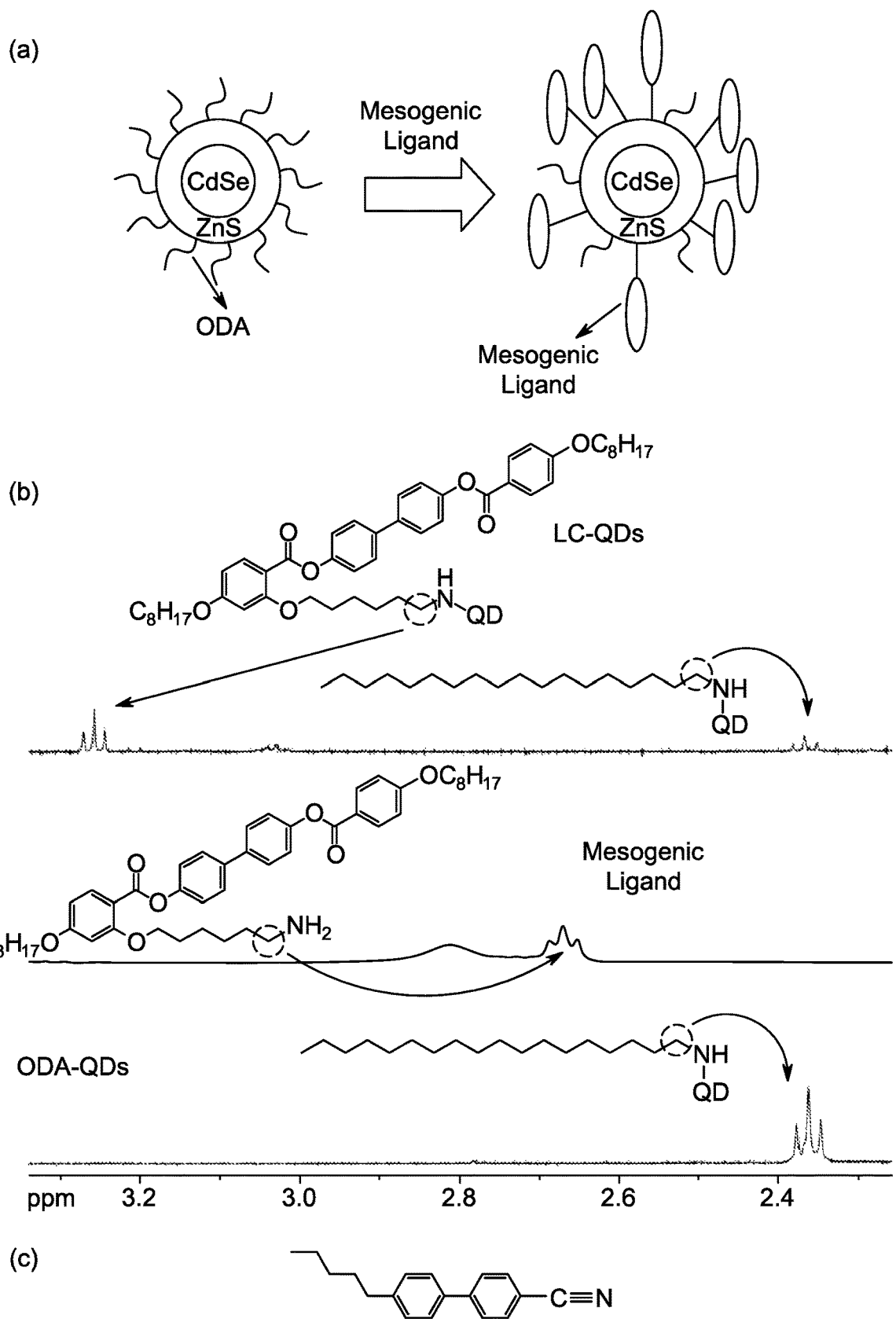
FIG. 1, panel A, a schematic representation of the ligand exchange from non-mesogenic ligands to mesogenic ligands.

"Alkyl" refers to monovalent saturated aliphatic hydrocarbyl groups having from 1 to 10 carbon atoms and preferably 1 to 6 carbon atoms. This term includes, by way of example, linear and branched hydrocarbyl groups such as methyl (CH$_3$—), ethyl (CH$_3$CH$_2$—), n-propyl (CH$_3$CH$_2$CH$_2$—), isopropyl ((CH$_3$)$_2$CH—), n-butyl (CH$_3$CH$_2$CH$_2$CH$_2$—), isobutyl ((CH$_3$)$_2$CHCH$_2$—), sec-butyl ((CH$_3$)(CH$_3$CH$_2$)CH—), t-butyl ((CH$_3$)$_3$C—), n-pentyl (CH$_3$CH$_2$CH$_2$CH$_2$CH$_2$—), and neopentyl ((CH$_3$)$_3$CCH$_2$-).

The term "substituted alkyl" refers to an alkyl group as defined herein wherein one or more carbon atoms in the alkyl chain (except for the C$_1$ carbon) have been optionally replaced with a heteroatom such as —O—, —N—, —S—, —S(O)$_n$— (where n is 0 to 2), —NR— (where R is hydrogen or alkyl) and having from 1 to 5 substituents selected from the group consisting of alkoxy, substituted alkoxy, cycloalkyl, substituted cycloalkyl, cycloalkenyl, substituted cycloalkenyl, acyl, acylamino, acyloxy, amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-aryl, —SO-heteroaryl, —SO$_2$-alkyl, —SO$_2$-aryl, —SO$_2$-heteroaryl, and —NR$^a$R$^b$, wherein R' and R" may be the same or different and are chosen from hydrogen, optionally substituted alkyl, cycloalkyl, alkenyl, cycloalkenyl, alkynyl, aryl, heteroaryl and heterocyclic.

"Alkylene" refers to divalent aliphatic hydrocarbyl groups preferably having from 1 to 6 and more preferably 1 to 3 carbon atoms that are either straight-chained or branched, and which are optionally interrupted with one or more groups selected from —O—, —NR$^{10}$—, —NR$^{10}$C(O)—, —C(O)NR$^{10}$— and the like. This term includes, by way of example, methylene (—CH$_2$—), ethylene (—CH$_2$CH$_2$—), n-propylene (—CH$_2$CH$_2$CH$_2$—), iso-propylene (—CH$_2$CH(CH$_3$)—), (—C(CH$_3$)$_2$CH$_2$CH$_2$—), (—C(CH$_3$)$_2$CH$_2$C(O)—), (—C(CH$_3$)$_2$CH$_2$C(O)NH—), (—CH(CH$_3$)CH$_2$—), and the like.

"Substituted alkylene" refers to an alkylene group having from 1 to 3 hydrogens replaced with substituents as described for carbons in the definition of "substituted" below.

"Alkoxy" refers to the group —O-alkyl, wherein alkyl is as defined herein. Alkoxy includes, by way of example, methoxy, ethoxy, n-propoxy, isopropoxy, n-butoxy, t-butoxy, sec-butoxy, n-pentoxy, and the like. The term "alkoxy" also refers to the groups alkenyl-O—, cycloalkyl-O—, cycloalkenyl-O—, and alkynyl-O—, where alkenyl, cycloalkyl, cycloalkenyl, and alkynyl are as defined herein.

The term "substituted alkoxy" refers to the groups substituted alkyl-O—, substituted alkenyl-O—, substituted cycloalkyl-O—, substituted cycloalkenyl-O—, and substituted alkynyl-O— where substituted alkyl, substituted alkenyl, substituted cycloalkyl, substituted cycloalkenyl and substituted alkynyl are as defined herein.

"Alkenyl" refers to straight chain or branched hydrocarbyl groups having from 2 to 6 carbon atoms and preferably 2 to 4 carbon atoms and having at least 1 and preferably from 1 to 2 sites of double bond unsaturation. This term includes, by way of example, bi-vinyl, allyl, and but-3-en-1-yl. Included within this term are the cis and trans isomers or mixtures of these isomers.

The term "substituted alkenyl" refers to an alkenyl group as defined herein having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$-alkyl, —SO$_2$-substituted alkyl, —SO$_2$-aryl and —SO$_2$-heteroaryl.

"Alkynyl" refers to straight or branched monovalent hydrocarbyl groups having from 2 to 6 carbon atoms and preferably 2 to 3 carbon atoms and having at least 1 and preferably from 1 to 2 sites of triple bond unsaturation. Examples of such alkynyl groups include acetylenyl (—C≡CH), and propargyl (—CH$_2$C≡CH).

The term "substituted alkynyl" refers to an alkynyl group as defined herein having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$-alkyl, —SO$_2$-substituted alkyl, —SO$_2$-aryl, and —SO$_2$-heteroaryl.

"Aryl" or "Ar" refers to a monovalent aromatic carbocyclic group of from 6 to 18 carbon atoms having a single ring (such as is present in a phenyl group) or a ring system having multiple condensed rings (examples of such aromatic ring systems include naphthyl, anthryl and indanyl) which condensed rings may or may not be aromatic, provided that the point of attachment is through an atom of an aromatic ring. This term includes, by way of example, phenyl and naphthyl. Unless otherwise constrained by the definition for the aryl substituent, such aryl groups can optionally be substituted with from 1 to 5 substituents, or from 1 to 3 substituents, selected from acyloxy, hydroxy, thiol, acyl, alkyl, alkoxy, alkenyl, alkynyl, cycloalkyl, cycloalkenyl, substituted alkyl, substituted alkoxy, substituted alkenyl, substituted alkynyl, substituted cycloalkyl, substituted cycloalkenyl, amino, substituted amino, aminoacyl, acylamino, alkaryl, aryl, aryloxy, azido, carboxyl, carboxylalkyl, cyano, halogen, nitro, heteroaryl, heteroaryloxy, heterocyclyl, heterocyclooxy, aminoacyloxy, oxyacylamino, thioalkoxy, substituted thioalkoxy, thioaryloxy, thioheteroaryloxy, —SO-alkyl, —SO-substituted alkyl, —SO-aryl, —SO-heteroaryl, —SO$_2$-alkyl, —SO$_2$-substituted alkyl, —SO$_2$-aryl, —SO$_2$-heteroaryl and trihalomethyl.

"Amino" refers to the group —NH$_2$.

The term "substituted amino" refers to the group —NRR where each R is independently selected from the group consisting of hydrogen, alkyl, substituted alkyl, cycloalkyl, substituted cycloalkyl, alkenyl, substituted alkenyl, cycloalkenyl, substituted cycloalkenyl, alkynyl, substituted alkynyl, aryl, heteroaryl, and heterocyclyl provided that at least one R is not hydrogen.

The term "azido" refers to the group —N$_3$.

"Cycloalkyl" refers to cyclic alkyl groups of from 3 to 10 carbon atoms having single or multiple cyclic rings including fused, bridged, and spiro ring systems. Examples of suitable cycloalkyl groups include, for instance, adamantyl, cyclopropyl, cyclobutyl, cyclopentyl, cyclooctyl and the like. Such cycloalkyl groups include, by way of example, single ring structures such as cyclopropyl, cyclobutyl, cyclopentyl, cyclooctyl, and the like, or multiple ring structures such as adamantanyl, and the like.

The term "substituted cycloalkyl" refers to cycloalkyl groups having from 1 to 5 substituents, or from 1 to 3 substituents, selected from alkyl, substituted alkyl, alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO₂-alkyl, —SO₂-substituted alkyl, —SO₂-aryl and —SO₂-heteroaryl.

"Heterocycle," "heterocyclic," "heterocycloalkyl," and "heterocyclyl" refer to a saturated or unsaturated group having a single ring or multiple condensed rings, including fused bridged and spiro ring systems, and having from 3 to 20 ring atoms, including 1 to 10 hetero atoms. These ring atoms are selected from the group consisting of nitrogen, sulfur, or oxygen, wherein, in fused ring systems, one or more of the rings can be cycloalkyl, aryl, or heteroaryl, provided that the point of attachment is through the non-aromatic ring. In certain embodiments, the nitrogen and/or sulfur atom(s) of the heterocyclic group are optionally oxidized to provide for the N-oxide, —S(O)—, or —SO₂- moieties.

Examples of heterocycles and heteroaryls include, but are not limited to, azetidine, pyrrole, imidazole, pyrazole, pyridine, pyrazine, pyrimidine, pyridazine, indolizine, isoindole, indole, dihydroindole, indazole, purine, quinolizine, isoquinoline, quinoline, phthalazine, naphthylpyridine, quinoxaline, quinazoline, cinnoline, pteridine, carbazole, carboline, phenanthridine, acridine, phenanthroline, isothiazole, phenazine, isoxazole, phenoxazine, phenothiazine, imidazolidine, imidazoline, piperidine, piperazine, indoline, phthalimide, 1,2,3,4-tetrahydroisoquinoline, 4,5,6,7-tetrahydrobenzo[b]thiophene, thiazole, thiazolidine, thiophene, benzo[b]thiophene, morpholinyl, thiomorpholinyl (also referred to as thiamorpholinyl), 1,1-dioxothiomorpholinyl, piperidinyl, pyrrolidine, tetrahydrofuranyl, and the like.

Unless otherwise constrained by the definition for the heterocyclic substituent, such heterocyclic groups can be optionally substituted with 1 to 5, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO₂-alkyl, —SO₂-substituted alkyl, —SO₂-aryl, —SO₂-heteroaryl, and fused heterocycle.

"Halo" or "halogen" refers to fluoro, chloro, bromo, and iodo.

"Hydroxy" or "hydroxyl" refers to the group —OH.

"Heteroaryl" refers to an aromatic group of from 1 to 15 carbon atoms, such as from 1 to 10 carbon atoms and 1 to 10 heteroatoms selected from the group consisting of oxygen, nitrogen, and sulfur within the ring. Such heteroaryl groups can have a single ring (such as, pyridinyl, imidazolyl or furyl) or multiple condensed rings in a ring system (for example as in groups such as, indolizinyl, quinolinyl, benzofuran, benzimidazolyl or benzothienyl), wherein at least one ring within the ring system is aromatic and at least one ring within the ring system is aromatic, provided that the point of attachment is through an atom of an aromatic ring. In certain embodiments, the nitrogen and/or sulfur ring atom(s) of the heteroaryl group are optionally oxidized to provide for the N-oxide (N→O), sulfinyl, or sulfonyl moieties. This term includes, by way of example, pyridinyl, pyrrolyl, indolyl, thiophenyl, and furanyl. Unless otherwise constrained by the definition for the heteroaryl substituent, such heteroaryl groups can be optionally substituted with 1 to 5 substituents, or from 1 to 3 substituents, selected from acyloxy, hydroxy, thiol, acyl, alkyl, alkoxy, alkenyl, alkynyl, cycloalkyl, cycloalkenyl, substituted alkyl, substituted alkoxy, substituted alkenyl, substituted alkynyl, substituted cycloalkyl, substituted cycloalkenyl, amino, substituted amino, aminoacyl, acylamino, alkaryl, aryl, aryloxy, azido, carboxyl, carboxylalkyl, cyano, halogen, nitro, heteroaryl, heteroaryloxy, heterocyclyl, heterocyclooxy, aminoacyloxy, oxyacylamino, thioalkoxy, substituted thioalkoxy, thioaryloxy, thioheteroaryloxy, —SO-alkyl, —SO-substituted alkyl, —SO-aryl, —SO-heteroaryl, —SO₂-alkyl, —SO₂-substituted alkyl, —SO₂-aryl and —SO₂-heteroaryl, and trihalomethyl.

Unless indicated otherwise, the nomenclature of substituents that are not explicitly defined herein are arrived at by naming the terminal portion of the functionality followed by the adjacent functionality toward the point of attachment. For example, the substituent "aminoalkoxy" refers to the group NH₂-(alkyl)-O—.

As to any of the groups disclosed herein which contain one or more substituents, it is understood, of course, that such groups do not contain any substitution or substitution patterns which are sterically impractical and/or synthetically non-feasible. In addition, the subject compounds include all stereochemical isomers arising from the substitution of these compounds.

The term "open-cell foam" refers to a foam in which the majority of the adjoining cells or compartments are in fluid communication with each other. For example, an open-cell foam structure may not be clearly defined, but include interconnected channels creating at least one open pathway through the foam.

The term "closed-cell foam" refers to a foam which has a predominantly closed-cell morphology. For example, a closed-cell foam structure may either not have interconnections or openings between the foam cells or compartments, or may have very few and small interconnections between the cells or compartments.

The term "compartment" or "cell" as used herein refers to an intercellular opening within the external wall of a foam structure. For example, a series of intercellular openings within the solid external wall of a foam structure is referred to herein as "multiple compartments" or "multi-compartment".

DETAILED DESCRIPTION

As summarized above, aspects of the present disclosure include composites of multi-compartment solid foams comprising mesogenic ligand-functionalized nanoparticles, compositions that include these composites, as well as methods of making these composites and compositions. The composites, compositions and methods find use in a variety of applications, such as, photonics, luminescent coatings and multi-compartment encapsulation technologies.

Solid Foam Structures

Aspects of the present disclosure include composites comprising multi-compartment solid foams composed of mesogenic-ligand functionalized nanoparticles. By "nanoparticles" is meant particles that have a size range in the nanometer (nm) scale. For example, a nanoparticle may have a size (e.g., largest dimension) of 1000 nm or less, such as a size ranging from 0.1 nm to 1000 nm. In some cases, the nanoparticles have an average diameter of 1 nm to 100 nm. Solid foams of the present disclosure include structures having a shape that extends in three dimensions, such as length, width and height.

In certain embodiments, solid foams of the present disclosure include foams having a closed-cell configuration. In other embodiments, solid foams of the present disclosure include foams having an open-cell configuration. A foam may be composed of multiple compartments with no interconnections. In some cases, the subject foams may possess very few and small interconnections between its compartments. For instance, a foam may have a closed-cell morphology, such that 50% or more of the compartments, or 60% or more, or 70% or more, or 80% or more, or 90% or more, or 95% or more, or 97% or more, or 99% or more of compartments are closed so that there are no interconnections between them. In other cases, the subject foam structure may have multiple compartments in open communication. For instance, the foam may have an open-cell morphology, such that 50% or more of the compartments, or 60% or more, or 70% or more, or 80% or more, or 90% or more, or 95% or more, or 97% or more, or 99% or more of compartments are open so that there are interconnections between them. In certain instances, the foam will have multiple compartments in open communication with each other, so as to form a channel within the foam structure.

Compartments within a subject solid foam may have various shapes and sizes. For instance, solid foam structures include, but are not limited to, regular shapes such as spherical, ellipsoid, cylinder, cone, cube, cuboid, pyramidal, torus shapes, and the like. In other embodiments, the solid foam may have an irregular shape. In certain embodiments, foams of the present disclosure have a spherical shape (i.e., a spherical external shell). In certain embodiments, the foams of the present disclosure are microstructures. By "microstructure" is meant the structure has a size range in the micrometer (μm) scale. For example, a microstructure may have a size (e.g., largest dimension) of 1000 μm or less, such as a size ranging from 10 nm to 1000 μm.

In certain embodiments, the foam structures are microstructures as described above, where the microstructures have a size of 1000 μm or less, such as 950 μm or less, or 900 μm or less, or 850 μm or less, or 800 μm or less, or 750 μm or less, or 700 μm or less, or 650 μm or less, or 600 μm or less, or 550 μm or less, or 500 μm or less, or 450 μm or less, or 400 μm or less, or 350 μm or less, or 300 μm or less, or 250 μm or less, or 200 μm or less, or 150 μm or less, or 100 μm or less, or 90 μm or less, or 80 μm or less, or 70 μm or less, or 60 μm or less, or 50 μm or less, or 40 μm or less, or 30 μm or less, or 20 μm or less, or 10 μm or less, or 9 μm or less, or 8 μm or less, or 7 μm or less, or 6 μm or less, or 5 μm or less, or 4 μm or less, or 3 μm or less, or 2 μm or less, or 1 μm or less, or 0.75 μm or less, or 0.5 μm or less, or 0.25 μm or less, or 0.1 μm or less, or 0.075 μm or less, or 0.05 μm or less, or 0.025 μm or less, or 0.01 μm or less. In some instances, the microstructures have a size ranging from 0.01 μm to 1000 μm, 0.025 μm to 1000 μm, 0.05 μm to 1000 μm, 0.075 μm to 1000 μm, 0.1 μm to 1000 μm, such as from 0.25 μm to 1000 μm, or 0.5 μm to 1000 μm, or 0.5 μm to 900 μm, or 0.5 μm to 800 μm, or 0.5 μm to 700, or 0.5 μm to 600 μm, or 0.5 μm to 500 μm, or 0.5 μm to 400 μm, or 0.5 μm to 300 μm, or 0.5 μm to 250 μm, or 0.5 μm to 200 μm, or 0.5 μm to 150 μm, or 0.5 μm to 100 μm, or 0.5 μm to 90 μm, or 0.5 μm to 80 μm, or 0.5 μm to 70 μm, or 0.5 μm to 60 μm, or 0.5 μm to 50 μm, or 0.5 μm to 40 μm, or 0.5 μm to 30 μm, or 0.5 μm to 20 μm, or 0.5 μm to 10 μm, or 0.5 μm to 9 μm, or 0.5 μm to 8 μm, or 0.5 μm to 7 μm, or 0.5 μm to 6 μm, or 0.5 μm to 5 μm, or 0.5 μm to 4 μm, or 0.5 μm to 3 μm, or 0.5 μm to 2 μm, or 0.5 μm to 1 μm. The size of the foam microstructures may be measured as the largest dimension of the foam microstructure (e.g., length, width, or height), or for spherical foam microstructures (e.g., spherical surfaces), may be measured as the average diameter of the foam microstructures. By "average" is meant the arithmetic mean. In certain instances, the solid foam structures have a dimension of 1 μm to 50 μm. In certain instances, the solid foam structure has an average dimension of 50 μm or less, such as 40 μm or less, or 30 μm or less, or 20 μm or less, or 10 μm or less, or 9 μm or less, or 8 μm or less, or 7 μm or less, or 6 μm or less, or 5 μm or less, or 4 μm or less, or 3 μm or less, or 2 μm or less, or 1 μm or less, or 0.75 μm or less, or 0.5 μm or less, or 0.25 μm or less, or 0.1 μm or less, or 0.075 μm or less, or 0.05 μm or less, or 0.025 μm or less, or 0.01 μm or less. In certain instances, each compartment of the solid foam structure has an average size of less than 1 μm. In certain instances, each compartment has an average size of less than 0.5 μm.

Solid foams of the present disclosure are composed of nanoparticles. In certain embodiments, the nanoparticles are stably associated with each other to form the foam. By "stably associated" is meant that a moiety is bound to or otherwise associated with another moiety or structure under standard conditions. In certain instances, the nanoparticles may be stably associated with each other such that each compartment substantially maintains its shape after formation of the solid foam structure. In some embodiments, the nanoparticles are stably associated with each other through non-covalent interactions, such as, but not limited to, ionic bonds, hydrophobic interactions, hydrogen bonds, van der Waals forces (e.g., London dispersion forces), dipole-dipole interactions, and the like. In some embodiments, the nanoparticles are stably associated with each other through covalent bonds. For example, a nanoparticle may be covalently bound or cross-linked to one or more nanoparticles in the shell. In certain cases, the nanoparticles are stably associated with each other through a combination of non-covalent and covalent interactions.

As described above, the solid foams of the present disclosure may be composed of nanoparticles. The nanoparticles may have a size of 1000 nm or less, such as 900 nm or less, or 800 nm or less, or 700 nm or less, or 600 nm or less, or 500 nm or less, or 400 nm or less, or 300 nm or less, or 250 nm or less, or 200 nm or less, or 150 nm or less, or 100 nm or less, or 90 nm or less, or 80 nm or less, or 70 nm or less, or 60 nm or less, or 50 nm or less, or 40 nm or less, or 30 nm or less, or 20 nm or less, or 10 nm or less, or 9 nm or less, or 8 nm or less, or 7 nm or less, or 6 nm or less, or 5 nm or less, or 4 nm or less, or 3 nm or less, or 2 nm or less, or 1 nm or less. In some instances, the nanoparticles have a size ranging from 0.1 nm to 1000 nm, such as from 0.5 nm to 1000 nm, or 1 nm to 1000 nm, or 1 nm to 900 nm, or 1 nm to 800 nm, or 1 nm to 700 nm, or 1 nm to 600 nm, or 1 nm to 500 nm, or 1 nm to 400 nm, or 1 nm to 300 nm, or 1 nm to 250 nm, or 1 nm to 200 nm, or 1 nm to 150 nm, or 1 nm to 100 nm, or 1 nm to 90 nm, or 1 nm to 80 nm, or 1 nm to 70 nm, or 1 nm to 60 nm, or 1 nm to 50 nm, or 1 nm to 40 nm, or 1 nm to 30 nm, or 1 nm to 20 nm, or 1 nm to 10 nm, or 1 nm to 9 nm, or 1 nm to 8 nm, or 1 nm to 7 nm, or 1 nm to 6 nm, or 1 nm to 5 nm. The size of the nanoparticles may be measured as the largest dimension of the nanoparticle (e.g., length, width, etc.), or for spherical nanoparticles, may be measured as the average diameter of the nanoparticles. By "average" is meant the arithmetic mean. In certain instances, the nanoparticles have an average size of 5 nm. In certain instances, the nanoparticles have an average size of 6 nm. Mixtures of different sizes and/or shapes of nanoparticles may be included in the solid foam structures as desired. In other embodiments, the nanoparticles have substantially the same size and shape.

Nanoparticles may have various shapes, such as, but not limited to, spherical, ellipsoid, cylinder, cone, cube, cuboid, pyramidal, needle, and the like. The nanoparticles may be made of any convenient material, such as, but not limited to, a semiconductor material, a metal, a metal oxide, a metalloid, a metal coated material, an oxide, a magnetic material, a nanosome, a dielectric material and a polymer, or combinations thereof. For example, nanoparticles may be composed of materials, such as, but not limited to, titanium dioxide, silicon, gold, gold-plated silica, polymers, polymer-coated nanoparticles, quantum dot materials (as described in more detail below), and the like.

In certain embodiments, the nanoparticles that form the solid foams are arranged as a mixture of nanoparticles to form the foam structure. For instance, the solid foams may be composed of a mixture (e.g., a substantially homogeneous mixture) of nanoparticles. For instance, nanoparticles may differ with respect to one or more physical and/or chemical characteristics, such as, but not limited to, size, shape, composition, ligand attached to the surface of the nanoparticle, and the like.

In certain embodiments, the solid foam is composed of nanoparticles where the nanoparticles are a mixture of different types of nanoparticles. For instance, the mixture of nanoparticles may be a heterogeneous mixture of nanoparticles that is composed of different types of nanoparticles. The different types of nanoparticles may include nanoparticles that vary in one or more physical and/or chemical characteristics, such as, but not limited to, size, shape, composition, ligand attached to the surface of the nanoparticle, combinations thereof, and the like.

In certain embodiments, the nanoparticles are composed of a semiconductor material. For example, the nanoparticles may be quantum dots (QD). Quantum dots are nanoparticles made of a semiconductor material that exhibits quantum mechanical properties. In some instances, the nanoparticles may be composed of a material, such as, but not limited to, lead sulfide, lead selenide, cadmium selenide, cadmium sulfide, indium arsenide, indium phosphide, cadmium selenide sulfide, zinc sulfide, combinations thereof, and the like. In certain embodiments, the nanoparticles are composed of cadmium selenide (CdSe), zinc sulfide (ZnS), or combinations thereof.

The nanoparticles may be made of a semiconductor material, a metal, a metal oxide, a metal coated material, a metalloid, an oxide, a magnetic material, a nanosome, a lipidsome, a polymer, combinations thereof, and the like. For example, nanoparticles may be composed of materials, such as, but not limited to, titanium dioxide, silicon, gold, gold-plated silica, polymers, silver, zinc oxide, iron oxide, cobalt and the like. In some cases, the nanoparticles may be composed of coated nanoparticles, such as polymer-coated, gold coated, silver coated, zinc coated, graphene coated, graphene coated cobalt, silica coated iron oxide, silica coated cobalt nanoparticles, and the like. In some embodiments the nanoparticles are gold nanoparticles.

In certain embodiments, the nanoparticle is composed of a material or mixture of materials, such that the composition of the nanoparticle is substantially homogeneous. In some cases, the nanoparticle is composed of two or more materials. Nanoparticles composed of two or more materials include nanoparticles composed of a mixture of the two or more materials, such that the nanoparticles have a substantially homogeneous composition, and nanoparticles where the nanoparticles are composed of regions of a material interspersed with or adjacent to regions of one or more different materials. For instance, a nanoparticle may be composed of a core of a first material (or mixture of materials) substantially surrounded by a shell of a different material (or different mixture of materials). The shell of the different material may be disposed as one or more layers of material on a surface of the core of the first material.

In some embodiments, the nanoparticles may be quantum dots as described above. The quantum dots may be composed of two or more semiconductor materials, such as, but not limited to, lead sulfide, lead selenide, cadmium selenide, cadmium sulfide, indium arsenide, indium phosphide, cadmium selenide sulfide, zinc sulfide, and the like. In certain embodiments, the nanoparticle includes a core of cadmium selenide (CdSe) substantially surrounded by a shell of zinc sulfide (ZnS) disposed on a surface of the core.

In certain embodiments, the nanoparticles are functionalized nanoparticles. A functionalized nanoparticle is a nanoparticle that includes a ligand attached to the surface of the nanoparticle. The ligand may be attached to the surface of the nanoparticle through non-covalent interactions, such as, but not limited to, ionic bonds, hydrophobic interactions, hydrogen bonds, van der Waals forces (e.g., London dispersion forces), dipole-dipole interactions, and the like, or through covalent bonds. In certain embodiments, the ligand is attached to the surface of the nanoparticle through a covalent bond.

Ligands suitable for functionalization of the nanoparticles may vary depending on the desired properties of the functionalized nanoparticle. For example, the ligand on the ligand functionalized nanoparticle may be selected such that the spacing between adjacent ligand functionalized nanoparticles is a desired spacing. Stated another way, in some instances, the spacing between adjacent ligand functionalized nanoparticles may depend on one or more properties of the ligand, such as, but not limited to, the size, structure, and/or orientation of the ligand. In some cases, the spacing between adjacent nanoparticles is 5 nm or more, such as 6 nm or more, or 7 nm or more, or 8 nm or more, or 9 nm or more, or 10 nm or more, or 11 nm or more, or 12 nm or more, or 13 nm or more, or 14 nm or more, or 15 nm or more, or 16 nm or more, or 17 nm or more, or 18 nm or more, or 19 nm or more, or 20 nm or more. In some cases, the spacing between adjacent nanoparticles is 10 nm or more. In some cases, the spacing between adjacent nanoparticles is 5 nm to 20 nm, such as 7 nm to 15 nm, or 10 nm to 15 nm. In some instances, the spacing between adjacent nanoparticles is 10 nm to 15 nm, such as 10 nm to 13 nm, or 10 nm to 12 nm. In certain embodiments, the spacing between adjacent nanoparticles is selected so as to minimize shifts in the emission spectrum of the nanoparticles. In certain embodiments, the spacing between adjacent nanoparticles is selected so as to minimize energy losses due to fluorescence resonance energy transfer (FRET).

In certain embodiments, the ligand is a mesogenic ligand (also referred to as a liquid crystal ligand), and as such the functionalized nanoparticles are mesogenic ligand-functionalized nanoparticles. In some instances, a mesogenic ligand has liquid crystalline properties. For instance, a mesogenic ligand may include a rigid moiety and one or more flexible moieties. The rigid and flexible moieties of the mesogenic ligands may facilitate alignment of the mesogenic ligands in a common direction. For example, as described herein, mesogenic ligand-functionalized nanoparticles may be dispersed in a liquid crystalline liquid, and thus the flexible moiety may facilitate alignment of the mesogenic ligand with the surrounding liquid crystalline liquid. For instance, mesogenic ligands attached to a surface of a nanoparticle may align with the director of a surrounding liquid crystalline liquid (e.g., a nematic phase of the liquid crystalline liquid).

In certain embodiments, the mesogenic ligand has a phase transition temperature (also referred to as a melting temperature or clearing point) ranging from 50° C. to 150° C., such as 75° C. to 125° C., or 80° C. to 120° C., or 85° C. to 115° C., or 90° C. to 110° C. In certain embodiments, the mesogenic ligand has a phase transition temperature (e.g., melting temperature or clearing point) of 100° C. For example, the phase transition temperature may be a temperature at which the mesogenic ligand transitions from a first phase to a second phase (or vice versa). In some embodiments, the mesogenic ligand may transition from a phase having positional order (e.g., an ordered spatial arrangement of the ligands, such as in an ordered lattice) or directional order (e.g., alignment of the ligands along a common directional axis) to a phase having substantially no positional or directional order. In some embodiments, the mesogenic ligand may transition from a phase having substantially no positional or directional order to a phase having positional or directional order. In some cases, the mesogenic ligand has positional and/or directional order below the phase transition temperature, and substantially no positional or directional order above the phase transition temperature. Similarly, mesogenic ligands that are stably associated with or attached to a surface of mesogenic ligand-functionalized nanoparticles may have a phase transition from a phase having substantially no positional or directional order to a phase having positional or directional order (or vice versa). As described above, mesogenic ligands that are stably associated with or attached to a surface of mesogenic ligand-functionalized nanoparticles may have a phase transition temperature (also referred to as a melting temperature or clearing point) ranging from 50° C. to 150° C., such as 75° C. to 125° C., or 80° C. to 120° C., or 85 C. to 115° C., or 90° C. to 110° C. In certain embodiments, mesogenic ligands that are stably associated with or attached to a surface of mesogenic ligand-functionalized nanoparticles may have a phase transition temperature (e.g., melting temperature or clearing point) of 100° C.

In certain embodiments the subject mesogenic ligands are stable at temperatures greater than 100° C., such as greater than 200° C., or even greater. In some cases, mesogenic ligands are stable at temperatures greater than 300° C., such as greater than 350° C., greater than 400° C., greater than 450° C., greater than 500° C., or even greater.

In other embodiments, ligands suitable for functionalization of the nanoparticles are non-mesogenic ligands. In these embodiments, if the ligand is a non-mesogenic ligand, the functionalized nanoparticles may simply be referred to as ligand-functionalized nanoparticles. For instance, the ligand may be an organic compound. Examples of ligands that may be attached to a surface of the nanoparticle include, but are not limited to, octadecylamine (ODA), octadecanethiol (ODT), octadecylphosphonic acid, oleic acid, combinations thereof, and the like. In certain cases, the solid foam structure includes mesogenic-ligand functionalized nanoparticles which further comprise non mesogenic-ligands. In some cases, the ratio of mesogenic ligands to non-mesogenic ligands on the nanoparticle surface is 9:1. In some cases, the ratio of mesogenic ligands to non-mesogenic ligands on the nanoparticle surface is 9:1 or less, such as 8:1, or 7:1, or 6:1, or 5:1, or 4:1, or 3:1, or 2:1 or 1:1. In other cases, the ratio of mesogenic ligands to non-mesogenic ligands on the nanoparticle surface is 6:4. In some cases, the ratio of mesogenic ligands to non-mesogenic ligands on the nanoparticle surface is 6:4 or less, such as 5:4 or even less.

In certain embodiments, the ligand (e.g., mesogenic ligand) includes a cross-linkable functional group. The cross-linkable functional group may be a group that, when activated, can form an attachment to another moiety. In some cases, the attachment may attach a mesogenic ligand to another mesogenic ligand (e.g., a mesogenic ligand of an adjacent mesogenic ligand-functionalized nanoparticle), may attach a mesogenic ligand to a nanoparticle, may attach a mesogenic ligand to a ligand (e.g., a non-mesogenic ligand) of a ligand-functionalized nanoparticle (e.g., a non-mesogenic ligand-functionalized nanoparticle), may attach a ligand (e.g., a non-mesogenic ligand) to a mesogenic ligand (e.g., a mesogenic ligand of an adjacent mesogenic ligand-functionalized nanoparticle), or may attach a ligand (e.g., a non-mesogenic ligand) to another ligand (e.g., a ligand of an adjacent ligand-functionalized nanoparticle). In certain embodiments, the cross-linkable functional group forms a covalent bond attachment to the other moiety. In certain embodiments, the cross-linkable functional group is a light activated cross-linkable functional group. A light activated cross-linkable functional group is a cross-linkable functional group that may form an attachment to another moiety when light is applied to the light activated cross-linkable functional group. For example, exposure of the light activated cross-linkable functional group to light may activate the functional group, thus forming a reactive moiety capable of forming a crosslink to another moiety as described above. In some instances, the applied light is ultraviolet (UV) light. In some instances, the applied light is visible light. In some instances, the applied light is infrared light. For example, the applied light may be UV light having a wavelength ranging from 100 nm to 400 nm, such as 150 nm to 400 nm, or 200 nm to 400 nm, or 300 nm to 400 nm. In some instances, the applied UV light may be approximately 350 nm, such as 360 nm or 364 nm. Other types of cross-linkable functional groups may also be used, such as chemically activated cross-linkable functional groups, and the like.

Any convenient cross-linkable functional group may be used. In certain embodiments, the cross-linkable functional group is a functional group that, when activated, forms a reactive moiety. The reactive moiety may then react with another moiety (e.g., ligand, mesogenic ligand, nanoparticle, etc.) to form an attachment (e.g., covalent bond) between the cross-linkable functional group and the other moiety. In some cases, the reactive moiety is a moiety capable of forming a covalent bond to carbon. For example, the reactive moiety may be a nitrene, such as a reactive nitrene derived from an azide functional group (e.g., an azide cross-linkable functional group). A nitrene may form a covalent bond to carbon to produce an amine or amide. In some instances, the cross-linkable functional group includes an azide, such as, but not limited to, a tetrafluoro-arylazide group.

In certain embodiments, the mesogenic ligand has a structure of formula (I):

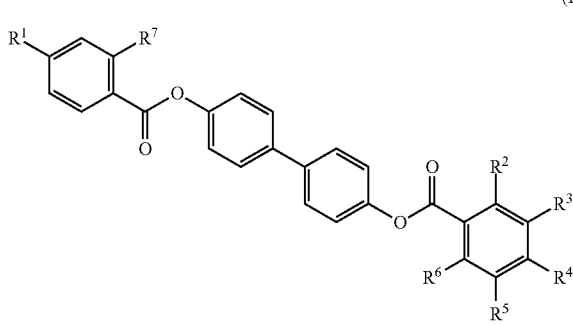

(I)

wherein $R^1$ and $R^7$ are each independently selected from, $C_1$-$C_8$ alkoxy, and $C_1$-$C_8$ alkoxy substituted with an amine or thiol group; and $R^2$, $R^3$, $R^4$, $R^5$ and $R^6$ are each independently selected from H, halogen, hydroxyl, azido, alkyl, substituted alkyl, alkenyl, substituted alkenyl, alkynyl, substituted alkynyl, $C_1$-$C_{12}$ alkoxy, substituted alkoxy, amino, substituted amino, cycloalkyl, substituted cycloalkyl, heterocycloalkyl, substituted heterocycloalkyl, aryl, substituted aryl, heteroaryl and substituted heteroaryl and combinations thereof.

In some instances, $R^1$ to $R^7$ are each independently selected from H, halo, azido, alkyl, substituted alkyl, alkoxy, and substituted alkoxy.

In some instances, $R^1$ is alkoxy, such as a $C_{1-12}$ alkoxy, $C_{1-10}$ alkoxy, $C_{1-8}$ alkoxy, $C_{1-6}$ alkoxy, or $C_{1-3}$ alkoxy. In some instances, $R^1$ is $C_5$ alkoxy, such as pentyloxy. In some instances, $R^1$ is $C_8$ alkoxy, such as octyloxy.

In some instances, $R^2$ is H or halo. In some instances, $R^2$ is H. $R^2$ is halo, such as fluoro.

In some instances, $R^3$ is H or halo. In some instances, $R^3$ is H. $R^3$ is halo, such as fluoro.

In some instances, $R^5$ is H or halo. In some instances, $R^5$ is H. $R^2$ is halo, such as fluoro.

In some instances, $R^6$ is H or halo. In some instances, $R^6$ is H. $R^2$ is halo, such as fluoro.

In some instances, $R^4$ is alkoxy or azido. In some instances, $R^4$ is azido. In some instances, $R^4$ is alkoxy, such as a $C_{1-12}$ alkoxy, $C_{1-10}$ alkoxy, $C_{1-8}$ alkoxy, $C_{1-6}$ alkoxy, or $C_{1-3}$ alkoxy. In some instances, $R^4$ is methoxy. In some instances, $R^4$ is $C_3$ alkoxy, such as propoxy. In some instances, $R^4$ is $C_8$ alkoxy, such as octyloxy.

In some instances, $R^2$, $R^3$, $R^5$ and $R^6$ are each H. In some instances, when $R^2$, $R^3$, $R^5$ and $R^6$ are each H, $R^4$ is alkoxy. In some instances, $R^2$, $R^3$, $R^5$ and $R^6$ are each halo, such as fluoro. In some instances, when $R^2$, $R^3$, $R^5$ and $R^6$ are each halo (e.g., fluoro), $R^4$ is azido.

In some instances, $R^7$ is substituted alkoxy, such as a substituted $C_{1-12}$ alkoxy, substituted $C_{1-10}$ alkoxy, substituted $C_{1-8}$ alkoxy, substituted $C_{1-6}$ alkoxy, or substituted $C_{1-3}$ alkoxy. In some instances, $R^7$ is substituted $C_3$ alkoxy, such as substituted propoxy. In some instances, $R^7$ is substituted $C_6$ alkoxy, such as substituted hexyloxy.

In some instances, the substituent on the substituted alkoxy is amino or substituted amino. In some instances, the substituent on the substituted alkoxy is amino, such that $R^7$ is aminoalkoxy, such as aminopropoxy (e.g., 3-aminopropoxy) or aminohexyloxy (e.g., 6-aminohexyloxy). In some embodiments, the mesogenic ligand is attached to a nanoparticle through the $R^7$ substituent. For instance, in embodiments where $R^7$ is an aminoalkoxy group, the mesogenic ligand may be attached to the nanoparticle through the amino group of the aminoalkoxy. In some instances, the substituent on the substituted alkoxy is thiol or substituted thiol. In some instances, the substituent on the substituted alkoxy is thiol, such that $R^7$ is thioalkoxy, such as thiopropoxy (e.g., 3-thiopropoxy) or thiohexyloxy (e.g., 6-thiohexyloxy). In some embodiments, the mesogenic ligand is attached to a nanoparticle through the $R^7$ substituent. For instance, in embodiments where $R^7$ is an thioalkoxy group, the mesogenic ligand may be attached to the nanoparticle through the thiol group of the thioalkoxy.

In certain embodiments, the mesogenic ligand has one of the following structures:

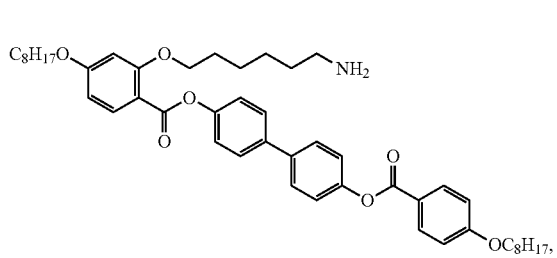

(L1)

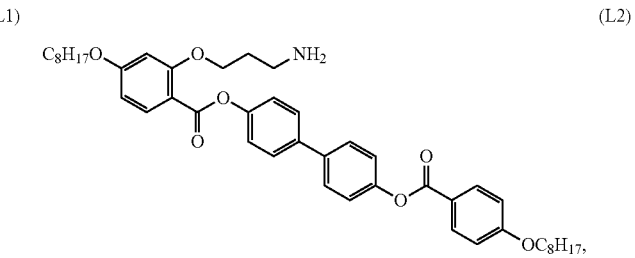

(L2)

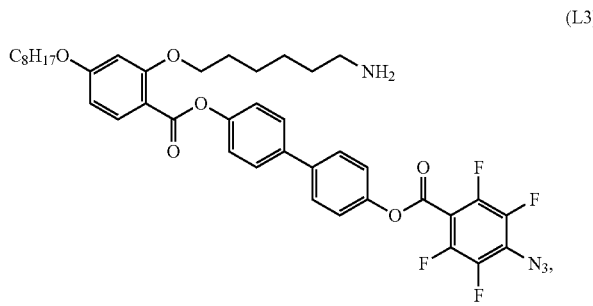

(L3)

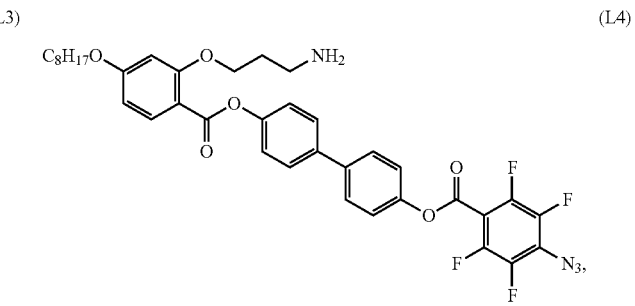

(L4)

-continued
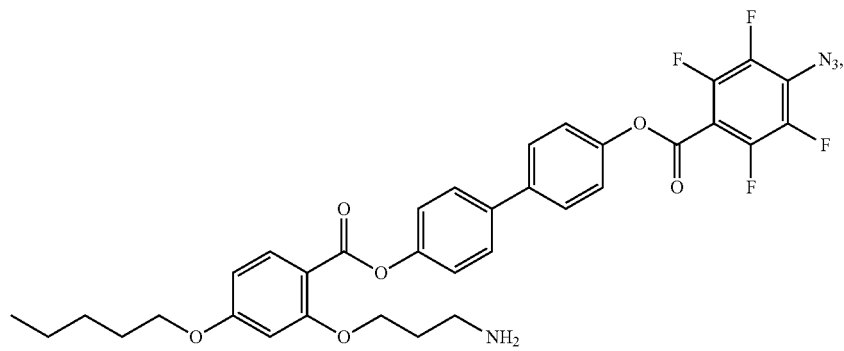
(L5)
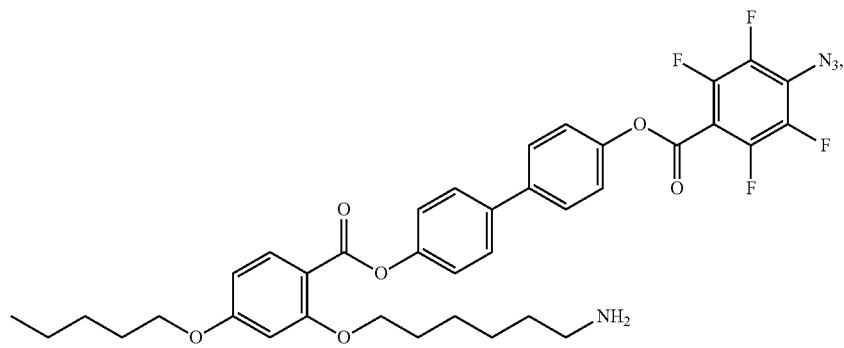
(L6)
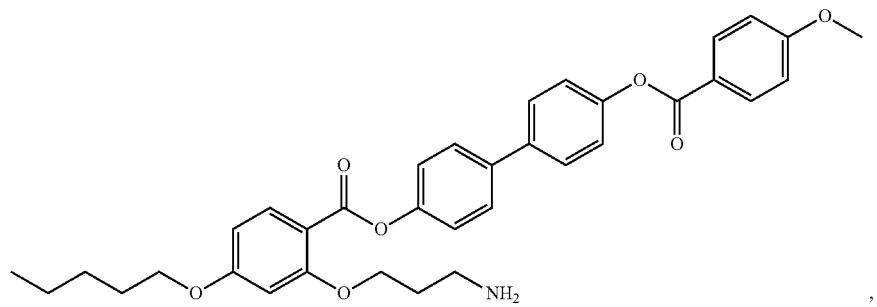
(L7)
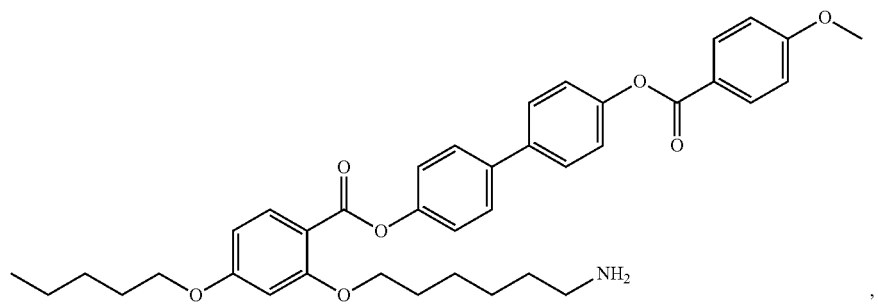
(L8)
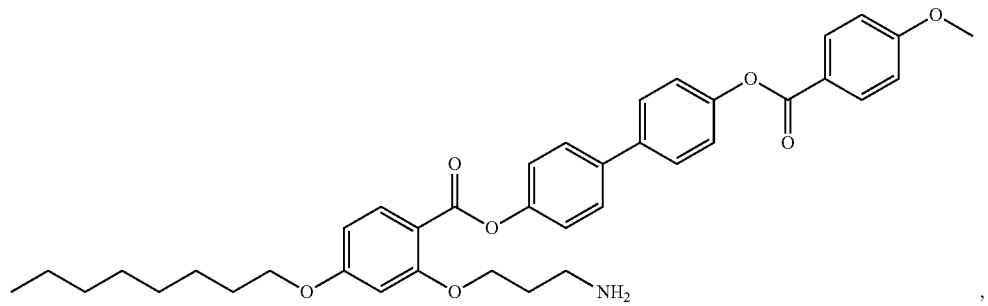
(L9)

-continued
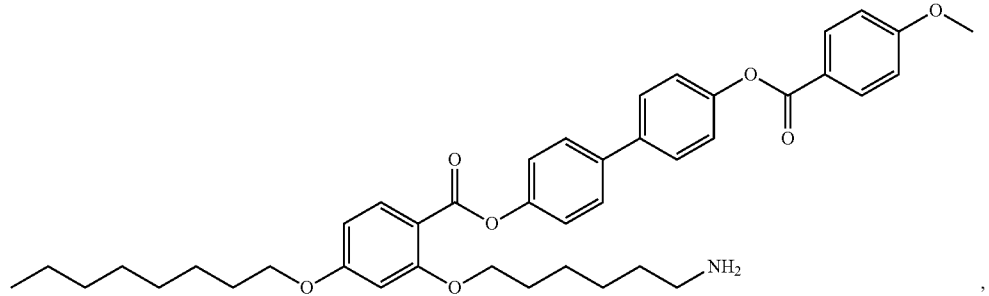
(L10)
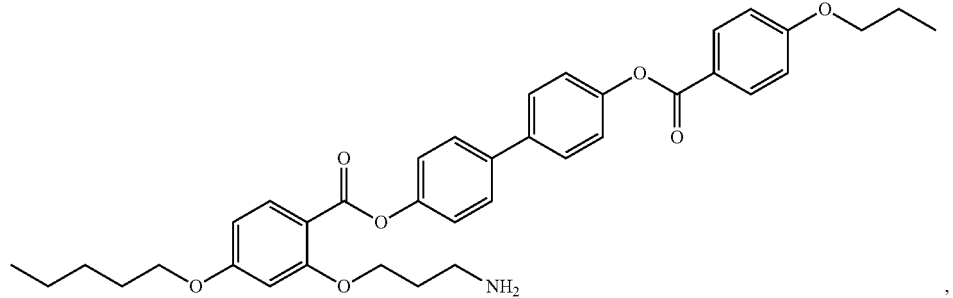
(L11)
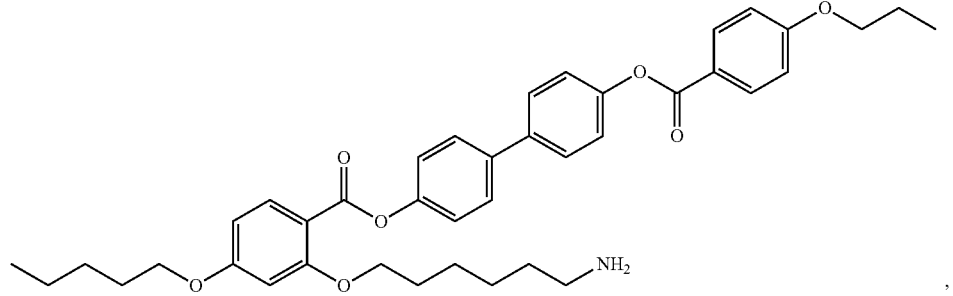
(L12)
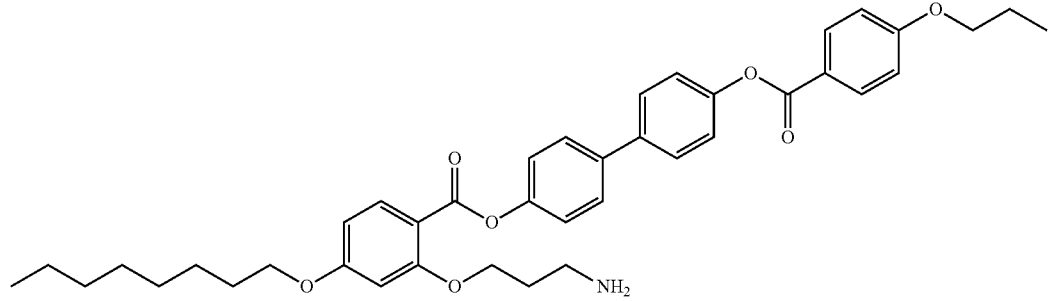
(L13)
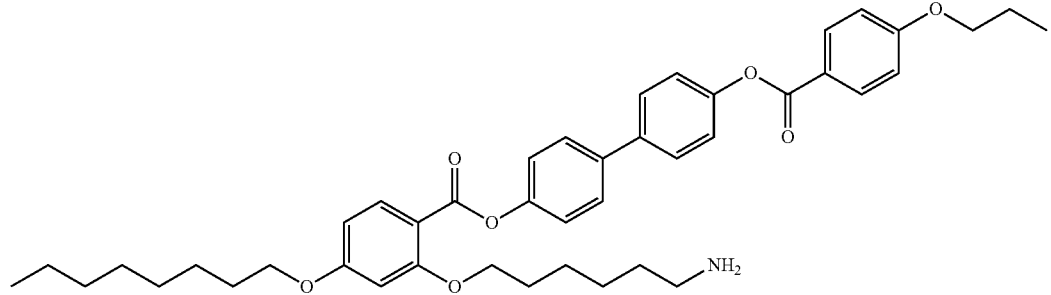
(L14)

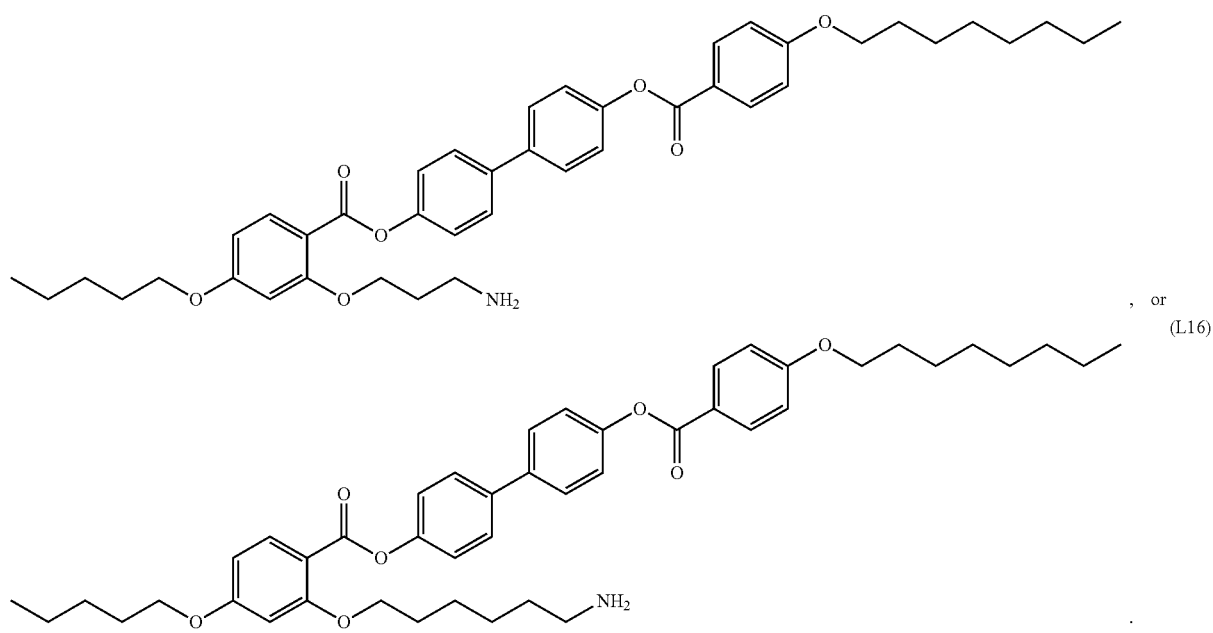
(L15)

, or

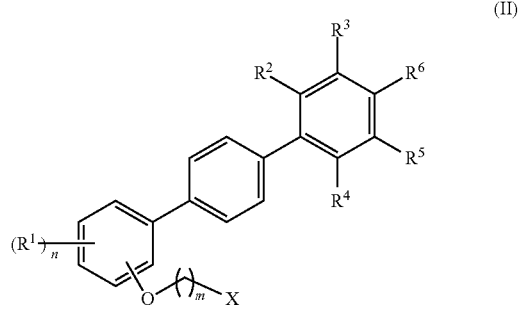
(L16)

In certain embodiments of the mesogenic ligand of the structure (L1), the amine group is replaced with a thiol group. In certain embodiments of the mesogenic ligand of the structure (L2), the amine group is replaced with a thiol group. In certain embodiments of the mesogenic ligand of the structure (L3), the amine group is replaced with a thiol group. In certain embodiments of the mesogenic ligand of the structure (L4), the amine group is replaced with a thiol group. In certain embodiments of the mesogenic ligand of the structure (L6), the amine group is replaced with a thiol group. In certain embodiments of the mesogenic ligand of the structure (L7), the amine group is replaced with a thiol group. In certain embodiments of the mesogenic ligand of the structure (L8), the amine group is replaced with a thiol group. In certain embodiments of the mesogenic ligand of the structure (L9), the amine group is replaced with a thiol group. In certain embodiments of the mesogenic ligand of the structure (L10), the amine group is replaced with a thiol group. In certain embodiments of the mesogenic ligand of the structure (L11), the amine group is replaced with a thiol group. In certain embodiments of the mesogenic ligand of the structure (L12), the amine group is replaced with a thiol group. In certain embodiments of the mesogenic ligand of the structure (L13), the amine group is replaced with a thiol group. In certain embodiments of the mesogenic ligand of the structure (L14), the amine group is replaced with a thiol group. In certain embodiments of the mesogenic ligand of the structure (L15), the amine group is replaced with a thiol group. In certain embodiments of the mesogenic ligand of the structure (L16), the amine group is replaced with a thiol group.

In some embodiments, the mesogenic ligand has a structure of formula (II):

(II)

wherein:
  $R^1$ are each independently selected H, halogen, hydroxyl, azido, alkyl, substituted alkyl, alkenyl, substituted alkenyl, alkynyl, substituted alkynyl, alkoxy, substituted alkoxy, amino, and substituted amino;
  $R^2$, $R^3$, $R^4$, $R^5$, and $R^6$ are each independently selected from H, halogen, hydroxyl, azido, alkyl, substituted alkyl, alkenyl, substituted alkenyl, alkynyl, substituted alkynyl, alkoxy, substituted alkoxy, amino, substituted amino, cycloalkyl, substituted cycloalkyl, heterocycloalkyl, substituted heterocycloalkyl, aryl, substituted aryl, heteroaryl, substituted heteroaryl, phosphate, substituted phosphate, phosphoryl, substituted phosphoryl, thiol and substituted thiol and combinations thereof;
  X is an amine or a thiol group;
  n is an integer from 1 to 4; and
  m is an integer from 1 to 14.

In some instances of formula (II), $R^1$ is alkoxy, such as a $C_{1-14}$ alkoxy, $C_{1-12}$ alkoxy, $C_{1-10}$ alkoxy, $C_{1-8}$ alkoxy, $C_{1-6}$ alkoxy, or $C_{1-3}$ alkoxy. In some instances, $R^1$ is $C_5$ alkoxy, such as pentyloxy. In some instances, $R^1$ is $C_4$ alkoxy, such as butyloxy. In some instances, $R^1$ is $C_1$ alkoxy, such as methoxy. In some instances, $R^1$ is substituted alkoxy, such as a substituted $C_{1-14}$ alkoxy, substituted $C_{1-12}$ alkoxy, substituted $C_{1-10}$ alkoxy, substituted $C_{1-8}$ alkoxy, or substituted $C_{1-6}$ alkoxy. In some instances, $R^1$ is substituted $C_6$ alkoxy, such as substituted hexyloxy. In some instances, $R^1$ is substituted $C_{12}$ alkoxy, such as substituted dodecyloxy. In some instances, the substituent on the substituted alkoxy is phosphate or substituted phosphate.

In some embodiments of formula (II), n is 1. In some cases, n is greater than 1, such as 2, 3 or 4.

In some instances of formula (II), m is 1 to 14 so as to provide a substituted $C_{1-14}$ alkoxy group, such as a substituted $C_{1-12}$ alkoxy, substituted $C_{1-10}$ alkoxy, substituted $C_{1-8}$ alkoxy, substituted $C_{1-6}$ alkoxy, or substituted $C_{1-3}$ alkoxy. In some instances, m is 2, so as to provide a substituted $C_2$ alkoxy, such as substituted ethoxy. In some instances, m is 3, so as to provide a substituted $C_3$ alkoxy, such as substituted propoxy. In some instances, m is 6 so as to provide a substituted $C_6$ alkoxy, such as substituted hexyloxy. In some instances, m is 12 so as to provide a substituted $C_{12}$ alkoxy, such as substituted dodecyloxy. In some instances, X on the substituted alkoxy is amino or substituted amino. In some instances, X on the substituted alkoxy is amino, such that the group is an aminoalkoxy, such as aminopropoxy (e.g., 3-aminopropoxy) or aminohexyloxy (e.g., 6-aminohexyloxy). In some instances, X on the substituted alkoxy is thiol or substituted thiol. In some instances, X on the substituted alkoxy is thiol, such that the group is a thioalkoxy, such as thiopropoxy (e.g., 3-thiopropoxy) or thiohexyloxy (e.g., 6-thiohexyloxy). In some embodiments, the mesogenic ligand is attached to a nanoparticle through the aminoalkoxy or thioalkoxy substituent. For instance, in embodiments where formula (II) includes an aminoalkoxy group, the mesogenic ligand may be attached to the nanoparticle through the amino group of the aminoalkoxy tether. In embodiments where formula (II) includes a thioalkoxy substituent, the mesogenic ligand may be attached to the nanoparticle through the thiol group of the thioalkoxy tether.

In some instances of formula (II), $R^2$ is H or halo. In some instances, $R^2$ is H. $R^2$ is halo, such as fluoro.

In some instances of formula (II), $R^3$ is H or halo. In some instances, $R^3$ is H. $R^3$ is halo, such as fluoro.

In some instances of formula (II), $R^4$ is H or halo. In some instances, $R^4$ is H. $R^4$ is halo, such as fluoro.

In some instances of formula (II), $R^5$ is H or halo. In some instances, $R^5$ is H. $R^5$ is halo, such as fluoro.

In some instances of formula (II), $R^6$ is alkoxy or azido. In some instances, $R^6$ is azido. In some instances, $R^6$ is alkoxy, such as a $C_{1-14}$ alkoxy, $C_{1-12}$ alkoxy, $C_{1-10}$ alkoxy, $C_{1-8}$ alkoxy, $C_{1-6}$ alkoxy, or $C_{1-3}$ alkoxy. In some instances, $R^6$ is $C_5$ alkoxy, such as pentyloxy. In some instances, $R^6$ is $C_4$ alkoxy, such as butyloxy. In some instances, $R^6$ is $C_1$ alkoxy, such as methoxy. In some instances, $R^6$ is substituted alkoxy, such as a substituted $C_{1-14}$ alkoxy, substituted $C_{1-12}$ alkoxy, substituted $C_{1-10}$ alkoxy, substituted $C_{1-8}$ alkoxy, or substituted $C_{1-6}$ alkoxy. In some instances, $R^6$ is substituted $C_6$ alkoxy, such as substituted hexyloxy. In some instances, $R^6$ is substituted $C_{12}$ alkoxy, such as substituted dodecyloxy. In some instances, the substituent on the substituted alkoxy is phosphate or substituted phosphate.

In some instances of formula (II), $R^2$, $R^3$, $R^4$ and $R^5$ are each H. In some instances, when $R^2$, $R^3$, $R^4$ and $R^5$ are each H, $R^6$ is alkoxy or substituted alkoxy.

In some instances, $R^2$, $R^3$, $R^4$ and $R^5$ are each halo, such as fluoro. In some instances, when $R^2$, $R^3$, $R^4$ and $R^5$ are each halo (e.g., fluoro), $R^6$ is azido.

In some embodiments, the mesogenic ligand of formula (II) has the structure of formula (III):

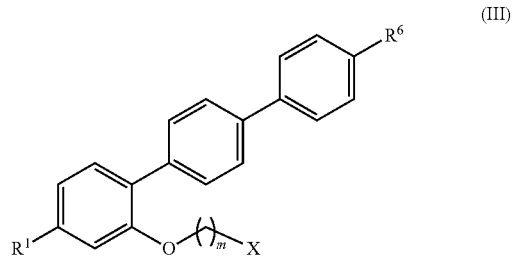

(III)

wherein:

$R^1$ is selected from halogen, hydroxyl, azido, alkyl, substituted alkyl, alkenyl, substituted alkenyl, alkynyl, substituted alkynyl, alkoxy, substituted alkoxy, amino, and substituted amino;

$R^6$ is selected from H, halogen, hydroxyl, azido, alkyl, substituted alkyl, alkenyl, substituted alkenyl, alkynyl, substituted alkynyl, alkoxy, substituted alkoxy, amino, substituted amino, cycloalkyl, substituted cycloalkyl, heterocycloalkyl, substituted heterocycloalkyl, aryl, substituted aryl, heteroaryl, substituted heteroaryl, phosphate, substituted phosphate, phosphoryl, substituted phosphoryl, thiol, and substituted thiol;

X is an amine or a thiol group; and m is an integer from 1 to 14.

In some instances of formula (III), $R^1$ is alkoxy, such as a $C_{1-14}$ alkoxy, $C_{1-12}$ alkoxy, $C_{1-10}$ alkoxy, $C_{1-8}$ alkoxy, $C_{1-6}$ alkoxy, or $C_{1-3}$ alkoxy. In some instances, $R^1$ is $C_5$ alkoxy, such as pentyloxy. In some instances, $R^1$ is $C_4$ alkoxy, such as butyloxy. In some instances, $R^1$ is $C_1$ alkoxy, such as methoxy. In some instances, $R^1$ is substituted alkoxy, such as a substituted $C_{1-14}$ alkoxy, substituted $C_{1-12}$ alkoxy, substituted $C_{1-10}$ alkoxy, substituted $C_{1-8}$ alkoxy, or substituted $C_{1-6}$ alkoxy. In some instances, $R^1$ is substituted $C_6$ alkoxy, such as substituted hexyloxy. In some instances, $R^1$ is substituted $C_{12}$ alkoxy, such as substituted dodecyloxy. In some instances, the substituent on the substituted alkoxy is phosphate or substituted phosphate.

In some instances of formula (III), m is 1 to 14 so as to provide a substituted $C_{1-14}$ alkoxy group, such as a substituted $C_{1-12}$ alkoxy, substituted $C_{1-10}$ alkoxy, substituted $C_{1-8}$ alkoxy, substituted $C_{1-6}$ alkoxy, or substituted $C_{1-3}$ alkoxy. In some instances, m is 2, so as to provide a substituted $C_2$ alkoxy, such as substituted ethoxy. In some instances, m is 3, so as to provide a substituted $C_3$ alkoxy, such as substituted propoxy. In some instances, m is 6 so as to provide a substituted $C_6$ alkoxy, such as substituted hexyloxy. In some instances, m is 12 so as to provide a substituted $C_{12}$ alkoxy, such as substituted dodecyloxy. In some instances, X on the substituted alkoxy is amino or substituted amino. In some instances, X on the substituted alkoxy is amino, such that the group is an aminoalkoxy, such as aminopropoxy (e.g., 3-aminopropoxy) or aminohexyloxy (e.g., 6-aminohexyloxy). In some instances, X on the substituted alkoxy is thiol or substituted thiol. In some instances, X on the substituted alkoxy is thiol, such that the group is a thioalkoxy, such as thiopropoxy (e.g., 3-thiopropoxy) or thiohexyloxy (e.g., 6-thiohexyloxy). In some embodiments, the mesogenic ligand is attached to a nanoparticle through the aminoalkoxy or thioalkoxy substituent. For instance, in embodiments where formula (III) includes an aminoalkoxy group, the mesogenic ligand may be attached to the nanoparticle through the amino group of the aminoalkoxy tether. In embodiments where formula (III) includes a thioalkoxy group, the mesogenic ligand may be attached to the nanoparticle through the amino group of the aminoalkoxy tether.

In some instances of formula (III), $R^6$ is alkoxy or azido. In some instances, $R^6$ is azido. In some instances, $R^6$ is alkoxy, such as a $C_{1-14}$ alkoxy, $C_{1-12}$ alkoxy, $C_{1-10}$ alkoxy, $C_{1-8}$ alkoxy, $C_{1-6}$ alkoxy, or $C_{1-3}$ alkoxy. In some instances, $R^6$ is $C_5$ alkoxy, such as pentyloxy. In some instances, $R^6$ is $C_4$ alkoxy, such as butyloxy. In some instances, $R^6$ is $C_1$ alkoxy, such as methoxy. In some instances, $R^6$ is substituted alkoxy, such as a substituted $C_{1-14}$ alkoxy, substituted $C_{1-12}$ alkoxy, substituted $C_{1-10}$ alkoxy, substituted $C_{1-8}$ alkoxy, or substituted $C_{1-6}$ alkoxy. In some instances, $R^6$ is substituted $C_6$ alkoxy, such as substituted hexyloxy. In some instances, $R^6$ is substituted $C_{12}$ alkoxy, such as substituted dodecyloxy. In some instances, the substituent on the substituted alkoxy is phosphate or substituted phosphate.

In certain embodiments of the mesogenic ligand of formulae (II) or (III), $R^1$ is $C_1$-$C_{12}$ alkoxy. In certain embodiments of the mesogenic ligand of formulae (II) or (III), $R^6$ is $C_1$-$C_{12}$ alkoxy.

In certain embodiments, the mesogenic ligand of formulae (II) or (III) has one of the following structures:

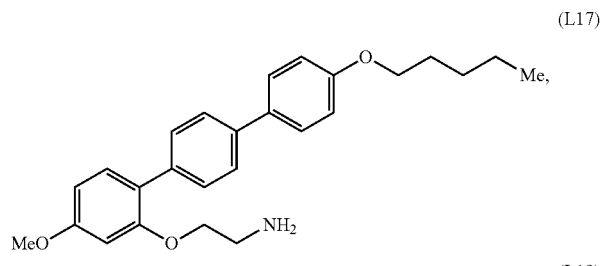
(L17)

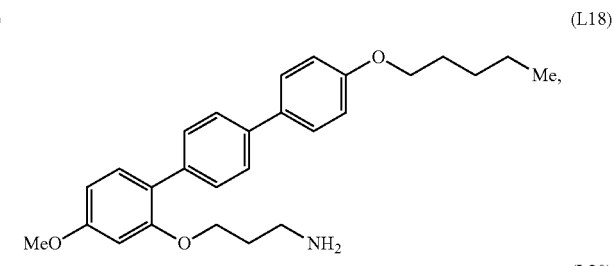
(L18)

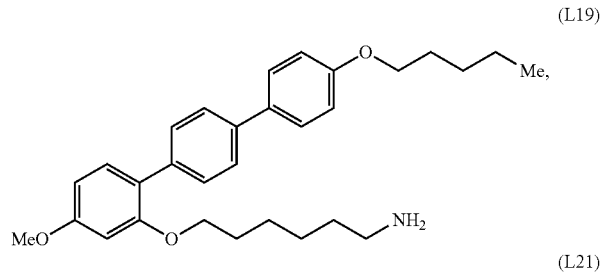
(L19)

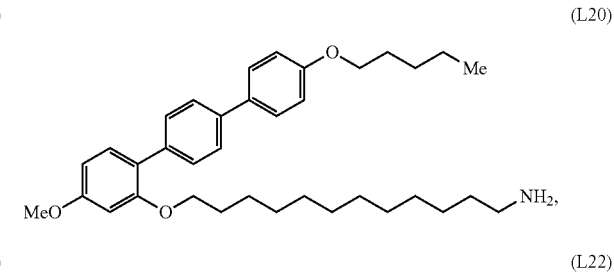
(L20)

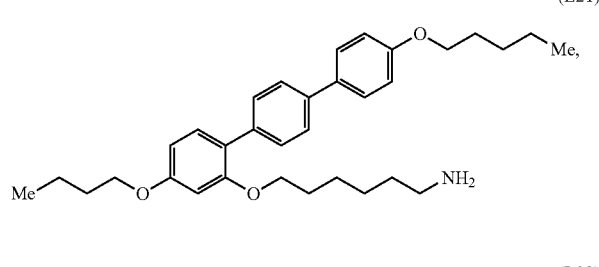
(L21)

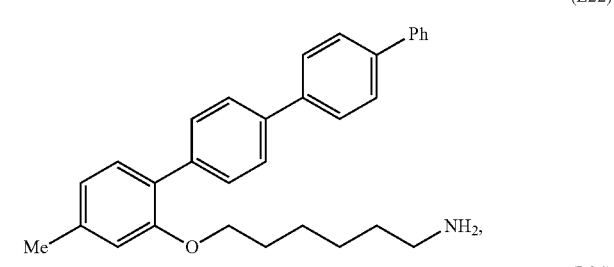
(L22)

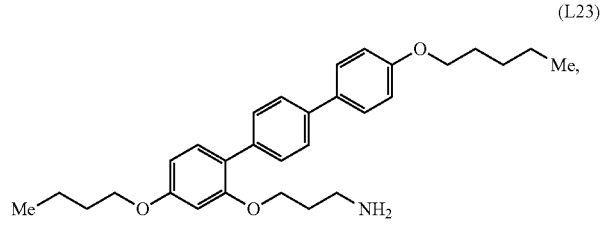
(L23)

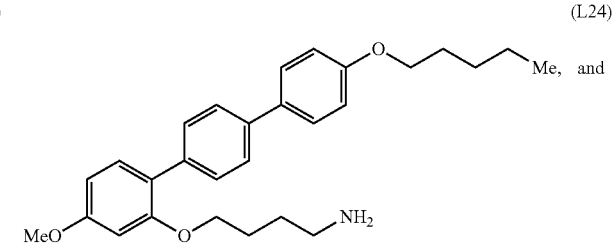
(L24)

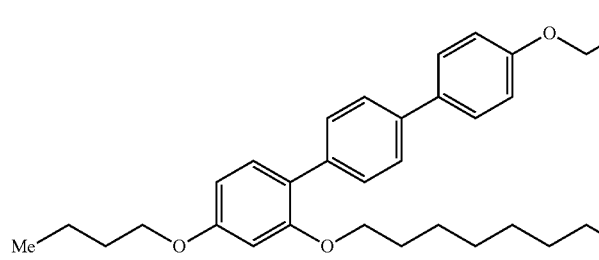
(L25)

In certain embodiments of the mesogenic ligand of the structure (L17), the amine group is replaced with a thiol group. In certain embodiments of the mesogenic ligand of the structure (L18), the amine group is replaced with a thiol group. In certain embodiments of the mesogenic ligand of the structure (L19), the amine group is replaced with a thiol group. In certain embodiments of the mesogenic ligand of the structure (L20), the amine group is replaced with a thiol group. In certain embodiments of the mesogenic ligand of the structure (L21), the amine group is replaced with a thiol group. In certain embodiments of the mesogenic ligand of the structure (L22), the amine group is replaced with a thiol group. In certain embodiments of the mesogenic ligand of the structure (L23), the amine group is replaced with a thiol group. In certain embodiments of the mesogenic ligand of the structure (L24), the amine group is replaced with a thiol group. In certain embodiments of the mesogenic ligand of the structure (L25), the amine group is replaced with a thiol group.

In some embodiments, the mesogenic ligand of formulae (II) or (III) is the following ligand:

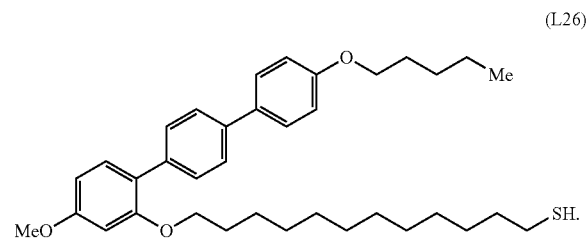 [SMILES: CCCCCOc1ccc(-c2ccc(-c3ccc(OC)cc3OCCCCCCCCCCCCS)cc2)cc1]

(L26)

As described above, the solid foams may be composed of nanoparticles having substantially the same physical and chemical characteristics, or in other embodiments, may be composed of nanoparticles having different physical and/or chemical characteristics. For example, physical and/or chemical characteristics of the nanoparticles that may be the same or may vary as described above may include, but are not limited to, size, shape, composition, ligand attached to the surface of the nanoparticle, mesogenic ligand attached to the surface of the nanoparticle, cross-linkable functional group, combinations thereof, and the like. For instance, a nanoparticle may include a plurality of ligands attached to the surface of the nanoparticle, where the ligands are substantially the same. In other instances, the nanoparticle may include a plurality of ligands attached to the surface of the nanoparticle, where the ligands are different (e.g., ligands having different chemical structures and/or functional groups, such as cross-linkable functional groups as described herein). For example, combinations of various ligands may be attached to the surface of the same nanoparticle. In some instances, the ligands attached to the surface of the nanoparticle do not include any cross-linkable groups. In some instances, the ligands exhibit π-π interactions between the aromatic groups of the ligands attached to the surface of the nanoparticle.

Compositions

Aspects of the present disclosure include compositions comprising a subject multi-compartment solid foam comprising mesogenic ligand-functionalized nanoparticles and a liquid crystalline liquid. In some cases, the mesogenic ligand is of the formulae (I), (II) or (III). In some cases, the mesogenic ligand has the structure of any of (L1) to (L26). In some cases, the mesogenic ligand has the structure of any of (L1) to (L25), wherein the amine moiety has been replaced with a thiol moiety. In certain embodiments, the mesogenic ligand has the structure of (L26). Solid foams of the present disclosure may have a closed foam configuration with multiple compartments that partially or completely encloses a space or material. In certain cases, the subject compositions include liquid crystalline liquid throughout the structure (e.g. inside and outside of the closed foam). In certain embodiments, one or more compartments may enclose a material, such as an active agent, a dye or a photonic material. In some instances, the active agent is a drug. Multi-encapsulation of the active agent inside multiple compartments of the closed cell foam may facilitate one or more of: delivery of the active agent to a desired site; formulation of the active agent into a desired formulation; increased stability of the active agent; controlled release of the active agent; delayed release of the active agent; and the like. Multi-encapsulation of a dye or photonic material inside the foam may facilitate one or more of: application of the dye or photonic material to a surface of a substrate; tuning (e.g., changing, such as dynamically changing) the emission spectrum of the dye or photonic material, and the like.

Closed foams of the present disclosure may also enclose other types of material within multiple compartments, such as, but not limited to, a liquid crystal, a dye, a photonic material, an ink, combinations thereof, and the like.

Aspects of the present disclosure include compositions that include the multi-compartment solid foam comprising mesogenic ligand-functionalized nanoparticles as disclosed herein. The composition may include the multi-compartment solid foam and a liquid crystalline liquid. In some instances, the composition includes the solid foam dispersed in the liquid. In some embodiments, the concentration of mesogenic-ligand-functionalized nanoparticles in the liquid crystalline liquid is from 0.075 wt % to 0.3 wt %, such as 0.075 wt %, 0.08 wt %, 0.085 wt %, 0.09 wt %, 0.095 wt %, 0.1 wt %, 0. 0.15 wt %, 0.2 wt %, 0.25 wt % or 0.3 wt %.

In some embodiments, the solid foam in the composition is a closed-cell foam. In other embodiments, the solid foam in the composition is an open-cell foam. Closed cell foams of the present disclosure may enclose the liquid crystalline liquid within its compartments i.e. multi-compartment encapsulation of the liquid crystalline liquid. In some instances, the enclosed liquid crystalline liquid may be a liquid crystal having a certain phase, such as, but not limited to, a liquid crystal in an isotropic phase, a liquid crystal in a nematic phase, a liquid crystal in a cholesteric phase, and the like. A liquid crystal in a cholesteric phase may also be referred to as a liquid crystal in a chiral nematic phase. Liquid crystals in a cholesteric (chiral nematic) phase exhibit a twisting of the liquid crystal molecules perpendicular to the director, with the molecular axis of the liquid crystals parallel to the director.

In some embodiments, the solid foam has a droplet configuration suspended in the liquid crystalline liquid. Droplets suspended in the liquid crystalline liquid may have various shapes and sizes. For instance, droplet shapes include, but are not limited to, regular shapes such as spherical, ellipsoid, cylinder, cone, cube, cuboid, pyramidal, torus shapes, and the like. In other embodiments, the droplet may have an irregular shape. In certain embodiments, solid foam structure droplets suspended in the liquid crystalline liquid have a spherical surface (i.e., a spherical external surface).

The size of the foam droplets may be measured as the largest dimension of the foam microstructure (e.g., length, width, or height), or for spherical foam droplets (e.g., spherical surfaces), may be measured as the average diameter of the foam droplet. By "average" is meant the arithmetic mean. In certain instances, the spherical surface of the foam droplet has an average diameter of 1 μm to 50 μm. In certain instances, the surface of the foam droplet has an average diameter of 50 μm or less, such as 40 μm or less, or 30 μm or less, or 20 μm or less, or 10 μm or less, or 9 μm or less, or 8 μm or less, or 7 μm or less, or 6 μm or less, or 5 μm or less, or 4 μm or less, or 3 μm or less, or 2 μm or less, or 1 μm or less. In certain instances, the surface of the foam droplet has an average diameter of 50 μm or more, such as 60 μm or more, or 70 μm or more, or 80 μm or more, or 90 μm or more, or 100 μm or more, or even more.

In some instances, the composition includes a solvent. Any convenient solvent may be used, depending on the desired composition of three-dimensional structures. Examples of solvents include, but are not limited to, organic solvents, such as toluene, dimethylbenzene, methylisopropylbenzene, chloroform, mixtures thereof, and the like. In some instances, the solvent is toluene.

Aspects of the present disclosure also include compositions for producing a solid foam as described herein. In certain embodiments, the composition includes nanoparticles and a liquid crystalline fluid (e.g., a liquid crystalline liquid). The nanoparticles in the composition for producing the three-dimensional structures may be any of the nanoparticles as described herein. For instance, the nanoparticles may be ligand-functionalized nanoparticles, such as mesogenic ligand-functionalized nanoparticles as described herein.

As disclosed herein, the composition includes a liquid crystalline fluid (e.g., a liquid crystalline liquid). The liquid crystalline fluid may be composed of a liquid crystal. In certain cases, the liquid crystal has a phase transition, such as a phase transition between an isotropic phase and a nematic phase (or vice versa). By "isotropic phase" or "isotropic" is meant a liquid crystal phase where the liquid crystals have no significant positional order or directional order. By "nematic phase" or "nematic" is meant a liquid crystal phase where the liquid crystals have no significant positional order, but have a detectable directional order. In some instances, the liquid crystal phase transition occurs in response to a stimulus applied to the liquid crystals. The stimulus may be any convenient stimulus that can induce a phase transition in the liquid crystals, such as, but not limited to, a change in temperature, an electrical stimulus, a magnetic stimulus, combinations thereof, and the like. In some cases, the stimulus that induces the phase transition in the liquid crystal is a change in temperature, e.g., heating or cooling. As such, the liquid crystalline fluid may be composed of a liquid crystal that has a temperature dependent phase transition. In some embodiments, the liquid crystalline fluid undergoes a phase transition from an isotropic phase to a nematic phase when the temperature of the liquid crystalline fluid is reduced to below the phase transition temperature. In some embodiments, the liquid crystalline fluid undergoes a phase transition from a nematic phase to an isotropic phase when the temperature of the liquid crystalline fluid is increased to above the phase transition temperature.

In certain embodiments, a temperature dependent liquid crystalline fluid has a phase transition temperature that is lower than the phase transition temperature of a mesogenic ligand (or a mesogenic ligand-functionalized nanoparticle) as described herein. As such, in some instances, the phase transition temperature (e.g., melting temperature or clearing point) of the mesogenic ligand (or mesogenic ligand-functionalized nanoparticle) is greater than the phase transition temperature of the liquid crystalline fluid. In certain instances, a temperature dependent liquid crystalline fluid has a phase transition temperature (e.g., for a phase transition between an isotropic phase and a nematic phase) ranging from 20° C. to 50° C., such as 25° C. to 45° C., or 30° C. to 40° C. In some cases, a temperature dependent liquid crystalline fluid has a phase transition temperature (e.g., for a phase transition between an isotropic phase and a nematic phase) of approximately 35° C., such as 34° C. or 33° C. Examples of liquid crystalline fluids that have a temperature dependent phase transition include, but are not limited to, 4-cyano-4'-pentylbiphenyl (5CB), and the like.

Methods

Aspects of the present disclosure include methods of producing a multi-compartment solid foam comprising mesogenic ligand-functionalized nanoparticles as described herein. In some cases, the mesogenic ligand is of the formulae (I), (II) or (III). In some cases, the mesogenic ligand has the structure of any of (L1) to (L26). In some cases, the mesogenic ligand has the structure of any of (L1) to (L25), wherein the amine moiety has been replaced with a thiol moiety. In certain embodiments, the mesogenic ligand has the structure of (L26). The method of producing the solid foam includes dispersing the nanoparticles in a liquid crystalline liquid (e.g., 5BC, and the like). The nanoparticles used in the methods for producing the three-dimensional structures may be any of the nanoparticles as described herein. For instance, the nanoparticles may be ligand-functionalized nanoparticles, such as mesogenic ligand-functionalized nanoparticles as described herein.

The nanoparticles may be dispersed in the liquid crystalline fluid using any convenient method, such as, but not limited to, mixing, vortexing, shaking, applying sound energy (also referred to as "sonication" herein), combinations thereof, and the like. In some cases, the method includes applying sound energy to the nanoparticles in the liquid crystalline fluid to disperse the nanoparticles in the liquid crystalline fluid. The nanoparticles may be dispersed in the liquid crystalline fluid such that the nanoparticles are substantially evenly distributed throughout the liquid crystalline fluid. For example, a mixture of the nanoparticles and liquid crystalline liquid may be substantially homogeneous. In certain embodiments, the nanoparticles are dispersed in the liquid crystalline fluid at room temperature (e.g., ~25° C.). In other cases, the nanoparticles are dispersed in the liquid crystalline fluid at a temperature other than room temperature, e.g., lower or higher than room temperature. In some instances, the nanoparticles are dispersed in the liquid crystalline fluid at a temperature higher than room temperature. In certain embodiments, the nanoparticles are dispersed in the liquid crystalline fluid at a temperature where the nanoparticles are present in a desired phase of the liquid crystalline fluid, such as an isotropic phase. For instance, embodiments of the methods include dispersing the nanoparticles in the liquid crystalline fluid at a temperature where the nanoparticles are present in an isotropic phase of the liquid crystalline fluid. In certain aspects, the temperature where the nanoparticles are present in an isotropic phase of the liquid crystalline fluid is a temperature above the phase transition temperature of the liquid crystalline fluid, such as a temperature ranging from 20° C. to 50° C., such as 25° C. to 45° C., or 30° C. to 40° C., such as a temperature of approximately 45° C., for example 43° C., 44° C., 45° C. or 46° C. In some instances, after dispersion the mixtures are moved to an oven heated to 50° C.

The method of producing the solid foams described herein also includes inducing a phase transition in the liquid crystalline fluid from an isotropic phase to a nematic phase, and cooling the dispersion of mesogenic ligand-functionalized nanoparticles in the liquid crystalline liquid, at a rate configured to produce a subject multi-compartment solid foam. Thus, the method may include inducing a phase transition from an isotropic phase to a nematic phase in the liquid crystalline liquid, and cooling the dispersion.

In some instances, inducing a phase transition in the liquid crystalline liquid is performed by applying a stimulus to the liquid crystalline liquid. The stimulus may be any convenient stimulus that can induce a phase transition in the liquid crystals, such as, but not limited to, a change in temperature, an electrical stimulus, a magnetic stimulus, combinations thereof, and the like. In some cases, inducing the phase transition in the liquid crystalline liquid is accomplished by changing the temperature of the liquid crystalline liquid, e.g., heating or cooling the liquid crystalline liquid. In certain instances, inducing the phase transition in the liquid crystalline liquid is accomplished by decreasing the temperature of the liquid crystalline liquid to a temperature below the phase transition temperature of the liquid crystalline liquid. Reducing the temperature of the liquid crystalline liquid to a temperature below the phase transition temperature of the liquid crystalline liquid may induce a phase transition of the liquid crystalline liquid from an isotropic phase to a nematic phase. In some cases, at the isotropic to nematic phase transition in a homogeneous liquid crystalline liquid, domains of nematic ordering form and grow as the liquid crystalline liquid is cooled through the transition temperature. In some instances, multiple nematic domains nucleate within the shrinking isotopic phase during the transition from the isotropic phase to the nematic phase (e.g. see FIG. 5, panel J). Without being bound to any particular theory, experiments described herein indicate that as the multiple nematic domains grow in size, the particles are pushed together at multiple interior interfaces, leading to the formation of multiple thin-walled cells or compartments within a larger droplet, thus forming a subject solid foam structure (e.g. see FIG. 4, panel A).

In certain instances, the dispersion of mesogenic ligand-functionalized nanoparticles in the liquid crystalline liquid are cooled at a rate from 7° C./min to 30° C./min to produce a subject solid foam structure. In some cases, the dispersion is cooled at less than 30° C./min, such as 29° C./min or less, or 28° C./min or less, or 27° C./min or less, or 26° C./min or less, or 25° C./min or less, or 24° C./min or less, or 23° C./min or less, or 22° C./min or less, or 21° C./min or less, or 20° C./min or less, or 19° C./min or less, or 18° C./min or less, or 17° C./min or less, or 16° C./min or less, or 15° C./min or less, or 14° C./min or less, or 13° C./min or less, or 12° C./min or less, or 11° C./min or less, or 10° C./min or less, or 9° C./min or less, or 8° C./min or less, or 7° C./min or less. In some cases, the dispersion is cooled at a rate of 7° C./min. In some cases, the dispersion is cooled at a rate of 15° C./min. In some cases, the dispersion is cooled at a rate of 20° C./min. In some cases, the dispersion is cooled at a rate of 30° C./min.

Figure 3:
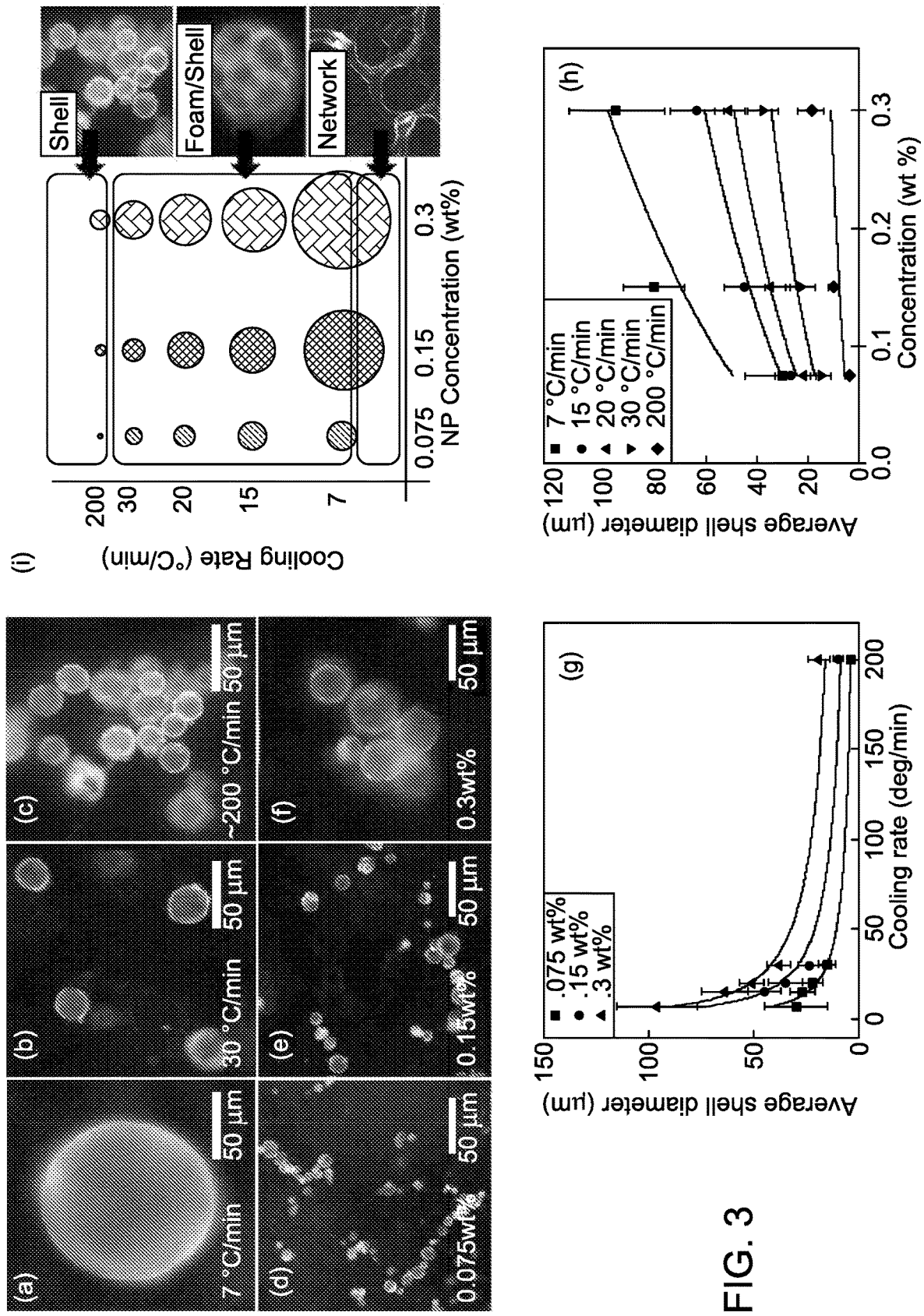
FIG. 3, panels A-C, shows representative fluorescence microscopy images of spherical shells formed from mesogenic-ligand functionalized quantum dots at a concentration of 0.3% in 5CB at the indicated cooling rates.

The inventors found that the size of the solid foams can be controlled by the cooling rate of the dispersion (e.g. see FIG. 3, panels A-C, G and I). The inventors also found that the final size of the solid foam structure can be controlled by the concentration of the nanoparticles in the liquid crystalline liquid (e.g. see FIG. 3, panels D-F, H and I).

In certain instances, the concentration of mesogenic ligand-functionalized nanoparticles dispersed in the liquid crystalline liquid is from 0.075 wt % to 0.3 wt %. In some embodiments, the concentration of mesogenic ligand-functionalized nanoparticles dispersed in the liquid crystalline liquid is 0.075 wt % or more, such as 0.08 wt % or more, 0.085 wt % or more, 0.09 wt % or more, 0.095 wt % or more, 0.1 wt % or more, 0.15 wt % or more, 0.2 wt % or more, 0.25 wt % or more, or 0.3 wt %, or more. In some cases, the concentration of mesogenic ligand-functionalized nanoparticles in the liquid crystalline liquid is 0.075 wt %. In some cases, the concentration of mesogenic ligand-functionalized nanoparticles in the liquid crystalline liquid is 0.15 wt %. In some cases, the concentration of mesogenic ligand-functionalized nanoparticles in the liquid crystalline liquid is 0.3 wt %.

In certain embodiments of the method, the mesogenic ligand-functionalized nanoparticles are dispersed in a solvent before dispersing in the liquid crystalline liquid. Any convenient solvent may be used, depending on the desired composition of solid foam structures. Examples of solvents include, but are not limited to, organic solvents, such as toluene, dimethylbenzene, methylisopropylbenzene, chloroform, mixtures thereof, and the like. In some instances, the solvent is toluene.

As described above, in certain embodiments, the functionalized nanoparticles may include a mesogenic ligand having a cross-linkable functional group. As such, embodiments of the method may further include crosslinking the mesogenic ligand-functionalized nanoparticles in the solid foam. For instance, after the formation of the solid foam, the cross-linkable functional group may be activated by applying an appropriate stimulus to the cross-linkable functional group of the nanoparticle. In certain embodiments, the cross-linkable functional group is a light activated cross-linkable functional group. As such, certain embodiments of the methods include applying light to the light activated cross-linkable functional group sufficient to activate cross-linking of the light activated cross-linkable functional group. Where the light activated cross-linkable functional group is activated by UV light, the method includes applying ultraviolet (UV) light. For example, the method may include applying UV light having a wavelength ranging from 100 nm to 400 nm, such as 150 nm to 400 nm, or 200 nm to 400 nm, or 300 nm to 400 nm. In some instances, the method includes applying UV light having a wavelength of approximately 350 nm, or 360 nm or 364 nm. In other embodiments, the stimulus applied to the cross-linkable functional group may include visible light, infrared light, a chemical stimulus, combinations thereof, etc.

Aspects of the method of producing the solid foams may further include separating the produced solid foam from the liquid used to produce the foam. Any convenient separation method may be used to separate the foam from the liquid crystalline liquid. For example, the separation method may include filtering, centrifuging, chromatography, extraction, and the like. In some instances, separating the foams includes adding the produced foams to a solvent. The solvent used may added in a large excess volume as compared to the volume of liquid crystalline liquid used to produce the foams to substantially disperse the liquid crystalline liquid. Examples of solvents include, but are not limited to, organic solvents, such as toluene, dimethylbenzene, methylisopropylbenzene, methanol, ethyl acetate, chloroform, mixtures thereof, and the like. In some instances, the solvent is toluene.

Utility

The subject solid foam composites, compositions and methods find use in a variety of different applications, particularly certain applications where a very light structural material is required. For example, the solid foams, compositions and methods find use in photonic material applications, such as, but not limited to, light emitting devices that are components of video displays, lights, etc. The solid foams may also find use in magnetic particle applications, when the foams are composed of magnetic nanoparticles. The solid foams may further find use as novel luminescent coatings. In these embodiments, the foams may be provided on a surface of a substrate. For instance, the solid foams may be disposed on a surface of the substrate, such as arranged as a layer of three-dimensional microstructures on a surface of the substrate. The substrate may be any desired type of substrate where luminescence is desired.

In certain embodiments, the solid foams find use in a light emitting device which is a component of a light, such as a light emitting diode (LED). As described above, the solid foams include nanoparticles, such as quantum dots, and as such, the light emitting device may be a component of a quantum dot LED (QD-LED). In some cases, using the solid foams disclosed herein in an LED may facilitate an increase in the possible color spectrum of the LED. For instance, the emission spectrum of the LED may depend on the size of the solid foam, and as such, the emission color of the LED may be tuned depending on the size of the solid foam composite. In some embodiments, the solid foams may be used as a coating on a surface of a conventional LED (e.g., a QD coating). Light emitted from the conventional LED may photo-excite the QD coating, thus causing the solid foam in the QD coating to emit light of a different wavelength.

In other embodiments, the solid foam may emit light via direct electrical excitation. For example, an electric field may be applied to the solid foam (e.g., QD microstructures), thus causing emission of light from the solid foam.

In some instances, the light emitting device is a component of a video display. As described above, the solid foams include nanoparticles, such as quantum dots, and as such, the light emitting device may be a component of a quantum dot video display. In some cases, the quantum dot video display may include the solid foam of the present disclosure as a filter for conventional LEDs. For example, as described above, light emitted from a conventional LED may photo-excite the QD-containing solid foam, thus causing the foam to emit light of a different wavelength. In other embodiments, the quantum dot video display may include the solid foams of the present disclosure, where the foams emit light via direct electrical excitation, as described above. In certain embodiments, quantum dot-containing solid foams are characterized by pure and saturated emission colors with narrow bandwidth, and thus may facilitate production of a QD video display that has high color purity and efficiency, as compared to conventional LED or OLED video displays.

As described above, in certain instances, the spacing between adjacent nanoparticles is selected so as to minimize shifts in the emission spectrum of the nanoparticles. As such, the solid foams of the present disclosure find use in facilitating the production of light emitting devices that have pure and saturated emission colors with narrow bandwidth as described above. In addition, in certain instances, the spacing between adjacent nanoparticles is selected so as to minimize energy losses due to fluorescence resonance energy transfer (FRET). As such, the solid foams of the present disclosure find use in facilitating the production of light emitting devices that are more efficient as compared to conventional light emitting devices.

Solid foams of the present disclosure also find use in applications such as the multi-compartment encapsulation of a dye or photonic material. Encapsulation of a dye or photonic material inside the multiple compartments of the subject solid foams may facilitate one or more of: application of the dye or photonic material to a surface of a substrate; tuning (e.g., changing, such as dynamically changing) the emission spectrum of the dye or photonic material; and the like. For example, encapsulation of a dye in a solid foam of the present disclosure may be used to produce a light activated dye, such as a laser light activated dye. Exposure of the light activated dye to a light source (e.g., a laser) may photo-excite the foams (e.g., QD-containing three-dimensional microstructures), thus causing the foams to emit light.

Solid foams of the present disclosure also find use in applications such as the multi-compartment encapsulation of active agents. Encapsulation of the active agent inside the multiple compartments of the solid foams may facilitate one or more of: delivery of the active agent to a desired site; formulation of the active agent into a desired formulation; increased stability of the active agent; controlled release of the active agent; delayed release of the active agent; and the like.

Solid foam composites, compositions and methods of the present disclosure also find use in applications such as optical imaging. For instance, solid foams may find use as probes for optical imaging, contrast agents, or as detectable labels for labeling biological tissues. In some instances, the solid foams, compositions and methods of the present disclosure find use in optical imaging applications where dynamic control of the optical properties of the solid foam is desired, such as by applying a physical, electrical, magnetic, etc. stimulus to the solid foam to alter the optical properties of the mesogenic ligands.

As can be appreciated from the disclosure provided above, embodiments of the present invention have a wide variety of applications. Accordingly, the examples presented herein are offered for illustration purposes and are not intended to be construed as a limitation on the invention in any way. Those of ordinary skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by mass, molecular mass is mass average molecular mass, temperature is in degrees Celsius, and pressure is at or near atmospheric.

Notwithstanding the appended claims, the disclosure set forth herein is also described by the following clauses.

Clause 1. A composite comprising, a multi-compartment solid foam, wherein the solid foam comprises mesogenic ligand-functionalized nanoparticles.

Clause 2. The composite of Clause 1, wherein the solid foam is a closed-cell foam.

Clause 3. The composite of Clause 1, wherein the solid foam is an open-cell foam.

Clause 4. The composite of any of Clauses 1 to 3, wherein the solid foam has a dimension of 1 µm to 50 µm.

Clause 5. The composite of any one of Clauses 1 to 4, wherein the mesogenic ligand-functionalized nanoparticles have an average diameter of 1 nm to 100 nm.

Clause 6. The composite of any one of Clauses 1 to 5, wherein the mesogenic ligand-functionalized nanoparticles are composed of a material selected from a semiconductor material, a metal, a metal oxide, a metalloid, a metal coated material, an oxide, a magnetic material, a nanosome, a dielectric material and a polymer, or combinations thereof.

Clause 7. The composite of Clause 6, wherein the mesogenic ligand-functionalized nanoparticles are composed of cadmium selenide (CdSe), zinc sulfide (ZnS), or combinations thereof.

Clause 8. The composition of Clause 6, wherein the mesogenic ligand-functionalized nanoparticles are composed of gold nanoparticles.

Clause 9. The composite of any one of Clauses 1 to 8, wherein the mesogenic ligand-functionalized nanoparticles further comprise non-mesogenic ligands.

Clause 10. The composite of Clause 9, wherein the ratio of mesogenic ligands to non-mesogenic ligands on the nanoparticle surface is 9:1.

Clause 11. The composite of Clause 9, wherein the ratio of mesogenic ligands to non-mesogenic ligands on the nanoparticle surface is 6:4.

Clause 12. The composite of any one of Clauses 1 to 11, wherein the mesogenic ligand has a structure of formula (I):

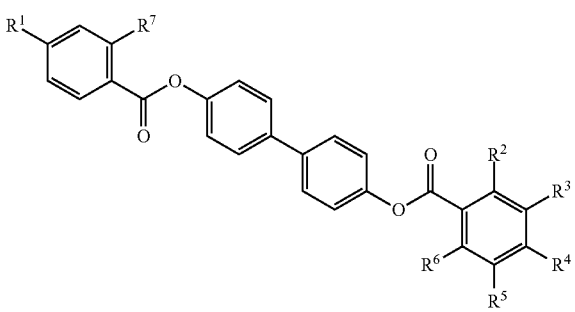

wherein $R^1$ and $R^7$ are each independently selected from, $C_1$-$C_8$ alkoxy, and $C_1$-$C_8$ alkoxy substituted with an amine or thiol group; and $R^2$, $R^3$, $R^4$, $R^5$ and $R^6$ are each independently selected from H, halogen, hydroxyl, azido, alkyl, substituted alkyl, alkenyl, substituted alkenyl, alkynyl, substituted alkynyl, $C_1$-$C_{12}$ alkoxy, substituted alkoxy, amino, substituted amino, cycloalkyl, substituted cycloalkyl, heterocycloalkyl, substituted heterocycloalkyl, aryl, substituted aryl, heteroaryl, substituted heteroaryl and combinations thereof.

Clause 13. The composite of Clause 12, wherein the mesogenic ligand is selected from the group consisting of:

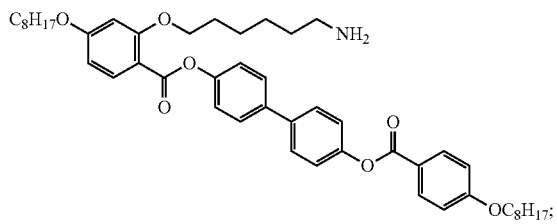

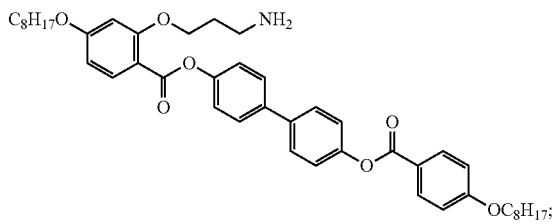

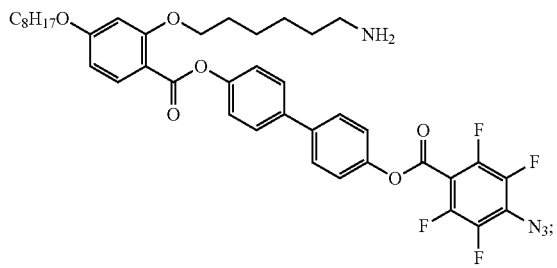

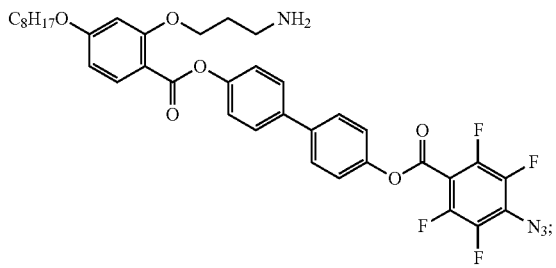

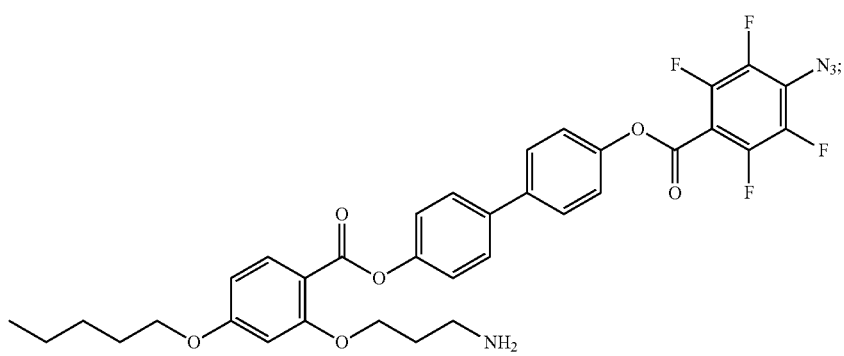

-continued
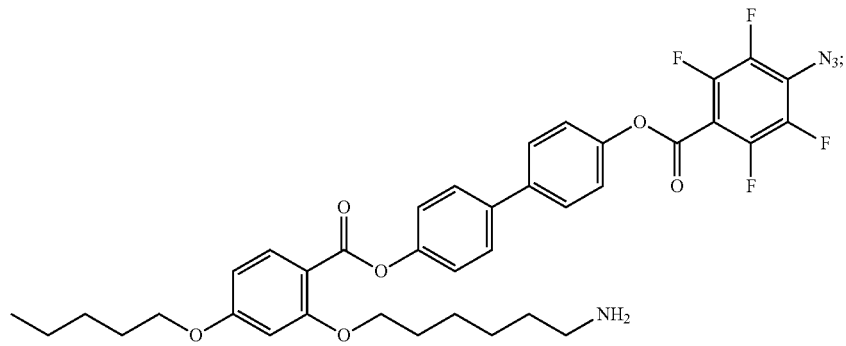
(L6)
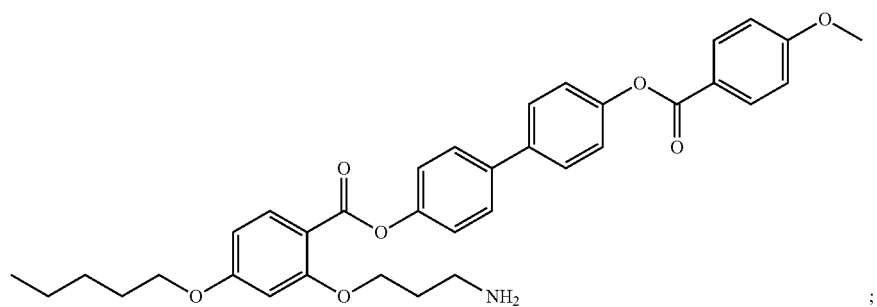
(L7)
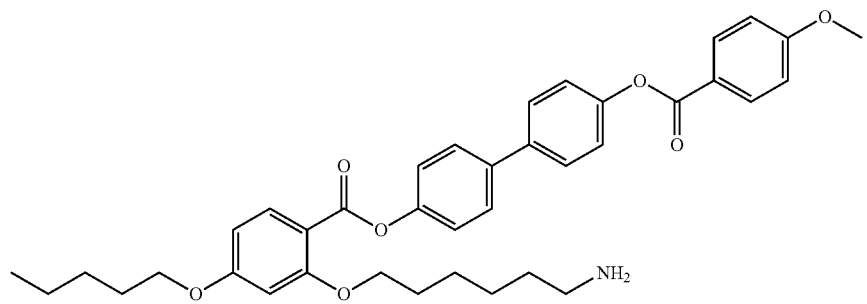
(L8)
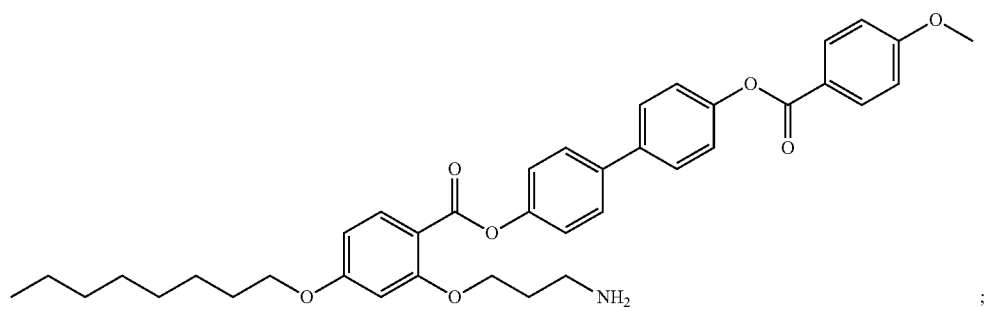
(L9)
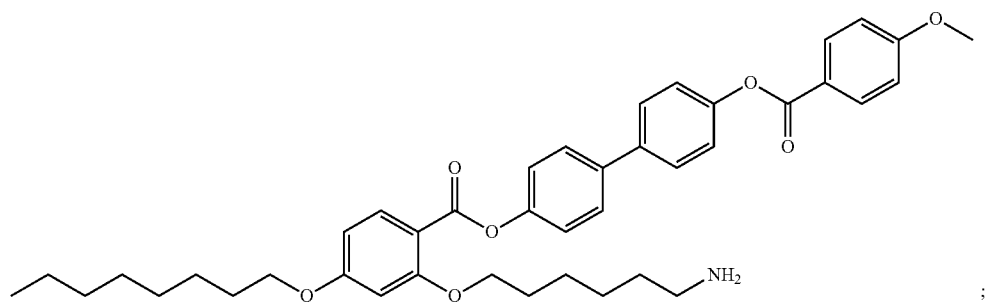
(L10)

-continued
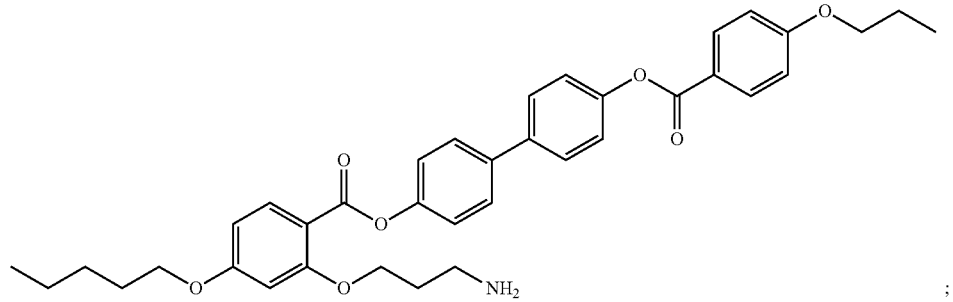
(L11)
;
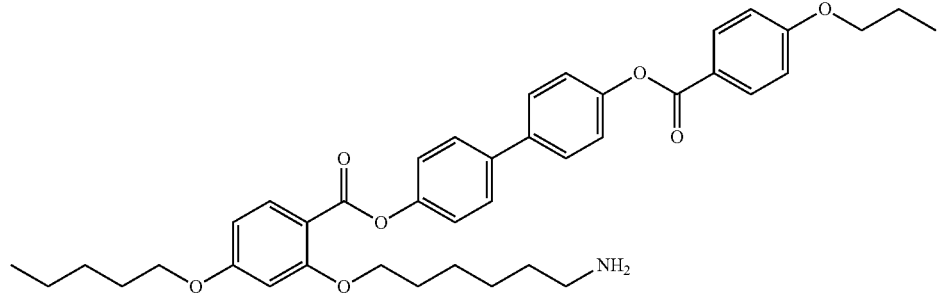
(L12)
;
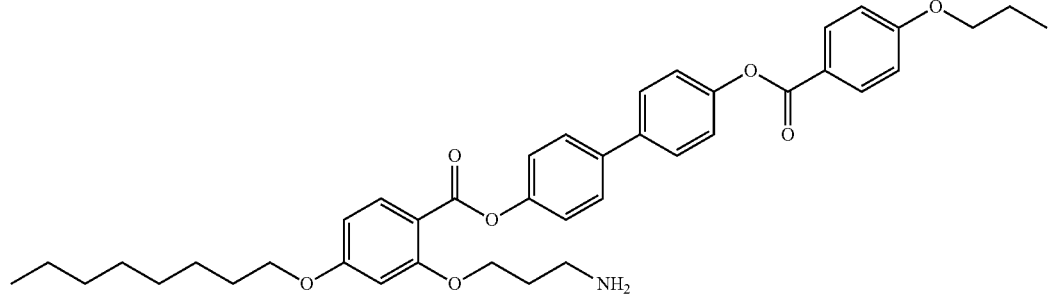
(L13)
;
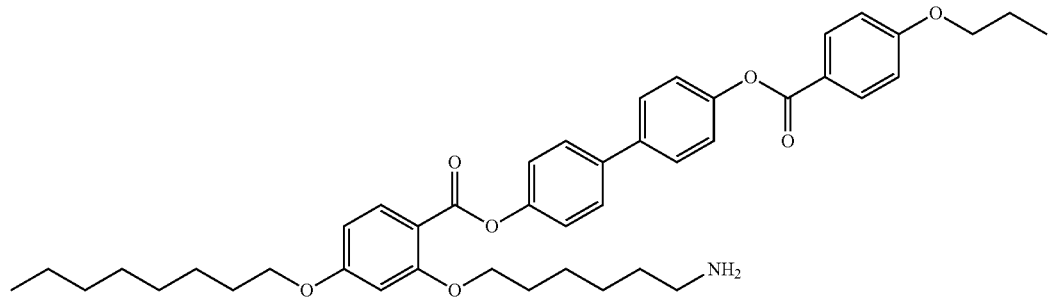
(L14)
;
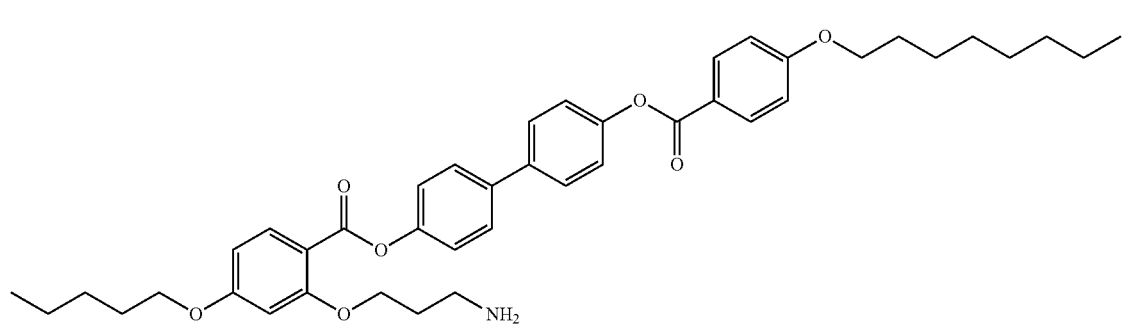
(L15)
; and -continued

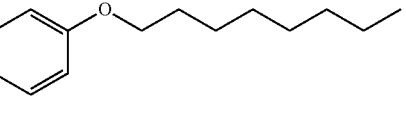
(L16)

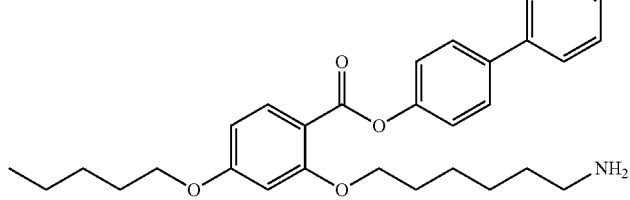

Clause 14. The composite of any one of Clauses 1 to 11, wherein the mesogenic ligand has a structure of formula (II):

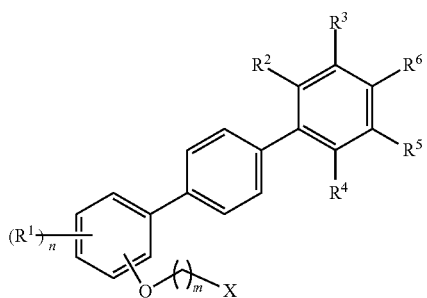
(II)

wherein:

R¹ are each independently selected H, halogen, hydroxyl, azido, alkyl, substituted alkyl, alkenyl, substituted alkenyl, alkynyl, substituted alkynyl, alkoxy, substituted alkoxy, amino, and substituted amino;

$R^2$, $R^3$, $R^4$, $R^5$, and $R^6$ are each independently selected from H, halogen, hydroxyl, azido, alkyl, substituted alkyl, alkenyl, substituted alkenyl, alkynyl, substituted alkynyl, alkoxy, substituted alkoxy, amino, substituted amino, cycloalkyl, substituted cycloalkyl, heterocycloalkyl, substituted heterocycloalkyl, aryl, substituted aryl, heteroaryl, substituted heteroaryl, phosphate, substituted phosphate, phosphoryl, substituted phosphoryl, thiol and substituted thiol and combinations thereof;

X is an amine or a thiol group;
n is an integer from 1 to 4; and
m is an integer from 1 to 14.

Clause 15. The composite of Clause 14, wherein X is a thiol.

Clause 16. The composite of Clause 14, wherein the mesogenic ligand is selected from the group consisting of:

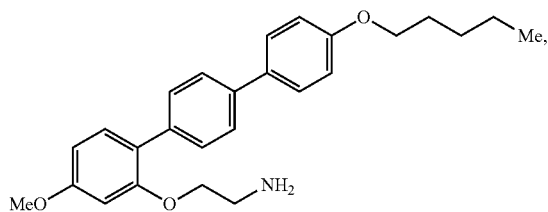
(L17)

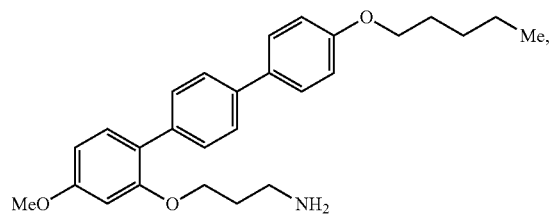
(L18)

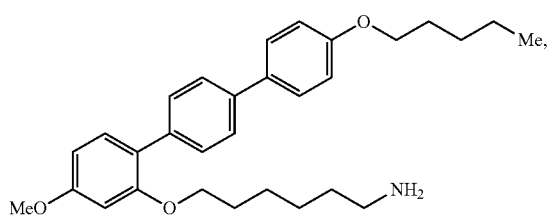
(L19)

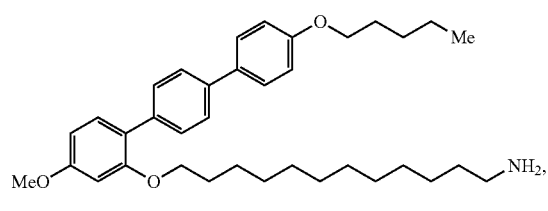
(L20)

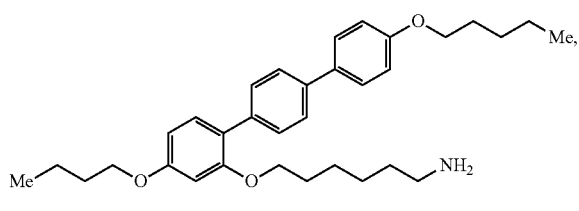
(L21)

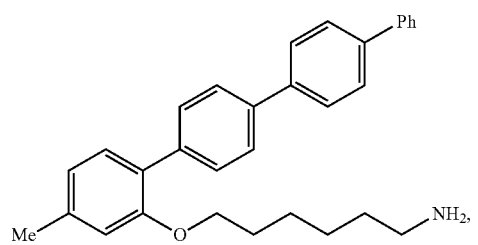
(L22)

-continued

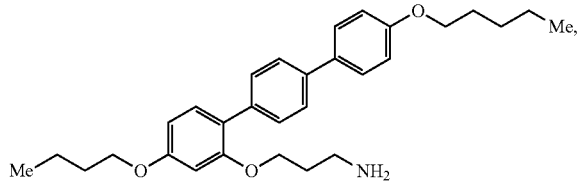
(L23)

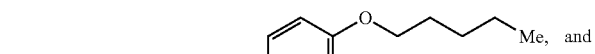
(L24)

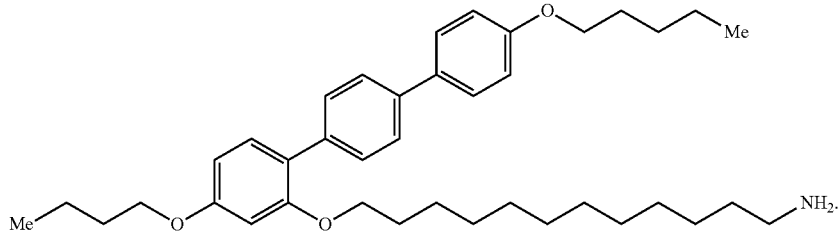
(L25)

Clause 17. The composite of Clause 14 or 15, wherein the mesogenic ligand is of the structure:

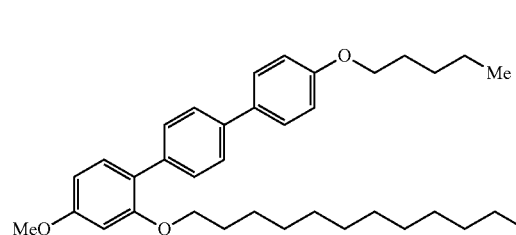
(L26)

Clause 18. A composition comprising,
a composite according to any one of Clauses 1 to 17; and
a liquid crystalline liquid.

Clause 19. The composition of Clause 18, wherein the concentration of mesogenic ligand-functionalized nanoparticles in the liquid crystalline liquid is from 0.075 wt % to 0.3 wt %.

Clause 20. The composition of Clause 18 or 19, wherein the solid foam has a droplet configuration suspended in the liquid crystalline liquid.

Clause 21. The composition of claim 20, wherein the droplet has a spherical surface.

Clause 22. The composition of claim 21, wherein the spherical surface has an average diameter of 1 μm to 50 μm.

Clause 23. The composition of Clause 21, wherein the spherical surface has an average diameter of 50 μm or greater.

Clause 24. A method of producing a multi-compartment solid foam comprising mesogenic ligand-functionalized nanoparticles, the method comprising:
dispersing mesogenic ligand-functionalized nanoparticles in a liquid crystalline liquid;
inducing a phase transition from an isotropic phase to a nematic phase; and
cooling the dispersion at a rate configured to produce a multi-compartment solid foam comprising mesogenic ligand-functionalized nanoparticles.

Clause 25. The method of Clause 24, wherein the mesogenic ligand has a structure according to any one of Clauses 12 to 17.

Clause 26. The method of Clause 24 or 25, wherein multiple nematic domains nucleate within the shrinking isotropic phase during the phase transition from the isotropic phase to the nematic phase.

Clause 27. The method of any one of Clauses 24 to 26, wherein the cooling rate is from 7° C./min to 30° C./min.

Clause 28. The method of Clause 27, wherein the cooling rate is 7° C./min.

Clause 29. The method of Clause 27, wherein the cooling rate is 15° C./min.

Clause 30. The method of Clause 27, wherein the cooling rate is 20° C./min.

Clause 31. The method of Clause 27, wherein the cooling rate is 30° C./min.

Clause 32. The method of any one of Clauses 24 to 31, wherein the concentration of mesogenic ligand-functionalized nanoparticles in the liquid crystalline liquid is from 0.075 wt % to 0.3 wt %.

Clause 33. The method of Clause 32, wherein the concentration of mesogenic ligand-functionalized nanoparticles in the liquid crystalline liquid is 0.075 wt %.

Clause 34. The method of clause 32, wherein the concentration of mesogenic ligand-functionalized nanoparticles in the liquid crystalline liquid is 0.15 wt %.

Clause 35. The method of clause 32, wherein the concentration of mesogenic ligand-functionalized nanoparticles in the liquid crystalline liquid is 0.3 wt %.

Clause 36. The method of any one of Clauses 24 to 35, wherein the dispersing comprises applying sound energy to the mesogenic ligand-functionalized nanoparticles in the liquid crystalline liquid.

Clause 37. The method of any one of Clauses 24 to 36, wherein the mesogenic ligand-functionalized nanoparticles are dispersed in a solvent before adding to the liquid crystalline liquid.

Clause 38. The method of Clause 37, wherein the solvent is selected from the group consisting of toluene, dimethylbenzene, methylisopropylbenzene, chloroform and mixtures thereof.

Clause 39. A composition comprising a multi-compartment solid foam comprising mesogenic ligand functionalized nanoparticles, produced by the method of any one of Clauses 24 to 38.

Clause 40. A photonic material comprising a composition or a composite according to any one of Clauses 1 to 23.

EXAMPLES

Example 1

Ligand Synthesis and Exchange

The mesogenic ligands of formula (I) (e.g., (L1) to (L16)) were synthesized according to the procedures outlined in WO 2016/10637, the disclosure of which is incorporated by reference herein, and are summarized below in Scheme 1. With reference to Scheme 1, the sequence of reactions proceeds as follows: preparation of a para-alkyated phenol 3 via esterification followed by Williamson etherification selectively at the 4-position. The ortho-functionality was then added via coupling with N-Boc mesylate 4, to provide intermediate 5. The mesogenic-ligand core was obtained by esterification of acid 6 and phenol 7, via in situ acid chloride generation. This final coupling both activated the carboxylic acid group and removed the N-Boc protection to yield the final ligand L1.

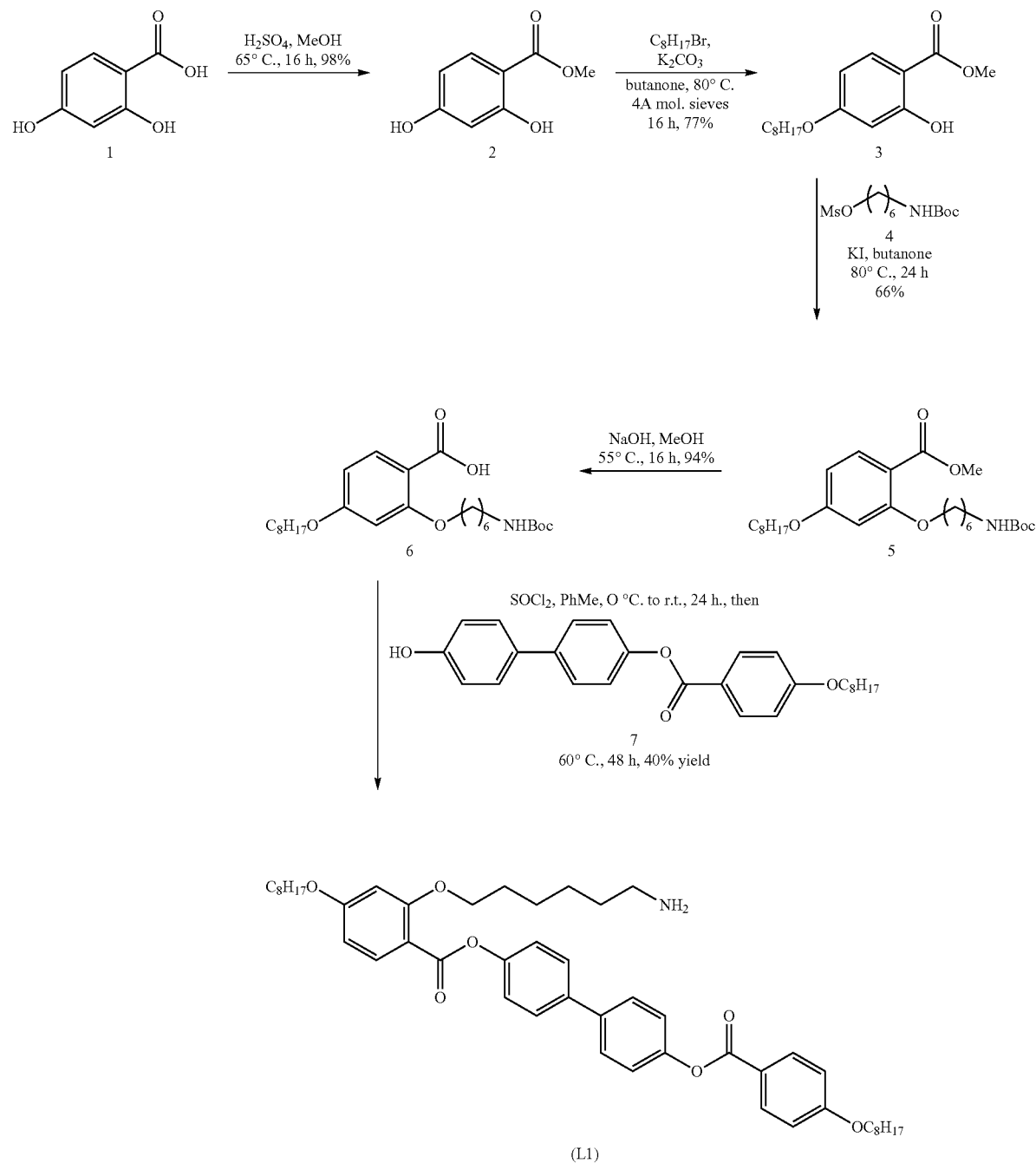

Scheme 1 - Sequence of reactions used to prepare the mesogenic ligand L1.

Final Coupling procedure to furnish 4'-((4-(Octyloxy)benzoyl)oxy)-[1,1'-biphenyl]-4-yl2-((6-aminohexyl)oxy)-4-(octyloxy)benzoate (L1)

To a 25 mL round bottom flask charged with a PTFE-coated magnetic stir bar was added a solution of 0.64 g of 2-((6-(((tert-butoxycarbonyl)amino)hexyl)oxy)-4-(octyloxy)benzoic acid 6 (1.37 mmol) in 7.6 mL of anhydrous toluene. Then, 0.2 mL of thionyl chloride (2.5 mmol) was added dropwise at 0° C. and the reaction was allowed to warm to room temperature and stir for 24 hours. Finally, 0.45 g (1.07 mmol) of phenol 7 was added to the flask and the reaction was heated to 60° C. for 48 hours. After concentration under vacuum, purification by flash column chromatography (80:20:00 hexanes:ethyl acetate:methanol| 00:50:50 hexanes:ethyl acetate:methanol on Et$_3$N-treated SiO$_2$) afforded L1 (0.330 g, 40%) as a white solid, R$_f$=0.89 (50:50 EtOAc:MeOH on an Et$_3$N-treated SiO$_2$ TLC plate, visualized by 254 nm light), mp=94° C. $^1$H NMR (400 MHz, CDCl$_3$): δ 8.16 (d, J=8.8 Hz, 2H), 8.05 (d, J=9.1 Hz, 1H), 7.61 (d, J=8.6 Hz, 2H), 7.60 (d, J=8.4 Hz, 2H), 7.27 (d, J=8.6 Hz, 2H), 7.26 (d, J=8.4 Hz, 2H), 6.98 (d, J=8.7 Hz, 2H), 6.53 (dd, J=9.0, 6.5 Hz, 1H), 6.49 (d, J=2.5 Hz, 1H), 4.05 (t, J=6.5 Hz, 2H), 4.02 (t, J=6.5 Hz, 2H), 4.01 (t, J=6.5 Hz, 2H), 2.81 (br s, 2H), 2.67 (t, J=6.4 Hz, 2H), 1.91-1.77 (m, 6H), 1.57-1.43 (m, 9H), 1.41-1.26 (m, 17H), 0.91 (t, J=6.5 Hz, 3H), 0.90 (t, J=6.5 Hz, 3H); $^{13}$C NMR (125 MHz, CDCl$_3$): δ 167.9 (C), 167.3 (C), 166.8 (C), 166.3 (C), 164.5 (C), 153.2 (C), 153.1 (C), 140.7 (C), 140.3 (C), 137.1 (CH), 135.0 (2CH), 130.9 (4CH), 125.0 (2CH), 124.8 (2CH), 124.0 (C), 117.0 (2CH), 113.3 (C), 108.2 (CH), 102.8 (CH), 71.4 (CH$_2$), 71.0 (2CH$_2$), 42.6 (CH$_2$), 34.5 (CH$_2$), 32.0 (2CH$_2$), 31.9 (2CH$_2$), 31.8 (CH$_2$), 31.7 (CH$_2$), 31.3 (CH$_2$), 29.7 (CH$_2$), 28.7 (2CH$_2$), 28.6 (CH$_2$), 28.0 (CH$_2$), 26.8 (CH$_2$), 25.3 (2CH$_2$), 16.8 (2CH$_3$). ATR-FTIR (neat): 2923, 2854, 1726, 1605, 1251, 1196, 1162 cm$^{-1}$. HRMS (ESI) m/z calculated for C$_{48}$H$_{63}$NO$_7$ [M]$^+$: 766.4677, found: 766.4659.

The mesogenic ligands of formulae (II) and (III) (e.g., (L17) to (L25)) were synthesized according to the procedure outlined in Scheme 2. With reference to Scheme 2, the sequence of reactions proceeds as follows: preparation of ligand core 10 via a Suzuki coupling between a bromide of formula 8 and a boronic acid of formula 9. The ortho-functionality was then added via coupling of the phenol 10 with N-Boc mesylate 13, which was synthesized by O-mesylation of the corresponding alcohol. The N-Boc protecting group of a compound of formula 11 was then removed to yield the final ligands of general formula 12 (e.g., the core structure for L17 to L25).

Scheme 2

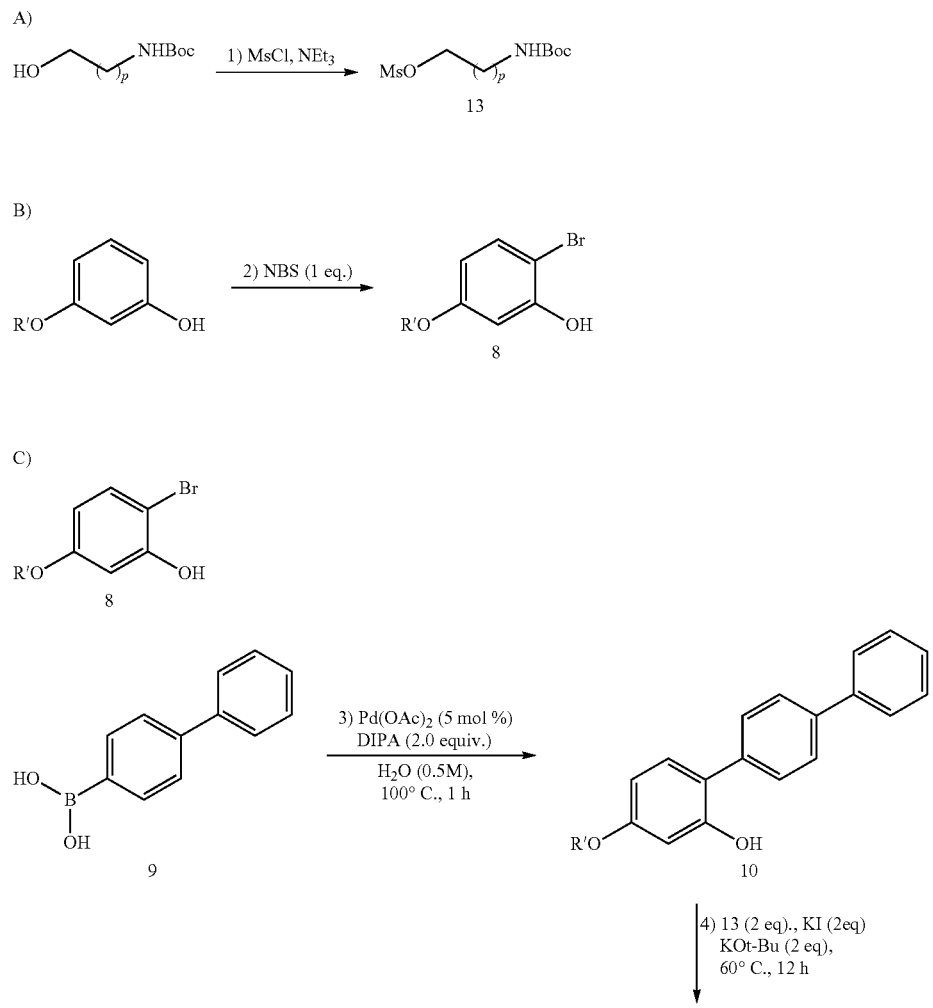

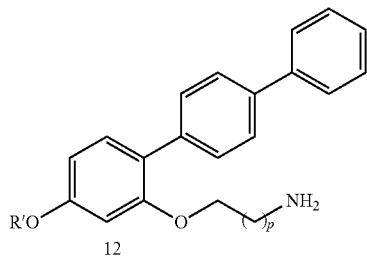

12

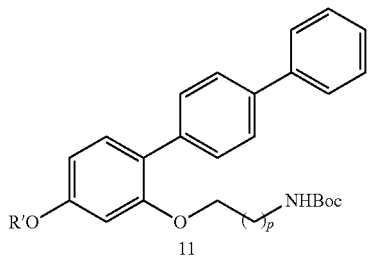

11

5) TFA (15 eq), DCM (0.1M) 0° C. to r.t., 2 h.

With reference to Scheme 2, R' is as defined herein for $R^1$ of formulae (II) and (III). In some cases, a compound of formula 13, 8 and/or 9 are commercially available. In some cases, compound 13 is a synthetic equivalent, such as a protected thiol (e.g., bromothiolate 13a), so that the amine in general formula 12 would be a thiol group, e.g., for the synthesis of mesogenic ligand (L26), see Scheme 3 below.

I. General Experimental Procedure for the Synthesis of the Amine Linker (13).

Into a round bottom flask charged with a PTFE-coated magnetic stir bar were added 1.0 equivalent of alcohol in 0.2 M dry DCM and 1.3 equivalent of triethylamine. The reaction mixture was placed in an ice bath and 1.2 equivalent of methanesulfonyl chloride was added dropwise. After 18 hours, the reaction mixture was quenched with water and separated, and the organic layer was dried over anhydrous sodium sulfate and removed under reduced pressure to afford 1a-e.

12-((tert-butoxycarbonyl)amino)dodecyl methanesulfonate (1a)

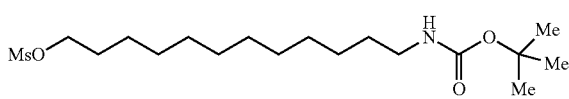

1a

General procedure I was followed by using 1.7 g tert-butyl (12-hydroxydodecyl)carbamate (5.64 mmol), 1.02 mL of TEA (7.33 mmol), 0.52 mL of MsCl (6.77 mmol) and 28 mL of DCM. 1.99 g of 1a (93%) was obtained as a white solid, mp=54-55° C. $^1$H NMR (400 MHz, CDCl$_3$): δ 4.49 (br s, 1H), 4.22 (t, J=6.6 Hz, 2H), 3.10 (q, J=6.7 Hz, 2H), 3.00 (s, 3H), 1.73 (p, J=6.5 Hz, 2H), 1.44 (s, 9H), 1.42-1.21 (m, 18H); $^{13}$C NMR (100 MHz, CDCl$_3$): δ 156.0 (C), 79.0 (C), 70.2 (CH$_2$), 40.6 (CH$_2$), 37.4 (CH$_3$), 30.1 (CH$_2$), 29.5 (2CH$_2$), 29.4 (2CH$_2$), 29.3 (CH$_2$), 29.1 (CH$_2$), 29.0 (CH$_2$), 28.4 (3CH$_3$), 26.8 (CH$_2$), 25.4 (CH$_2$). ATR-FTIR (neat): 3374, 2918, 2852, 1687, 1523, 1361, 1169 cm$^{-1}$; HRMS (ESI) m/z calculated for C$_{18}$H$_{37}$NO$_5$S[M]$^+$: 380.2465, found: 380.2454.

6-((tert-butoxycarbonyl)amino)hexyl methanesulfonate (1b)

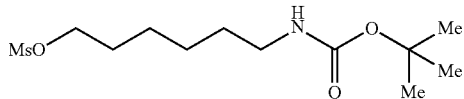

1b

General procedure I was followed by using 1.0 g tert-butyl (6-hydroxyhexyl)carbamate (4.60 mmol), 0.83 mL of TEA (5.98 mmol), 0.43 mL of MsCl (5.52 mmol) and 23 mL of DCM. 1.20 g of 1b (88%) was obtained as an off-white solid, mp=44-45° C. $^1$H NMR (400 MHz, CDCl$_3$): δ 4.51 (s, 1H), 4.22 (t, J=6.5 Hz, 2H), 3.11 (q, J=6.8 Hz, 2H), 3.00 (s, 3H), 1.75 (p, J=6.5 Hz, 2H), 1.55-1.45 (m, 3H), 1.44 (s, 9H), 1.42-1.31 (m, 3H); $^{13}$C NMR (100 MHz, CDCl$_3$): δ 156.0 (C), 79.1 (C), 69.9 (CH$_2$), 40.4 (CH$_2$), 37.4 (CH$_3$), 29.9 (CH$_2$), 29.0 (CH$_2$), 28.4 (3CH$_3$), 26.2 (CH$_2$), 25.1 (CH$_2$). ATR-FTIR (neat): cm$^{-1}$; 3347, 2936, 2863, 1695, 1519, 1352, 1173; HRMS (ESI) m/z calculated for C$_{12}$H$_{25}$NO$_5$S [M]$^+$: 296.1526, found: 296.1517.

4-((tert-butoxycarbonyl)amino)butyl methanesulfonate (1c)

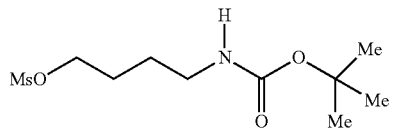

1c

General procedure I was followed by using 1 g of tert-butyl (4-hydroxybutyl)carbamate (5.28 mmol), 0.96 mL of TEA (6.86 mmol), 0.49 mL of MsCl (6.34 mmol) and 26 mL of DCM. 1.21 g of 1c (86%) was obtained as a light yellow oil. $^1$H NMR (400 MHz, CDCl$_3$): δ 4.58 (br s, 1H), 4.24 (t, J=6.3 Hz, 2H), 3.20-3.11 (m, 2H), 3.00 (s, 3H), 1.78 (p, J=6.5 Hz, 2H), 1.60 (p, J=6.5 Hz, 2H), 1.43 (s, 9H); $^{13}$C NMR (100 MHz, CDCl$_3$): δ 156.0 (C), 79.3 (C), 69.6 (CH$_2$), 39.7 (CH$_2$), 37.4 (CH$_3$), 28.4 (3CH$_3$), 26.4 (CH$_2$), 26.3 (CH$_2$). ATR-FTIR (neat): 3380, 2975, 2938, 1694, 1522, 1344, 1173 cm$^{-1}$; HRMS (ESI) m/z calculated for C$_{10}$H$_{21}$NO$_5$S[M]$^+$: 268.1213, found: 268.1205.

3-((tert-butoxycarbonyl)amino)propyl methanesulfonate (1d)

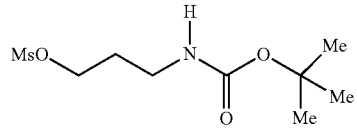

1d

General procedure I was followed by using 1.0 g tert-butyl (3-hydroxypropyl)carbamate (5.71 mmol), 1.03 mL of TEA (7.42 mmol), 0.53 mL of MsCl (6.84 mmol) and 29 mL of DCM. 1.26 g of 1d (87%) was obtained as a light yellow oil. $^1$H NMR (400 MHz, CDCl$_3$): δ 4.67 (s, 1H), 4.29 (t, J=6.0 Hz, 2H), 3.26 (q, J=6.2 Hz, 2H), 3.03 (s, 3H), 1.94 (p, J=6.2 Hz, 2H), 1.44 (s, 9H). δ 156.0 (C), 79.6 (C), 67.4 (CH$_2$), 37.4 (CH$_3$), 36.7 (CH$_2$), 28.4 (3CH$_3$), 27.4 (CH$_2$). This product is also commercially available. The spectral data matched those reported by Sarafiano and coworkers (Sarafianos, S. G.; et al. *J. Biol. Chem.* 2003, 278, 16280).

2-((tert-butoxycarbonyl)amino)ethyl methanesulfonate (1e)

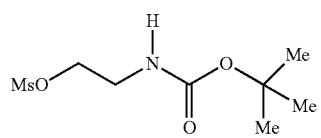

General procedure I was followed by using 2 g of tert-butyl (2-hydroxyethyl)carbamate (12.4 mmol), 2.24 mL of TEA (16.1 mmol), 1.15 mL of MsCl (14.9 mmol) and 62 mL of DCM. 2.41 g 1e (81%) was obtained as a viscous yellow oil. $^1$H NMR (400 MHz, CDCl$_3$): δ 4.98 (s, 1H), 4.26 (t, J=5.2 Hz, 2H), 3.45 (q, J=5.4 Hz, 2H), 3.02 (s, 3H), 1.42 (s, 9H). This compound is not stable and was used immediately. The spectral data matched those reported by Borbas and coworkers (Borbas, K. E.; Bruce, J. I. *Org. Biomol. Chem.* 2007, 5, 2274).

II. General Experimental Procedure for the Synthesis of Rod-Like Ligand Backbone via Suzuki Cross-coupling (10).

Into a 20 mL vial charged with a PTFE-coated magnetic stir bar were added 1.0 equivalent of arylbromide, 1.5 equivalent of arylboronic acid and 0.05 equivalent of palladium (II) acetate. The vial was sealed with septa and placed under vacuum and then it was filled with nitrogen. To this vial was added 0.5 M degassed water and 2.0 equivalent of degassed disopropylamine. The reaction mixture was stirred for an hour at 100° C. The mixture was extracted with Ethyl acetate and passed through a pad of celite. The residue was then dried over anhydrous sodium sulfate and removed under reduced pressure. Purification by flash column chromatography (100:0→80:20 hexanes: EtOAc) on SiO$_2$ afforded 2a-c as a solid.

4-methoxy-4"-(pentyloxy)-[1,1':4',1"-terphenyl]-2-ol (2a)

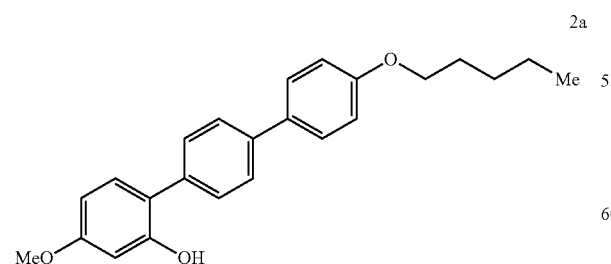

General procedure II was followed by using 0.50 g of 2-bromo-5methoxyphenol (2.46 mmol), 1.05 g of (4'-(pentyloxy)-[1,1'-biphenyl]-4-yl)boronic acid (3.69 mmol), 28 mg of palladium (II) acetate (0.12 mmol), 4.9 mL water and 0.69 mL disopropylamine (4.92 mmol). Purification by flash column chromatography (100:0→80:20 hexanes: EtOAc) on SiO$_2$ afforded 2a (0.398 g, 45%) as a beige solid, mp=168-169° C. $^1$H NMR (500 MHz, CDCl$_3$): δ 7.67 (d, J=8.6 Hz, 2H), 7.57 (d, J=8.6 Hz, 2H), 7.49 (d, J=8.6 Hz, 2H), 7.21 (d, J=8.4 Hz, 1H), 7.00 (d, J=8.6 Hz, 2H), 6.63-6.58 (m, 2H), 5.30 (s, 1H), 4.02 (t, J=6.6 Hz, 2H), 3.85 (s, 3H), 1.83 (pen, J=6.8 Hz, 2H), 1.49-1.38 (m, 4H), 0.96 (t, J=7.2 Hz, 3H); $^{13}$C NMR (125 MHz, CDCl$_3$): δ 163.2 (C), 161.6 (C), 156.1 (C), 142.7 (C), 137.8 (C), 135.4 (C), 133.4 (CH), 132.0 (2CH), 130.7 (2CH), 130.2 (2CH), 123.2 (C), 117.5 (2CH), 109.7 (CH), 104.0 (CH), 70.7 (OCH$_2$), 58.1 (OCH$_3$), 31.7 (CH$_2$), 30.9 (CH$_2$), 25.2 (2CH$_2$), 16.7 (CH$_3$); ATR-FTIR (neat): 3392, 2932, 2859, 1615, 1495, 1288, 1127 cm$^{-1}$; HRMS (ESI) m/z calculated for C$_{24}$H$_{26}$O$_3$ [M]$^+$: 363.1955, found: 363.1956.

2-bromo-5-butoxyphenol 2b'

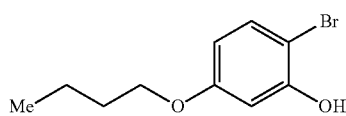

Into a 250 mL volumetric flask charged with a PTFE-coated magnetic stir bar were added 1 g of 3 butoxyphenol (6.0 mmol) in 150 mL dry DCM. Reaction flask was placed in ice bath and 1.01 g of N-bromosuccinimide (6.0 mmol) was added to the reaction mixture slowly in four portions over a period of two hours. Then the reaction was brought to room temperature and stirred for another hour. Purification by flash column chromatography (100:0→85:15 hexanes: EtOAc) on SiO$_2$ afforded 2-bromo-5-butoxyphenol 2b' (1.2 g, 82%) as a white solid, mp=32-33° C. $^1$H NMR (400 MHz, CDCl$_3$): δ 7.30 (d, J=8.9 Hz, 1H), 6.59 (d, J=2.8 Hz, 1H), 6.40 (dd, J=8.9, 2.9 Hz, 1H), 5.49 (s, 1H), 3.91 (t, J=6.5 Hz, 2H), 1.75 (pen, J=7.9 Hz, 2H), 1.47 (sex, J=7.6 Hz, 2H), 0.97 (t, J=7.4 Hz, 3H); $^{13}$C NMR (100 MHz, CDCl$_3$): δ 160.1 (C), 152.9 (C), 131.9 (CH), 109.9 (CH), 102.2 (CH), 100.6 (C), 68.0 (OCH$_2$), 31.1 (CH$_2$), 19.2 (CH$_2$), 13.8 (CH$_3$); ATR-FTIR (neat): 3507, 2958, 2873, 1588, 1488, 1175 cm$^{-1}$; HRMS (ESI) m/z calculated for C$_{10}$H$_{13}$BrO$_2$[M]$^+$: 245.1172, found: 245.1172

4-butoxy-4"-(pentyloxy)-[1,1':4',1"-terphenyl]-2-ol (2b)

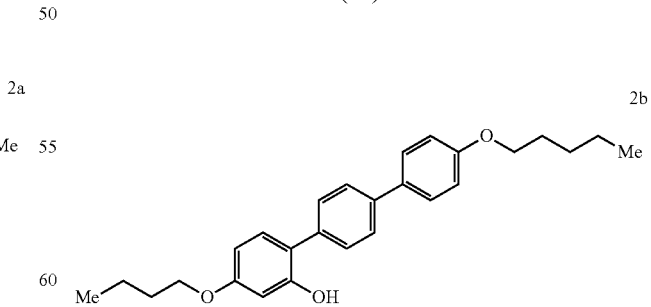

General procedure II was followed by using 0.50 g of 2-bromo-5-butoxyphenol (2.04 mmol), 0.87 g of (4'-(pentyloxy)-[1,1'-biphenyl]-4-yl)boronic acid (3.06 mmol), 23 mg of palladium (II) acetate (0.12 mmol), 4.1 mL water and 0.58 mL disopropylamine (4.08 mmol). Purification by flash column chromatography (100:0→80:20 hexanes: EtOAc) on SiO$_2$ afforded 2b (0.386 g, 47%) as a white solid, mp=114-115° C. $^1$H NMR (400 MHz, CDCl$_3$): δ 7.65 (d, J=8.6 Hz, 2H), 7.55 (d, J=8.6 Hz, 2H), 7.48 (d, J=8.6 Hz, 2H), 7.18 (d, J=8.4 Hz, 1H), 6.99 (d, J=8.6 Hz, 2H), 6.61-6.53 (m, 2H), 5.30 (s, 1H), 4.01 (t, J=6.6 Hz, 2H), 3.99 (t, J=6.6 Hz, 2H), 1.87-1.72 (m, 4H), 1.53-1.36 (m, 6H), 0.99 (t, J=7.5 Hz, 3H), 0.95 (t, J=7.2 Hz, 3H); $^{13}$C NMR (100 MHz, CDCl$_3$): δ 160.1 (C), 158.9 (C), 153.4 (C), 140.0 (C), 135.2 (C), 132.8 (C), 130.7 (CH), 129.4 (2CH), 128.0 (2CH), 127.5 (2CH), 120.3 (C), 114.9 (2CH), 107.6 (CH), 101.8 (CH), 68.1 (CH$_2$), 67.8 (CH$_2$), 31.3 (CH$_2$), 29.0 (CH$_2$), 28.2 (CH$_2$), 22.5 (CH$_2$), 19.3 (CH$_2$), 14.0 (CH$_3$), 13.9 (CH$_3$); ATR-FTIR (neat): 3501, 2957, 2872, 1610, 1495, 1253, 1144 cm$^{-1}$; HRMS (ESI) m/z calculated for C$_{27}$H$_{32}$O$_3$[M]$^+$: 405.2424, found: 405.2412.

128.8 (2CH), 127.9 (2CH), 127.6 (2CH), 127.4 (3CH), 127.0 (2CH), 120.4 (C), 107.1 (CH), 101.4 (CH), 55.4 (OCH$_3$); ATR-FTIR (neat): 3265, 1613, 1523, 1368, 1281, 1164, 1131 cm$^{-1}$; HRMS (ESI) m/z calculated for C$_{25}$H$_{20}$O$_2$ [M]$^+$: 353.1536, found: 353.1531.

III. General Experimental Procedure for the Synthesis of N-Boc Protected Mesogenic Organic Ligands (11).

Into a 20 mL vial charged with a PTFE-coated magnetic stir bar were added 1.0 equivalent of 10, 2.0 equivalent of 13, 2.0 equivalent of potassium iodide in 0.075 M dry THF. 2.0 equivalent of 1.7 M KOt-Bu in THF was added to the vial drop wise. The reaction mixture was stirred for 12 hours at 60° C. The solvent was removed under reduced pressure and the solid residue was extracted with water and DCM. The organic layer was collected and dried over anhydrous sodium sulfate and removed under reduced pressure. Purification by flash column chromatography (100:0→85:15 hexanes:ethyl acetae) on SiO$_2$ afforded 3a-i as a solid.

tert-butyl(12-((4-methoxy-4"-(pentyloxy)-[1,1':4',1"-terphenyl]-2-yl)oxy)dodecyl)carbamate (3a)

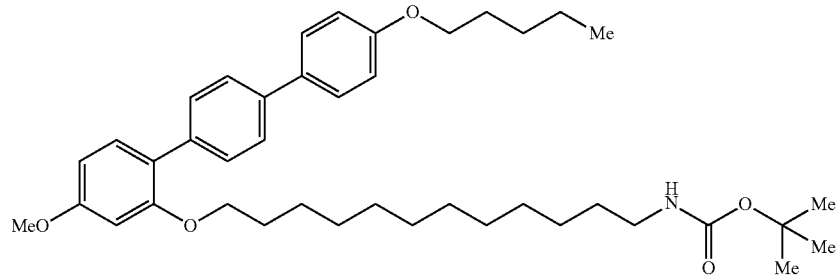

3a 4-methoxy-[1,1':4',1":4",1"'-quaterphenyl]-2-ol (2c)

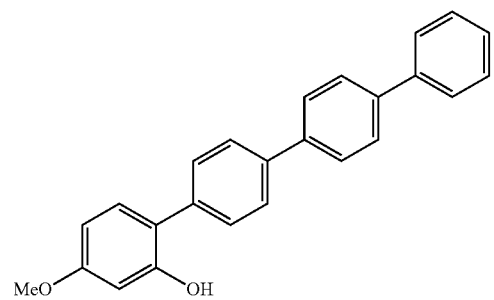

2c

General procedure II was followed by using 0.50 g of 2-bromo-5methoxyphenol (2.46 mmol), 1.01 g of [1,1':4',1"-terphenyl]-4-ylboronic acid (3.69 mmol), 28 mg of palladium (II) acetate (0.12 mmol), 4.9 mL water and 0.69 mL disopropylamine (4.92 mmol). Purification by flash column chromatography (100:0→70:30 hexanes: EtOAc) on SiO$_2$ afforded 2c (0.112 g, 13%) as a beige solid, mp=226-227° C. $^1$H NMR (400 MHz, CDCl$_3$): δ 7.75 (d, J=8.2 Hz, 2H), 7.71 (d, J=1.1 Hz, 4H), 7.68-7.64 (m, 2H), 7.54 (d, J=8.2 Hz, 2H), 7.47 (t, J=6.4 Hz, 2H), 7.22 (d, J=8.1 Hz, 1H), 6.63-6.53 (m, 2H), 5.29 (s, 1H), 3.84 (t, J=6.6 Hz, 2H); $^{13}$C NMR (100 MHz, CDCl$_3$): δ 160.6 (C), 153.4 (C), 140.6 (C), 140.3 (C), 139.8 (C), 139.4 (C), 136.0 (C), 130.8 (2CH), 129.5 (2CH), General procedure III was followed by using 100 mg of 2a (0.276 mmol), 209 mg 1a (0.552 mmol), 92 mg of KI (0.552 mmol), and 0.32 mL of KOt-Bu solution in 3.68 mL THF. Purification by flash column chromatography (100:0→85:15 hexanes: EtOAc) on SiO$_2$ afforded 3a (130 mg, 73%) as a white solid, mp: 80-81° C. $^1$H NMR (400 MHz, CDCl$_3$): δ 7.60-7.53 (m, 6H), 7.30 (d, J=8.3 Hz, 1H), 6.98 (d, J=8.6 Hz, 2H), 6.60-6.54 (m, 2H), 4.49 (br. s, 1H), 4.01 (t, J=6.6 Hz, 2H), 3.96 (t, J=6.5 Hz, 2H), 3.85 (s, 3H), 3.09 (q, J=6.7 Hz, 2H), 1.82 (pen, J=6.4 Hz, 2H), 1.75 (pen, J=6.2 Hz, 2H), 1.52-1.45 (m, 4H), 1.44 (s, 9H), 1.43-1.20 (m, 18H), 0.95 (t, J=7.1 Hz, 3H); $^{13}$C NMR (100 MHz, CDCl$_3$): δ 160.2 (C), 158.6 (C), 157.1 (C), 156.9 (C), 138.7 (C), 136.8 (C), 133.4 (C), 131.1 (CH), 129.7 (2CH), 128.0 (2CH), 126.1 (2CH), 123.3 (C), 114.7 (2CH), 104.7 (CH), 99.9 (CH), 79.0 (C), 68.4 (CH$_2$), 68.0 (CH$_2$), 55.4 (OCH$_3$), 40.6 (CH$_2$), 30.1 (CH$_2$), 29.5 (4CH$_2$), 29.3 (CH$_2$), 29.2 (CH$_2$), 29.1 (CH$_2$), 29.0 (CH$_2$), 28.4 (3CH$_3$), 28.2 (CH$_2$), 26.8 (CH$_2$), 26.1 (CH$_2$), 22.5 (CH$_2$), 14.0 (CH$_3$); ATR-FTIR (neat): 3359, 2956, 2871, 1713, 1609, 1248, 1136 cm$^{-1}$; HRMS (ESI) m/z calculated for C$_{41}$H$_{59}$NO$_5$[M]$^+$: 646.4466, found: 646.4447.

tert-butyl(6-((4-methoxy-4"-(pentyloxy)-[1,1':4',1"-terphenyl]-2-yl)oxy)hexyl)carbamate (3b)

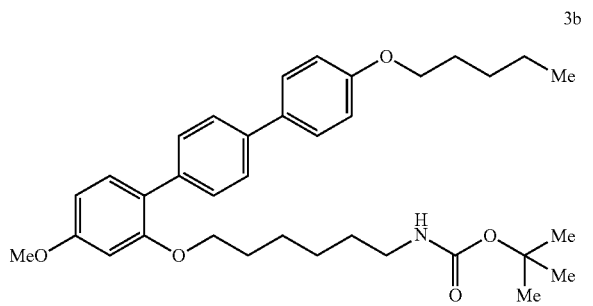 [SMILES: CCCCCOc1ccc(-c2ccc(-c3ccc(OC)cc3OCCCCCCNC(=O)OC(C)(C)C)cc2)cc1]

General procedure III was followed by using 210 mg of 2a (0.579 mmol), 342 mg 1b (1.16 mmol), 192 mg of KI (1.16 mmol), and 0.68 mL of KOt-Bu solution in 7.72 mL THF. Purification by flash column chromatography (100:0→85:15 hexanes: EtOAc) on SiO$_2$ afforded 3b (266 mg, 82%) as a white solid, mp=87-88° C. $^1$H NMR (400 MHz, CDCl$_3$): δ 7.61-7.55 (m, 6H), 7.30 (d, J=8.2 Hz, 1H), 6.98 (d, J=8.2 Hz, 2H), 6.61-6.53 (m, 2H), 4.46 (br. s, 1H), 4.01 (t, J=6.6 Hz, 2H), 3.96 (t, J=6.4 Hz, 2H), 3.85 (s, 3H), 3.07 (q, J=6.7 Hz, 2H), 1.83 (pen, J=6.6 Hz, 2H), 1.75 (pen, J=6.6 Hz, 2H), 1.52-1.45 (m, 5H), 1.44 (s, 9H), 1.38-1.24 (m, 3H), 0.96 (t, J=7.1 Hz, 3H); $^{13}$C NMR (100 MHz, CDCl$_3$): δ 160.2 (C), 158.6 (C), 157.0 (C), 156.0 (C), 138.7 (C), 136.8 (C), 133.3 (C), 131.1 (CH), 129.8 (2CH), 128.0 (2CH), 126.0 (2CH), 123.3 (C), 114.8 (2CH), 104.8 (CH), 100.0 (CH), 79.0 (C), 68.3 (CH$_2$), 68.1 (CH$_2$), 55.4 (OCH$_3$), 40.5 (CH$_2$), 30.0 (CH$_2$), 29.0 (2CH$_2$), 28.4 (3CH$_3$), 28.2 (CH$_2$), 26.4 (CH$_2$), 25.8 (CH$_2$), 22.5 (CH$_2$), 14.0 (CH$_3$); ATR-FTIR (neat): 3358, 2933, 2860, 1711, 1609, 1509, 1491, 1248, 1167 cm$^{-1}$; HRMS (ESI) m/z calculated for C$_{35}$H$_{45}$NO$_5$ [M]$^+$: 562.3527, found: 562.3522.

tert-butyl(4-((4-methoxy-4"-(pentyloxy)-[1,1':4',1"-terphenyl]-2-yl)oxy)butyl)carbamate (3c)

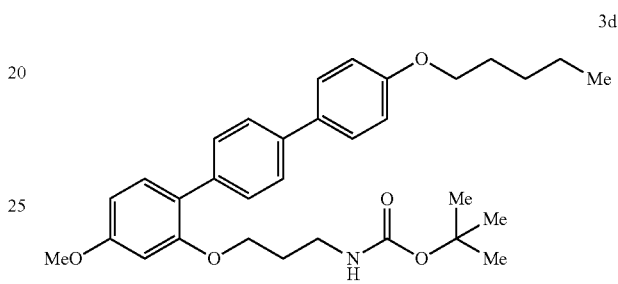

General procedure III was followed by using 150 mg of 2a (0.414 mmol), 221 mg 1c (0.828 mmol), 137 mg of KI (0.828 mmol), and 0.49 mL of KOt-Bu solution in 5.52 mL THF. Purification by flash column chromatography (100:0→85:15 hexanes: EtOAc) on SiO$_2$ afforded 3c (132 mg, 60%) as a white solid, mp=98-99° C. $^1$H NMR (400 MHz, CDCl$_3$): δ 7.61-7.51 (m, 6H), 7.29 (d, J=8.3 Hz, 1H), 6.98 (d, J=8.4 Hz, 2H), 6.58 (dd, J=8.4, 2.4 Hz, 1H), 6.55 (d, J=2.4 Hz, 1H), 4.46 (br. s, 1H), 4.01 (t, J=6.6 Hz, 2H), 3.98 (t, J=6.6 Hz, 2H), 3.85 (s, 3H), 3.11 (q, J=6.6 Hz, 2H), 1.89-1.71 (m, 4H), 1.59 (pen, J=7.2 Hz, 2H), 1.51-1.42 (m, 4H), 1.40 (s, 9H) 0.95 (t, J=7.1 Hz, 3H); $^{13}$C NMR (100 MHz, CDCl$_3$): δ 160.2 (C), 158.6 (C), 156.8 (C), 155.9 (C), 138.8 (C), 136.7 (C), 133.3 (C), 131.2 (CH), 129.8 (CH), 129.7 (CH), 128.1 (CH), 128.0 (CH), 126.2 (CH), 126.1 (CH), 123.4 (C), 114.7 (2CH), 105.0 (CH), 100.1 (CH), 79.1 (C), 68.1 (2CH$_2$), 55.5 (OCH$_3$), 40.1 (CH$_2$), 29.0 (CH$_2$), 28.4 (3CH$_3$), 28.2 (CH$_2$), 26.8 (CH$_2$), 26.4 (CH$_2$), 22.4 (CH$_2$), 14.0 (CH$_3$); ATR-FTIR (neat): 3308, 2932, 2869, 1673, 1609, 1249, 1172 cm$^{-1}$; HRMS (ESI) m/z calculated for C$_{33}$H$_{43}$NO$_5$ [M]$^+$: 534.3214, found: 534.3190.

tert-butyl(3-((4-methoxy-4"-(pentyloxy)-[1,1':4',1"-terphenyl]-2-yl)oxy)propyl)carbamate (3d)

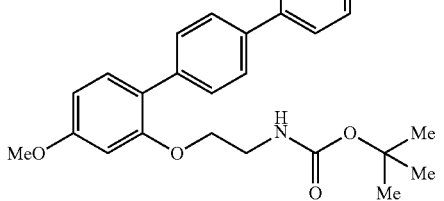

General procedure III was followed by using 150 mg of 2a (0.414 mmol), 210 mg 1d (0.828 mmol), 137 mg of KI (0.828 mmol), and 0.49 mL of KOt-Bu solution in 5.52 mL THF. Purification by flash column chromatography (100:0→85:15 hexanes: EtOAc) on SiO$_2$ afforded 3d (177 mg, 82%) as a white solid, mp=105-106° C. $^1$H NMR (400 MHz, CDCl$_3$): δ 7.61-7.51 (m, 6H), 7.29 (d, J=8.3 Hz, 1H), 6.98 (d, J=8.4 Hz, 2H), 6.62-6.55 (m, 2H), 4.59 (br. s, 1H), 4.01 (t, J=6.6 Hz, 4H), 3.85 (s, 3H), 3.24 (q, J=6.4 Hz, 2H), 1.93 (pen, J=6.3 Hz, 2H), 1.82 (pen, J=6.4 Hz, 2H), 1.51-1.40 (m, 4H), 1.39 (s, 9H) 0.95 (t, J=7.1 Hz, 3H); $^{13}$C NMR (100 MHz, CDCl$_3$): δ 160.2 (C), 158.6 (C), 156.7 (C), 155.9 (C), 138.9 (C), 136.8 (C), 133.2 (C), 131.2 (CH), 129.7 (2CH), 128.0 (2CH), 126.2 (2CH), 123.5 (C), 114.7 (2CH), 105.3 (CH), 100.2 (CH), 80.0 (C), 68.1 (2CH$_2$), 55.4 (OCH$_3$), 38.0 (CH$_2$), 29.0 (CH$_2$), 28.4 (3CH$_3$), 28.4 (CH$_2$), 28.2 (CH$_2$), 22.5 (CH$_2$), 14.0 (CH$_3$); ATR-FTIR (neat): 3359, 2956, 2871, 1713, 1609, 1248, 1136 cm$^{-1}$; HRMS (ESI) m/z calculated for C$_{32}$H$_{41}$NO$_5$[M]$^+$: 520.3057, found: 520.3043.

tert-butyl(2-((4-methoxy-4"-(pentyloxy)-[1,1':4',1"-terphenyl]-2-yl)oxy)ethyl)carbamate (3e)

General procedure III was followed by using 150 mg of 2a (0.414 mmol), 99.1 mg 1e (0.828 mmol), 137 mg of KI (0.828 mmol), and 0.49 mL of KOt-Bu solution in 5.52 mL THF. Purification by flash column chromatography (100:0→85:15 hexanes: EtOAc) on SiO$_2$ afforded 3e (69 mg, 33%) as an off-white solid, mp=102-103° C. $^1$H NMR (400 MHz, CDCl$_3$): δ 7.63-7.50 (m, 6H), 7.30 (d, J=8.4 Hz, 1H), 6.98 (d, J=8.6 Hz, 2H), 6.61 (dd, J=8.4, 2.4 Hz, 1H), 6.56 (d, J=2.4 Hz, 1H), 4.80 (br. s, 1H), 4.05-3.97 (m, 4H), 3.85 (s, 3H), 3.45 (q, J=5.4 Hz, 2H), 1.82 (pen, J=8.0 Hz, 2H), 1.51-1.42 (m, 4H), 1.41 (s, 9H), 0.95 (t, J=7.1 Hz, 3H); $^{13}$C NMR (100 MHz, CDCl$_3$): δ 160.2 (C), 158.7 (C), 156.4 (C), 155.8 (C), 139.0 (C), 136.6 (C), 133.2 (C), 131.2 (CH), 129.7 (2CH), 128.0 (2CH), 126.3 (2CH), 123.6 (C), 114.8 (2CH), 105.9 (CH), 100.5 (CH), 79.5 (C), 68.1 (2CH$_2$), 55.5 (OCH$_3$), 40.0 (CH$_2$), 29.0 (CH$_2$), 28.4 (3CH$_3$), 28.2 (CH$_2$), 22.5 (CH$_2$), 14.0 (CH$_3$); ATR-FTIR (neat): 3374, 2955, 2870, 1681, 1608, 1510, 1250, 1163 cm$^{-1}$; HRMS (ESI) m/z calculated for C$_{31}$H$_{39}$NO$_5$[M]$^+$: 506.2901, found: 506.2888.

tert-butyl(12-((4-butoxy-4''-(pentyloxy)-[1,1':4',1''-terphenyl]-2-yl)oxy)dodecyl)carbamate (3f)

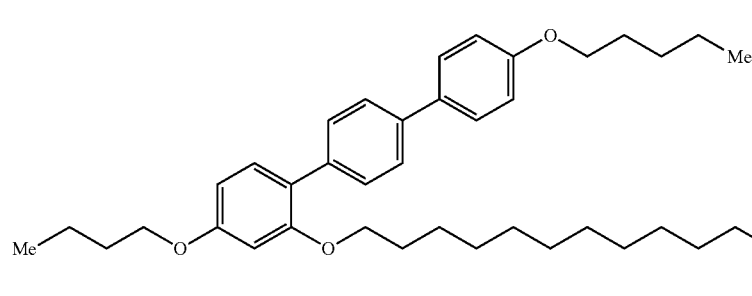

General procedure III was followed by using 90 mg of 2b (0.222 mmol), 168 mg 1a (0.444 mmol), 52 mg of KI (0.444 mmol), and 0.26 mL of KOt-Bu solution in 2.96 mL THF. Purification by flash column chromatography (100:0→85:15 hexanes: EtOAc) on SiO$_2$ afforded 3f (109 mg, 72%) as a white solid, mp=80-81° C. $^1$H NMR (400 MHz, CDCl$_3$): δ 7.64-7.53 (m, 6H), 7.30 (d, J=8.3 Hz, 1H), 6.99 (d, J=8.4 Hz, 2H), 6.60-6.54 (m, 2H), 4.56 (br s, 1H), 4.01 (t, J=6.5 Hz, 4H), 3.97 (t, J=6.4 Hz, 2H), 3.11 (q, J=6.7 Hz, 2H), 1.89-1.70 (m, 6H), 1.60-1.38 (m, 10H), 1.47 (s, 9H), 1.35-1.20 (m, 14H), 1.02 (t, J=7.4 Hz, 3H), 0.97 (t, J=7.1 Hz, 3H); $^{13}$C NMR (100 MHz, CDCl$_3$): δ 159.8 (C), 158.6 (C), 157.1 (C), 156.0 (C), 138.6 (C), 136.9 (C), 133.4 (C), 131.0 (CH), 129.8 (2CH), 127.9 (2CH), 126.0 (2CH), 123.1 (C), 114.7 (2CH), 105.3 (CH), 100.4 (CH), 78.9 (C), 68.4 (CH$_2$), 68.1 (CH$_2$), 67.8 (CH$_2$), 40.6 (CH$_2$), 31.4 (CH$_2$), 30.5 (CH$_2$), 29.6 (2CH$_2$), 29.5 (CH$_2$), 29.3 (CH$_2$), 29.3 (CH$_2$), 29.1 (CH$_2$), 29.0 (CH$_2$), 28.5 (3CH$_3$), 28.3 (2CH$_2$), 26.8 (CH$_2$), 26.1 (CH$_2$), 22.5 (CH$_2$), 19.3 (CH$_2$), 14.1 (CH$_3$), 13.9 (CH$_3$); ATR-FTIR (neat): 3369, 2923, 2850, 1686, 1609, 1518, 1490, 1248, 1180 cm$^{-1}$; HRMS (ESI) m/z calculated for C$_{44}$H$_{65}$NO$_5$[M]$^+$: 688.4936, found: 688.4928.

tert-butyl(6-((4-butoxy-4''-(pentyloxy)-[1,1':4',1''-terphenyl]-2-yl)oxy)hexyl)carbamate (3g)

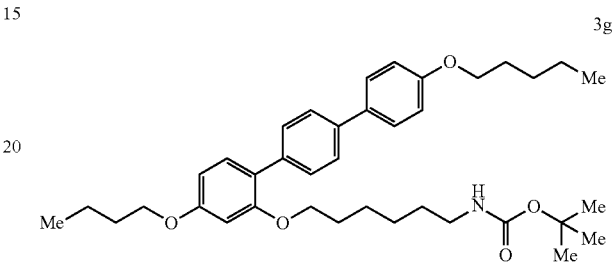

General procedure III was followed by using 150 mg of 2b (0.371 mmol), 219 mg 1b (0.742 mmol), 123 mg of KI (0.742 mmol), and 0.44 mL of KOt-Bu solution in 4.95 mL THF. Purification by flash column chromatography (100:0→85:15 hexanes: EtOAc) on SiO$_2$ afforded 3g (162 mg, 72%) as a white solid, mp=97-98° C. $^1$H NMR (400 MHz, CDCl$_3$): δ 7.61-7.51 (m, 6H), 7.27 (d, J=8.3 Hz, 1H), 6.97 (d, J=8.4 Hz, 2H), 6.60-6.53 (m, 2H), 4.40 (br. s, 1H), 4.00 (t, J=6.6 Hz, 4H), 3.95 (t, J=6.4 Hz, 2H), 3.11-3.00 (m, 2H), 1.88-1.66 (m, 6H), 1.55-1.45 (m, 6H), 1.44 (s, 9H), 1.36-1.27 (m, 6H), 0.99 (t, J=7.4 Hz, 3H), 0.94 (t, J=7.1 Hz, 3H); $^{13}$C NMR (100 MHz, CDCl$_3$): δ 159.7 (C), 158.6 (C), 156.9 (C), 156.0 (C), 138.6 (C), 136.9 (C), 133.4 (C), 131.0 (CH), 129.7 (2CH), 128.0 (2CH), 126.0 (2CH), 123.1 (C), 114.7 (2CH), 105.4 (CH), 100.4 (CH), 79.0 (C), 68.3 (CH$_2$), 68.1 (CH$_2$), 67.8 (CH$_2$), 40.5 (CH$_2$), 31.4 (CH$_2$), 30.0 (CH$_2$), 29.0 (2CH$_2$), 28.4 (3CH$_3$), 28.2 (CH$_2$), 26.4 (CH$_2$), 25.8 (CH$_2$), 22.5 (CH$_2$), 19.3 (CH$_2$), 14.0 (CH$_3$), 13.9 (CH$_3$); ATR-FTIR (neat): 3358, 2927, 2857, 1716, 1608, 1492, 1178 cm$^{-1}$; HRMS (ESI) m/z calculated for C$_{38}$H$_{53}$NO$_5$ [M]$^+$: 604.3997, found: 604.399.

tert-butyl(3-((4-butoxy-4"-(pentyloxy)-[1,1':4',1"-terphenyl]-2-yl)oxy)propyl)carbamate (3h)

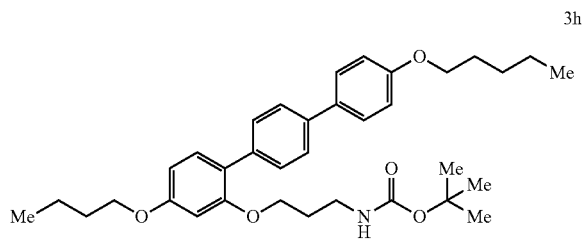 [SMILES: CCCCCOc1ccc(-c2ccc(-c3ccc(OCCCC)cc3OCCCNC(=O)OC(C)(C)C)cc2)cc1]

3h

General procedure III was followed by using 115 mg of 2b (0.284 mmol), 219 mg 1d (0.568 mmol), 94 mg of KI (0.568 mmol), and 0.33 mL of KOt-Bu solution in 3.79 mL THF. Purification by flash column chromatography (100:0→85:15 hexanes: EtOAc) on SiO$_2$ afforded 3h (138 mg, 86%) as a white solid, mp=80-81° C. $^1$H NMR (400 MHz, CDCl$_3$): mp=105° C. $^1$H NMR (400 MHz, CDCl$_3$): δ 7.62-7.50 (m, 6H), 7.28 (d, J=8.3 Hz, 1H), 6.98 (d, J=8.4 Hz, 2H), 6.61-6.55 (m, 2H), 4.60 (br s, 1H), 4.00 (t, J=6.5 Hz, 6H), 3.24 (q, J=6.4 Hz, 2H), 1.93 (pen, J=6.3 Hz, 2H), 1.87-1.73 (m, 4H), 1.58-1.41 (m, 6H), 1.40 (s, 9H), 1.00 (t, J=7.4 Hz, 3H), 0.95 (t, J=7.1 Hz, 3H); $^{13}$C NMR (100 MHz, CDCl$_3$): δ 159.8 (C), 158.6 (C), 156.7 (C), 156.0 (C), 138.8 (C), 136.7 (C), 133.3 (C), 131.1 (CH), 129.7 (2CH), 128.0 (2CH), 126.2 (2CH), 123.3 (C), 114.7 (2CH), 105.9 (CH), 100.7 (CH), 79.1 (C), 68.1 (CH$_2$), 67.8 (CH$_2$), 66.4 (CH$_2$), 38.0 (CH$_2$), 29.4 (CH$_2$), 29.0 (CH$_2$), 28.4 (3CH$_3$), 28.2 (CH$_2$), 27.8 (CH$_2$), 22.5 (CH$_2$), 19.3 (CH$_2$), 14.0 (CH$_3$), 13.9 (CH$_3$); ATR-FTIR (neat): 3376, 2930, 2871, 1693, 1491, 1294, 1181 cm$^{-1}$; HRMS (ESI) m/z calculated for C$_{35}$H$_{47}$NO$_5$[M]$^+$: 562.3527, found: 562.3512.

tert-butyl(6-((4-methoxy-[-1,1':4',1":4"',1"'-quaterphenyl]-2-yl)oxy)hexyl)carbamatemp (3i)

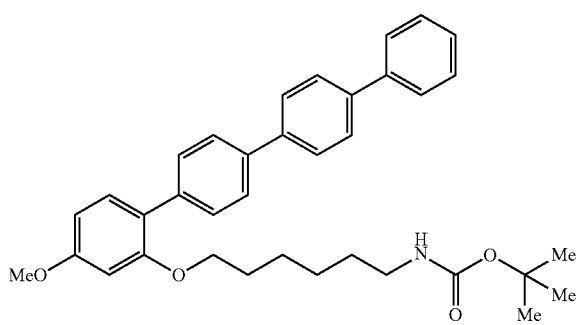

3i

General procedure III was followed by using 93 mg of 2c (0.263 mmol), 156 mg 1b (0.526 mmol), 87 mg of KI (0.526 mmol), and 0.31 mL of KOt-Bu solution in 3.5 mL THF. Purification by flash column chromatography (100:0→85:15 hexanes: EtOAc) on SiO$_2$ afforded 3i (60 mg, 41%) as an off-white solid, mp=130-131° C. $^1$H NMR (400 MHz, CDCl$_3$): δ 7.76-7.57 (m, 10H), 7.46 (t, J=6.4 Hz, 2H), 7.39-7.33 (m, 1H), 7.32 (d, J=8.2 Hz, 1H), 6.63-6.53 (m, 2H), 4.4 (s, 1H), 3.97 (t, J=6.4 Hz, 2H), 3.86 (s, 3H), 3.15-3.01 (m, 2H), 1.80-1.71 (m, 2H), 1.48-1.45 (m, 2H), 1.42 (s, 9H), 1.37-1.30 (m, 4H); $^{13}$C NMR (100 MHz, CDCl$_3$): δ 160.3 (C), 157.0 (C), 140.7 (C), 139.9 (2C), 138.5 (C), 137.6 (C), 131.1 (CH), 129.9 (2CH), 128.8 (2CH), 127.5 (2CH), 127.3 (3CH), 127.0 (2CH), 126.4 (2CH), 123.2 (C), 104.8 (CH), 100.0 (CH), 79.0 (C), 68.3 (OCH$_2$), 55.4 (OCH$_3$), 40.5 (CH$_2$), 30.0 (CH$_2$), 29.7 (CH$_2$), 29.0 (CH$_2$), 28.4 (3CH$_3$), 26.4 (CH$_2$), 25.8 (CH$_2$); ATR-FTIR (neat): 3365, 2927, 2857, 1677, 1609, 1515, 1143 cm$^{-1}$; HRMS (ESI) m/z calculated for C$_{36}$H$_{41}$NO$_4$[M]$^+$: 552.3108, found: 552.3101.

General Experimental Procedure for the Synthesis of Mesogenic Organic Ligands (12, e.g., L17-L25).

Into a 20 mL vial charged with a PTFE-coated magnetic stir bar were added 1.0 equivalent of 11 in 0.1 M dry DCM. The reaction mixture was placed in an ice bath, and then 15 equivalents of trifluoroacetic acid were added slowly. After 2 hours, the reaction mixture was quenched with saturated sodium bicarbonate and extracted three times with DCM. The organic layer was passed through a pad of anhydrous sodium sulfate and removed under reduced pressure to afford 12 (L17-L25) as a solid.

12-((4-methoxy-4"-(pentyloxy)-[1,1':4',1"-terphenyl]-2-yl)oxy)dodecan-1-amine (L20)

General procedure IV was followed by using 120 mg of 3a (0.186 mmol), 0.213 mL TFA and 1.9 mL DCM. (95 mg, 94%) of L20 was obtained as a white solid, mp=109-110° C. $^1$H NMR (400 MHz, CDCl$_3$): δ 7.84 (br, (s), 1H), 7.62-7.50 (m, 6H), 7.29 (d, J=8.4 Hz, 1H), 6.96 (d, J=8.4 Hz, 2H), 6.59-6.52 (m, 2H), 3.99 (t, J=6.6 Hz, 2H), 3.94 (t, J=6.5 Hz, 2H), 3.84 (s, 3H), 1.81 (pen, J=7.2 Hz, 2H), 1.74 (pen, J=7.2 Hz, 2H), 1.62 (pen, J=7.4 Hz, 2H), 1.50-1.39 (m, 6H), 1.32-1.20 (m, 14H), 0.94 (t, J=7.1 Hz, 3H); $^{13}$C NMR (100 MHz, CDCl$_3$): δ 160.2 (C), 158.6 (C), 157.0 (C), 138.7 (C), 136.8 (C), 133.4 (C), 131.0 (CH), 129.7 (2CH), 127.9 (2CH), 126.0 (2CH), 123.2 (C), 114.7 (2CH), 104.7 (CH), 99.9 (CH), 68.4 (CH$_2$), 68.1 (CH$_2$), 55.4 (OCH$_3$), 40.0 (CH$_2$), 29.6 (CH$_2$), 29.5 (CH$_2$), 29.4 (CH$_2$), 29.3 (CH$_2$), 29.2 (CH$_2$), 29.1 (CH$_2$), 29.0 (CH$_2$), 28.9 (CH$_2$), 28.2 (CH$_2$), 27.5 (CH$_2$), 26.3 (CH$_2$), 26.1 (CH$_2$), 22.5 (CH$_2$), 14.0 (CH$_3$); ATR-FTIR (neat): 2925, 2855, 1607, 1490, 1202, 1139 cm$^{-1}$; HRMS (ESI) m/z calculated for C$_{36}$H$_{51}$NO$_3$[M]$^+$: 546.3942, found: 546.3924.

6-((4-methoxy-4"-(pentyloxy)-[1,1':4',1"-terphenyl]-2-yl)oxy)hexan-1-amine (L19)

General procedure IV was followed by using 260 mg of 3b (0.463 mmol), 0.53 mL TFA and 4.6 mL DCM. (207 mg, 97%) of L19 was obtained as a white solid, mp=125-126° C. $^1$H NMR (400 MHz, CDCl$_3$): δ 7.59-7.48 (m, 6H), 7.27 (d, J=8.4 Hz, 1H), 6.95 (d, J=8.8 Hz, 2H), 6.58-6.51 (m, 2H), 3.97 (t, J=6.6 Hz, 2H), 3.91 (t, J=6.4 Hz, 2H), 3.82 (s, 3H), 2.75 (t, J=7.4 Hz, 2H), 1.80 (pen, J=6.5 Hz, 2H), 1.71 (pen, J=6.5 Hz, 2H), 1.57-1.24 (m, 12H), 0.93 (t, J=7.1 Hz, 3H); $^{13}$C NMR (100 MHz, CDCl$_3$): δ 160.2 (C), 158.6 (C), 156.9 (C), 138.6 (C), 136.8 (C), 133.2 (C), 131.1 (CH), 129.7 (2CH), 127.9 (2CH), 126.0 (2CH), 123.3 (C), 114.7 (2CH), 104.9 (CH), 99.9 (CH), 68.1 (CH$_2$), 68.0 (CH$_2$), 55.4 (OCH$_3$), 40.5 (CH$_2$), 29.5 (CH$_2$), 29.0 (CH$_2$), 28.8 (CH$_2$), 28.2 (CH$_2$), 26.0 (CH$_2$), 25.6 (CH$_2$), 22.5 (CH$_2$), 14.0 (CH$_3$); ATR-FTIR (neat): 2936.3, 2868.6, 1677.7, 1607.3, 1490.5, 1201.3 cm$^{-1}$; HRMS (ESI) m/z calculated for C$_{30}$H$_{39}$NO$_3$[M]$^+$: 462.3003, found: 462.3002.

4-((4-methoxy-4"-(pentyloxy)-[1,1':4',1"-terphenyl]-2-yl)oxy)butan-1-amine (L24)

General procedure IV was followed by using 115 mg of 3c (0.215 mmol), 0.25 mL TFA and 2.2 mL DCM. (83 mg, 93%) of L24 was obtained as a white solid, mp=130-131° C. $^1$H NMR (400 MHz, CDCl$_3$): δ 7.58-7.48 (m, 6H), 7.27 (d, J=8.4 Hz, 1H), 6.94 (d, J=8.7 Hz, 2H), 6.56 (dd, J=8.4, 2.4 Hz, 2H), 6.51 (d, J=3.9 Hz, 1H), 3.97 (t, J=6.6 Hz, 2H), 3.92 (t, J=6.1 Hz, 2H), 3.82 (s, 3H), 2.75 (br (s), 2H), 1.83-1.61 (m, 6H), 1.49-1.33 (m, 4H), 0.94 (t, J=7.1 Hz, 3H); $^{13}$C NMR (100 MHz, CDCl$_3$): δ 160.1 (C), 158.6 (C), 156.6 (C), 138.7 (C), 136.7 (C), 133.1 (C), 131.2 (CH), 129.7 (2CH), 127.9 (2CH), 126.0 (2CH), 123.3 (C), 114.7 (2CH), 105.1 (CH), 100.0 (CH), 68.0 (CH$_2$), 67.7 (CH$_2$), 55.4 (OCH$_3$), 39.8 (CH$_2$), 29.0 (CH$_2$), 28.2 (CH$_2$), 26.3 (CH$_2$), 26.2 (CH$_2$), 22.5 (CH$_2$), 14.0 (CH$_3$); ATR-FTIR (neat): 2935, 2871, 1607, 1490, 1253, 1201 cm$^{-1}$; HRMS (ESI) m/z calculated for C$_{28}$H$_{35}$NO$_3$[M]$^+$: 434.2690, found: 434.2672.

3-((4-methoxy-4"-(pentyloxy)-[1,1':4',1"-terphenyl]-2-yl)oxy)propan-1-amine (L18)

General procedure IV was followed by using 160 mg of 3d (0.308 mmol), 0.35 mL TFA and 3.1 mL DCM. (125 mg, 97%) of L18 was obtained as a white solid, mp=147-150° C. $^1$H NMR (400 MHz, CDCl$_3$): δ 7.56 (d, J=8.8 Hz, 2H), 7.53 (d, J=8.4 Hz, 1H), 7.32 (br (s), 2H), 7.21 (d, J=8.4 Hz, 2H), 6.89 (d, J=8.7 Hz, 2H), 3.96 (t, J=5.6 Hz, 2H), 3.89 (t, J=6.6 Hz, 2H), 3.84 (s, 3H), 2.65 (br (s), 2H), 1.89 (pen, J=5.7 Hz, 2H), 1.75 (pen, J=5.8 Hz, 2H), 0.93 (t, J=7.0 Hz, 3H); $^{13}$C NMR (100 MHz, CDCl$_3$): δ 160.3 (C), 158.7 (C), 155.7 (C), 139.0 (C), 136.3 (C), 133.6 (C), 131.0 (CH), 129.8 (2CH), 127.9 (2CH), 126.4 (2CH), 123.2 (C), 114.8 (2CH), 105.6 (CH), 99.5 (CH), 68.1 (CH$_2$), 67.3 (CH$_2$), 55.4 (OCH$_3$), 38.6 (CH$_2$), 29.0 (CH$_2$), 28.2 (CH$_2$), 26.2 (CH$_2$), 22.5 (CH$_2$), 14.0 (CH$_3$); ATR-FTIR (neat): 2934, 2872, 1609, 1492, 1249, 1202, 1137 cm$^{-1}$; HRMS (ESI) m/z calculated for C$_{27}$H$_{33}$NO$_3$[M]$^+$: 420.2533, found: 420.2521.

2-((4-methoxy-4"-(pentyloxy)-[1,1':4',1"-terphenyl]-2-yl)oxy)ethan-1-amine (L17)

General procedure IV was followed by using 60 mg of 3e (0.119 mmol), 0.136 mL TFA and 1.2 mL DCM. (45 mg, 93%) of L17 was obtained as an off-white solid, mp=147-150° C. $^1$H NMR (400 MHz, CDCl$_3$): δ 7.56 (d, J=8.1 Hz, 2H), 7.52 (d, J=8.6 Hz, 2H), 7.27 (d, J=8.7 Hz, 2H), 6.93 (d, J=8.6 Hz, 2H), 6.66 (dd, J=8.5, 2.4 Hz, 1H), 6.54 (d, J=2.4 Hz, 1H), 4.07 (t, J=4.9 Hz, 2H), 3.95 (t, J=6.6 Hz, 2H), 3.82 (s, 3H), 3.13 (t, J=4.8 Hz, 2H), 1.79 (pen, J=6.8 Hz, 3H), 1.48-1.37 (m, 2H), 0.94 (t, J=7.0 Hz, 3H); $^{13}$C NMR (125 MHz, CD$_2$Cl$_2$): δ 160.3 (C), 158.9 (C), 155.3 (C), 139.0 (C), 132.6 (C), 132.5 (C) 131.4 (CH), 129.5 (2CH), 127.7 (2CH), 126.3 (2CH), 123.6 (C), 114.7 (2CH), 107.3 (CH), 101.2 (CH), 68.0 (CH$_2$), 64.9 (CH$_2$), 55.4 (OCH$_3$), 39.5 (CH$_2$), 29.0 (CH$_2$), 28.1 (CH$_2$), 22.5 (CH$_2$), 13.8 (CH$_3$); ATR-FTIR (neat): 2933, 2870, 1608, 1531, 1248, 1141 cm$^{-1}$; HRMS (ESI) m/z calculated for C$_{26}$H$_{31}$NO$_3$[M]$^+$: 420.2533, found: 420.2521.

12-((4-butoxy-4"-(pentyloxy)-[1,1':4',1"-terphenyl]-2-yl)oxy)dodecan-1-amine (L25)

General procedure IV was followed by using 100 mg of 3f (0.145 mmol), 0.17 mL TFA and 1.5 mL DCM. (80 mg, 94%) of L25 was obtained as a white solid, mp=70-72° C. $^1$H NMR (400 MHz, CDCl$_3$): δ 7.62-7.53 (m, 6H), 7.29 (d, J=8.4 Hz, 1H), 6.98 (d, J=8.4 Hz, 2H), 6.59-6.53 (m, 2H), 5.16 (br s, 1H), 4.00 (t, J=6.5 Hz, 4H), 3.96 (t, J=6.5 Hz, 2H), 2.79 (t, J=7.4 Hz, 2H), 1.86-1.70 (m, 6H), 1.68-1.27 (m, 2H), 1.58-1.32 (m, 14H), 1.25 (s, 9H), 1.00 (t, J=7.4 Hz, 3H), 0.99 (t, J=7.1 Hz, 3H); $^{13}$C NMR (100 MHz, CDCl$_3$): δ 159.8 (C), 158.6 (C), 157.0 (C), 138.6 (C), 136.9 (C), 133.4 (C), 131.0 (CH), 129.7 (2CH), 127.9 (2CH), 126.0 (2CH), 123.0 (C), 114.7 (2CH), 105.3 (CH), 100.4 (CH), 68.5 (CH$_2$), 68.1 (CH$_2$), 67.8 (CH$_2$), 40.9 (CH$_2$), 31.4 (CH$_2$), 30.3 (CH$_2$), 29.6 (CH$_2$), 29.5 (2CH$_2$), 29.3 (CH$_2$), 29.2 (CH$_2$), 29.1 (CH$_2$), 29.0 (CH$_2$), 28.2 (2CH$_2$), 26.6 (CH$_2$), 26.1 (CH$_2$), 22.5 (CH$_2$), 19.3 (CH$_2$), 14.0 (CH$_3$), 13.9 (CH$_3$); ATR-FTIR (neat): 2926, 2854, 1609, 1491, 1247, 1182 cm$^{-1}$; HRMS (ESI) m/z calculated for C$_{39}$H$_{57}$NO$_3$[M]$^+$: 588.4411, found: 588.4398.

6-((4-butoxy-4"-(pentyloxy)-[1,1':4',1"-terphenyl]-2-yl)oxy)hexan-1-amine (L21)

General procedure IV was followed by using 150 mg of 3g (0.248 mmol), 0.28 mL TFA and 2.5 mL DCM. (120 mg, 96%) of L21 was obtained as a white solid, mp=100-101° C. $^1$H NMR (400 MHz, CDCl$_3$): δ 7.59-7.52 (m, 6H), 7.26 (d, J=8.4 Hz, 1H), 6.95 (d, J=8.4 Hz, 2H), 6.58-6.50 (m, 2H), 4.02-3.95 (m, 4H), 3.91 (t, J=6.4 Hz, 2H), 2.76 (t, J=7.4 Hz, 2H), 1.84-1.75 (m, 4H), 1.75-1.66 (m, 2H), 1.58-1.29 (m, 12H), 0.98 (t, J=7.1 Hz, 3H), 0.93 (t, J=7.1 Hz, 3H); $^{13}$C NMR (100 MHz, CDCl$_3$): δ 159.9 (C), 158.6 (C), 156.9 (C), 139.0 (C), 136.8 (C), 132.2 (C), 131.1 (CH), 129.7 (2CH), 128.0 (2CH), 126.0 (2CH), 123.0 (C), 114.7 (2CH), 105.5 (CH), 100.4 (CH), 68.1 (CH$_2$), 68.0 (CH$_2$), 67.8 (CH$_2$), 40.3 (CH$_2$), 31.4 (CH$_2$), 29.0 (CH$_2$), 28.9 (CH$_2$), 28.8 (CH$_2$), 28.2 (CH$_2$), 26.0 (CH$_2$), 25.6 (CH$_2$), 22.5 (CH$_2$), 19.3 (CH$_2$), 14.0 (CH$_3$), 13.9 (CH$_3$); ATR-FTIR (neat): 2956, 29354, 2871, 1677, 1609, 1530, 1202, 1182 cm$^{-1}$; HRMS (ESI) m/z calculated for C$_{30}$H$_{39}$NO$_3$[M]$^+$: 504.3472, found: 504.3481.

3-((4-butoxy-4"-(pentyloxy)-[1,1':4',1"-terphenyl]-2-yl)oxy)propan-1-amine (L23)

General procedure IV was followed by using 130 mg of 3h (0.231 mmol), 0.26 mL TFA and 2.31 mL DCM. (102 mg, 96%) of L23 was obtained as a white solid, mp=122-123° C. $^1$H NMR (400 MHz, CDCl$_3$): δ 7.60-7.51 (m, 4H), 7.40 (d, J=8.4 Hz, 2H), 7.20 (d, J=8.3 Hz, 1H), 6.89 (d, J=8.4 Hz, 2H), 6.59 (dd, J=8.4, 2.3 Hz, 1H), 6.48 (d, J=2.3 Hz, 1H), 4.03-3.95 (m, 4H), 3.90 (t, J=6.6 Hz, 2H), 2.63 (t, J=5.9 Hz, 2H), 1.92-1.85 (m, 2H), 1.85-1.70 (m, 4H), 1.56-1.47 (m, 4H), 1.00 (t, J=7.4 Hz, 2H), 0.93 (t, J=7.00 Hz, 2H); $^{13}$C NMR (100 MHz, CDCl$_3$): δ 159.9 (C), 158.7 (C), 155.7(C), 139.0 (C), 136.4 (C), 132.6 (C), 131.0 (CH), 129.8 (2CH), 128.0 (2CH), 126.4 (2CH), 123.0 (C), 114.7 (2CH), 106.2 (CH), 99.8 (CH), 68.0 (CH$_2$), 67.9 (CH$_2$), 67.5 (CH$_2$), 38.7 (CH$_2$), 31.3 (CH$_2$), 29.0 (CH$_2$), 28.2 (CH$_2$), 26.4 (CH$_2$), 22.5 (CH$_2$), 19.3 (CH$_2$), 14.0 (CH$_3$), 13.9 (CH$_3$); ATR-FTIR (neat): 2958, 2935, 2873, 1677, 1609, 1492, 1202 cm$^{-1}$; HRMS (ESI) m/z calculated for C$_{30}$H$_{39}$NO$_3$[M]$^+$: 462.3003, found: 462.3000.

6-((4-methoxy-[1,1':4',1":4",1'''-quaterphenyl]-2-yl)oxy)hexan-1-amine (22)

General procedure IV as followed by using 52 mg of 3i (0.148 mmol), 0.23 mL TFA (20 equiv) and 1.5 mL DCM. A mixture of hexanes:EtOAC (4:1) was added to the solid and the product was filtered to afford (20 mg, 47%) of L22 as a light yellow solid, mp=125-126° C. $^1$H NMR (400 MHz, CDCl$_3$): δ 7.73-7.55 (m, 11H), 7.73-7.55 (m, 2H), 7.29 (d, J=8.4 Hz, 1H), 6.57 (dd, J=8.3, 2.4 Hz, 1H), 6.53 (d, J=2.4 Hz, 1H), 3.92 (t, J=6.4 Hz, 2H), 3.83 (s, 3H), 3.38 (br, s, 2H), 2.74 (br, s, 2H), 1.72 (pen, J=6.7 Hz, 2H), 1.59-1.45 (m, 2H), 1.40 (pen, J=7.1 Hz, 2H), 1.31-1.27 (m, 2H); $^{13}$C NMR (100 MHz, CDCl$_3$): δ 160.3 (C), 156.9 (C), 156.9 (C), 140.7 (C), 139.9 (C), 138.4 (C), 137.6 (C), 131.2 (CH), 129.8 (2CH), 128.8 (2CH), 127.5 (2CH), 127.4 (CH), 127.3 (2CH), 127.0 (2CH), 126.4 (2CH), 123.1 (C), 104.9 (CH), 100.0 (CH), 68.1 (CH$_2$), 55.4 (OCH$_3$), 28.8 (CH$_2$), 26.2 (CH$_2$), 25.7 (CH$_2$); ATR-FTIR (neat): 2956, 29354, 2871, 1677, 1609, 1530, 1202, 1182 cm$^{-1}$; HRMS (ESI) m/z calculated for C$_{31}$H$_{33}$NO$_2$[M]$^+$: 452.2584, found: 452.2585.

Experimental Procedure for the Synthesis of Mesogenic Organic Ligand Containing Thiol Tether (e.g., Mesogenic Ligand (L26)).

The mesogenic ligands of formulae (II) and (III) containing thiol tethers (e.g., compound (L26)) were synthesized according to the procedure outlined in Scheme 3. With reference to Scheme 3, the sequence of reactions proceeds as follows: after preparation of ligand core 10a (e.g., via a Suzuki coupling between a bromide and a boronic acid as described in Scheme 2). The ortho-functionality was then added via coupling of the phenol 10a with bromothiolate 13a. The thiol protecting group of a compound of formula 11a was then removed to yield the mesogenic ligand (L26).

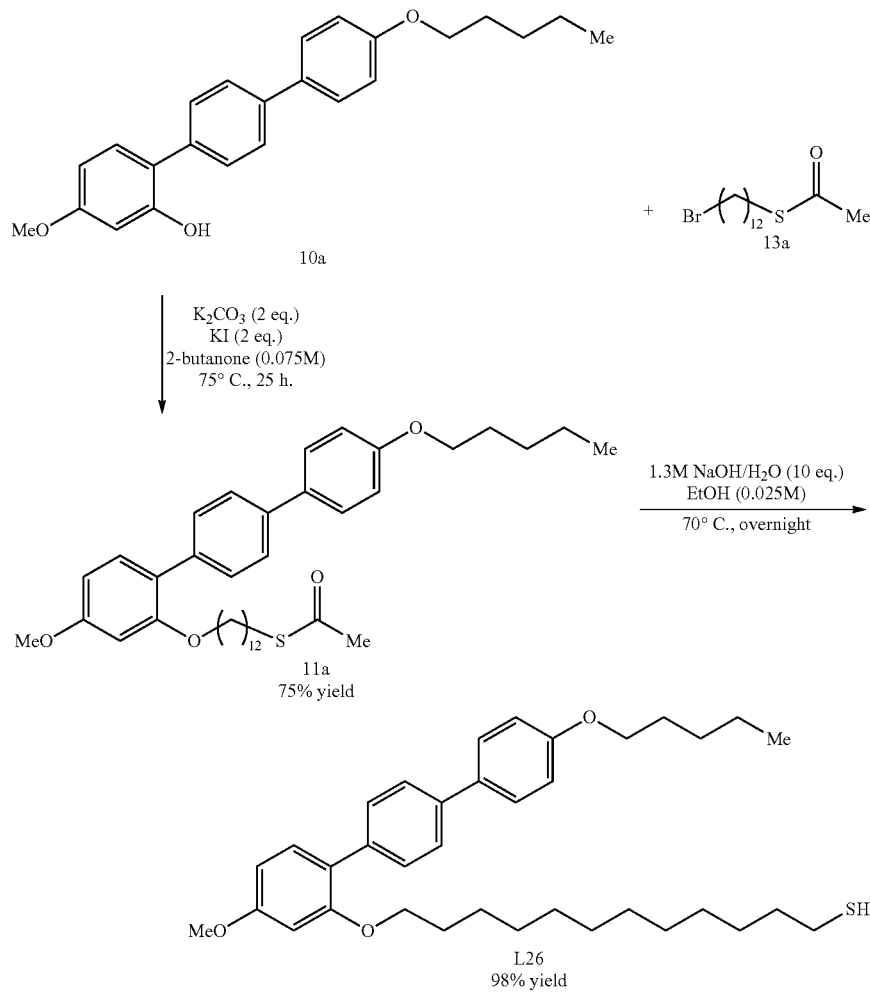

Scheme 3 - Sequence of reactions used to prepare the mesogenic ligand L26.

S-(12-((4-methoxy-4"-(pentyloxy)-[1,1':4',1"-terphenyl]-2-yl)oxy)dodecyl) ethanethioate (11a)

Into a 20 mL vial charged with a PTFE-coated magnetic stir bar were added 89.8 mg of 4-methoxy-4"-(pentyloxy) [1,1':4',1"-terphenyl]-2-ol (10a, 0.248 mmol) and 96.2 mg of S-(12-bromododecyl) ethanethioate (13a, 0.297 mmol) in 3.3 mL of 2-butanone (0.075 M). 68.6 mg of K$_2$OC$_3$ (0.496 mmol) and 82.3 mg of KI (0.496 mmol) were added to the reaction mixture. Reaction was heated to 75° C. and stopped after 25 hours. The solvent was evaporated and the crude mixture was extracted with water and EtOAc. The organic layer was passed through a pad of anhydrous sodium sulfate and removed under reduced pressure. Purification by column chromatography (100:0 to 95:5 hexanes: EtOAc) on SiO$_2$ afforded 111.6 mg of the product 11a (75%). $^1$H NMR (400 MHz, CDCl$_3$): δ 7.60-7.55 (m, 6H), 7.30 (dd, J=7.6, 1.1 Hz, 1H), 6.99-6.96 (m, 2H), 6.59-6.56 (m, 2H), 4.00 (t, J=6.6 Hz, 2H), 3.96 (t, J=6.4 Hz, 2H), 3.85 (s, 3H), 2.85 (t, J=7.2 Hz, 2H), 2.32 (s, 3H), 1.82 (pen, J=6.8, 2H), 1.75 (pen, J=6.8 Hz, 2H), 1.56-1.24, (m, 22H), 0.95 (t, J=7.2 Hz, 3H); $^{13}$C NMR (100 MHz, CDCl$_3$): δ 196.2 (CO), 160.3 (C), 158.7 (C), 157.2 (C), 138.8 (C), 136.9 (C), 133.6 (C), 131.2 (CH), 129.9 (2CH), 128.1 (2CH), 126.2 (2CH), 123.5 (C), 114.9 (2CH), 104.8 (CH), 100.1 (CH), 68.6 (OCH$_2$), 68.2 (OCH$_2$), 55.6 (OCH$_3$), 30.8 (CH$_3$), 29.7 (2CH$_2$), 29.7 (CH$_2$S), 29.6 (CH$_2$), 29.6 (CH$_2$), 29.4 (CH$_2$), 29.3 (CH$_2$), 29.3 (CH$_2$), 29.2 (CH$_2$), 29.2 (CH$_2$), 29.0 (CH$_2$), 28.4 (CH$_2$), 26.2 (CH$_2$), 22.6 (CH$_2$), 14.2 (CH$_3$).

12-((4-methoxy-4"-(pentyloxy)-[1,1':4',1"-terphenyl]-2-yl)oxy)dodecane-1-thiol (L26)

Into a 20 mL vial charged with a PTFE-coated magnetic stir bar were added 183.9 mg of S-(12-((4-methoxy-4"-(pentyloxy)-[1,1':4',1"-terphenyl]-2-yl)oxy)dodecyl) ethanethioate (11a, 0.304 mmol) in 12.2 mL of EtOH. 121.6 mg of NaOH (3.04 mmol) in 2.34 mL of water was added to the reaction mixture. Reaction was heated to 70° C. overnight. The solvent was evaporated and the crude mixture was extracted with DCM. The organic layer was passed through a pad of anhydrous sodium sulfate and removed under reduced pressure to afford 167.5 mg of the product L26 (98%). $^1$H NMR (400 MHz, CDCl$_3$): δ 7.62-7.49 (m, 6H), 7.30 (d, J=8.4 Hz, 1H), 6.97 (d, J=8.4 Hz, 2H), 6.63-6.53 (m, 2H), 4.00 (t, J=6.6 Hz, 2H), 3.96 (t, J=6.5 Hz, 2H), 3.85 (s, 3H), 2.66 (t, J=7.4 Hz, 2H), 1.82 (pen, J=7.1, 2H), 1.74 (pen, J=7.0, 2H), 1.65 (pen, J=7.3, 2H), 1.51-1.20 (m, 21H), 0.95 (t, J=7.1 Hz, 3H); $^{13}$C NMR (100 MHz, CDCl$_3$): δ 160.2 (C), 158.6 (C), 157.1 (C), 138.7 (C), 136.8 (C), 133.4 (C), 131.1 (CH), 129.8 (2CH), 128.0 (2CH), 126.1 (2CH), 123.3 (C), 114.7 (2CH), 104.7 (CH), 99.9 (CH), 68.4 (OCH$_2$), 68.1 (OCH$_2$), 55.4 (OCH$_3$), 39.2 (CH$_2$), 29.59 (CH$_2$), 29.57 (CH$_2$), 29.54 (CH$_2$), 29.52 (CH$_2$), 29.3 (2CH$_2$), 29.2 (CH$_2$), 29.1 (CH$_2$), 29.0 (CH$_2$), 28.5 (CH$_2$), 28.2 (CH$_2$), 26.1 (CH$_2$), 22.5 (CH$_2$) 14.1 (CH$_3$); ATR-FTIR (neat): 2959, 2852, 1609, 1490, 1276 cm$^{-1}$; HRMS (ESI) m/z calculated for C$_{36}$H$_{50}$SO$_3$[M]$^+$: 563.3553, found: 563.3531.

NMR Nanoparticle Characterization

The octadecylamine surface ligands (ODA) of the commercial quantum dots (QDs) were exchanged with mesogenic ligand L1 (FIG. 1, panel A). The mesogenic ligand's flexible amine tether enhances alignment with the local liquid crystal director, increasing dispersion in the isotropic phase, while providing an attractive interaction between closely packed particles.

After ligand exchange, a mixture of the two ligands on the particle surface was expected and this was quantified using $^1$H NMR spectroscopy. $^1$H NMR was recorded for purified nanocrystals before and after ligand exchange (FIG. 1, panel B). NMR spectra were obtained on an Agilent spectrometer, at 400 and 500 MHz using CDCl$_3$ as a solvent. FIG. 1, panel B shows specific spectral regions corresponding to the hydrogen proximal to the terminating amine group for bound ODA (bottom spectrum), free Mesogenic ligand L1 (middle spectrum) and the final product with bound ODA and mesogenic-ligand L1 (upper spectrum). The triplet shown corresponding to the hydrogen near to the amine group exhibits a notable chemical shift on surface attachment. Using this data, the average ratio of mesogenic ligand L1 to remaining ODA ligand on the particle surface (y) was calculated as the ratio of X:Y, where X is the area under the triplet corresponding to the mesogenic ligand L1 and Y is the area under the triplet corresponding to the ODA ligand. For the data shown in FIG. 1, a value of γ=90/10=9 was obtained. A ratio 60:40 was also obtained by decreasing the concentration of mesogenic ligand during the exchange, however, this variation appeared to have no significant effect on the final structures of the assembled nanostructures. All of the results presented herein were produced with a γ ratio of 9.

In a similar manner, $^1$H NMR spectroscopy was used in order to establish whether or not ligand exchange occurred between the thiol terminated mesogenic ligand (L26) and gold nanoparticles attached to commercial octadecanethiol surface ligands.

Figure 6:
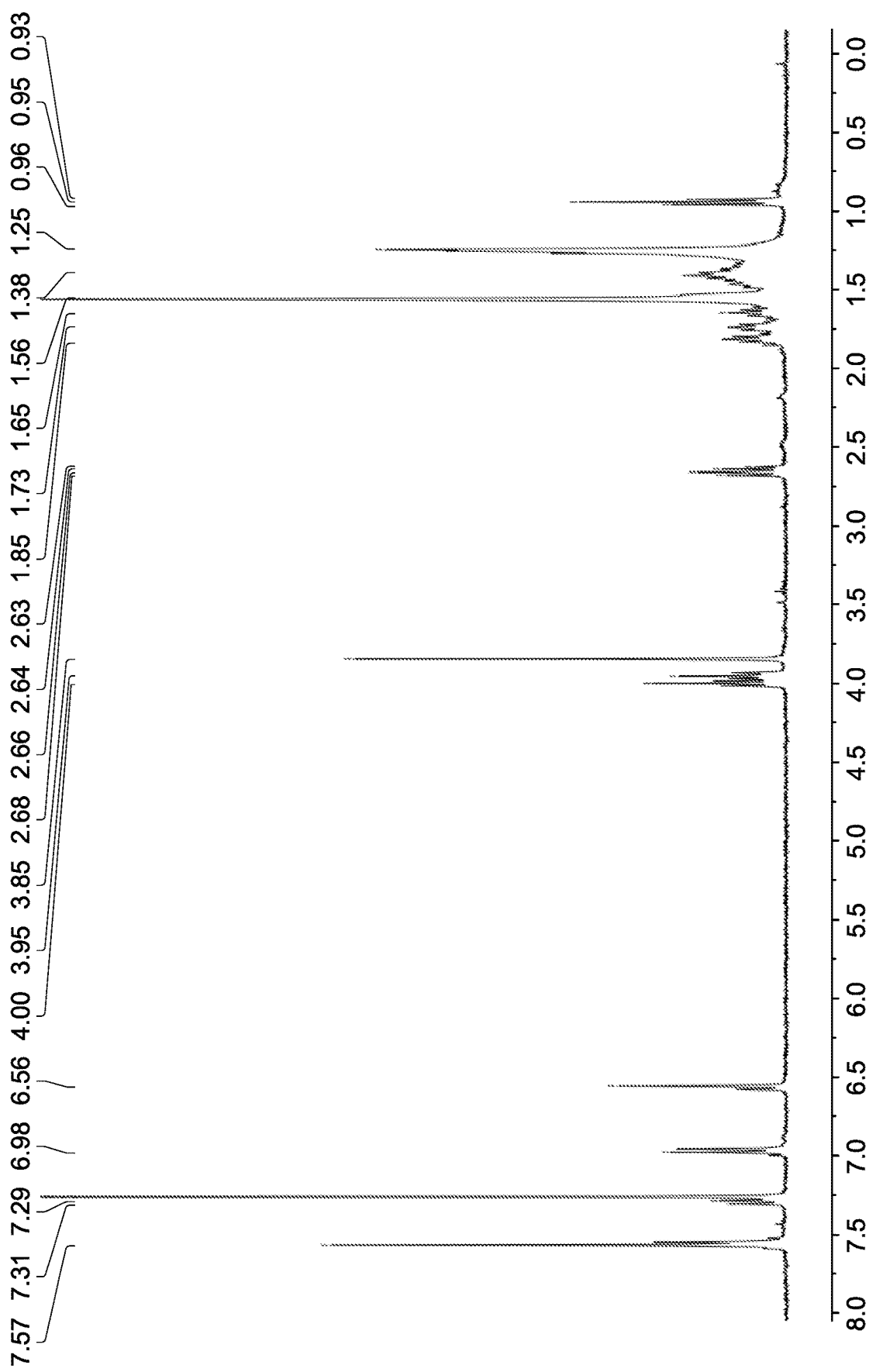
FIG. 6 shows a $^1$H NMR spectrum (CDCl$_3$) of an exemplary thiol terminated ligand (L26).
Figure 7:
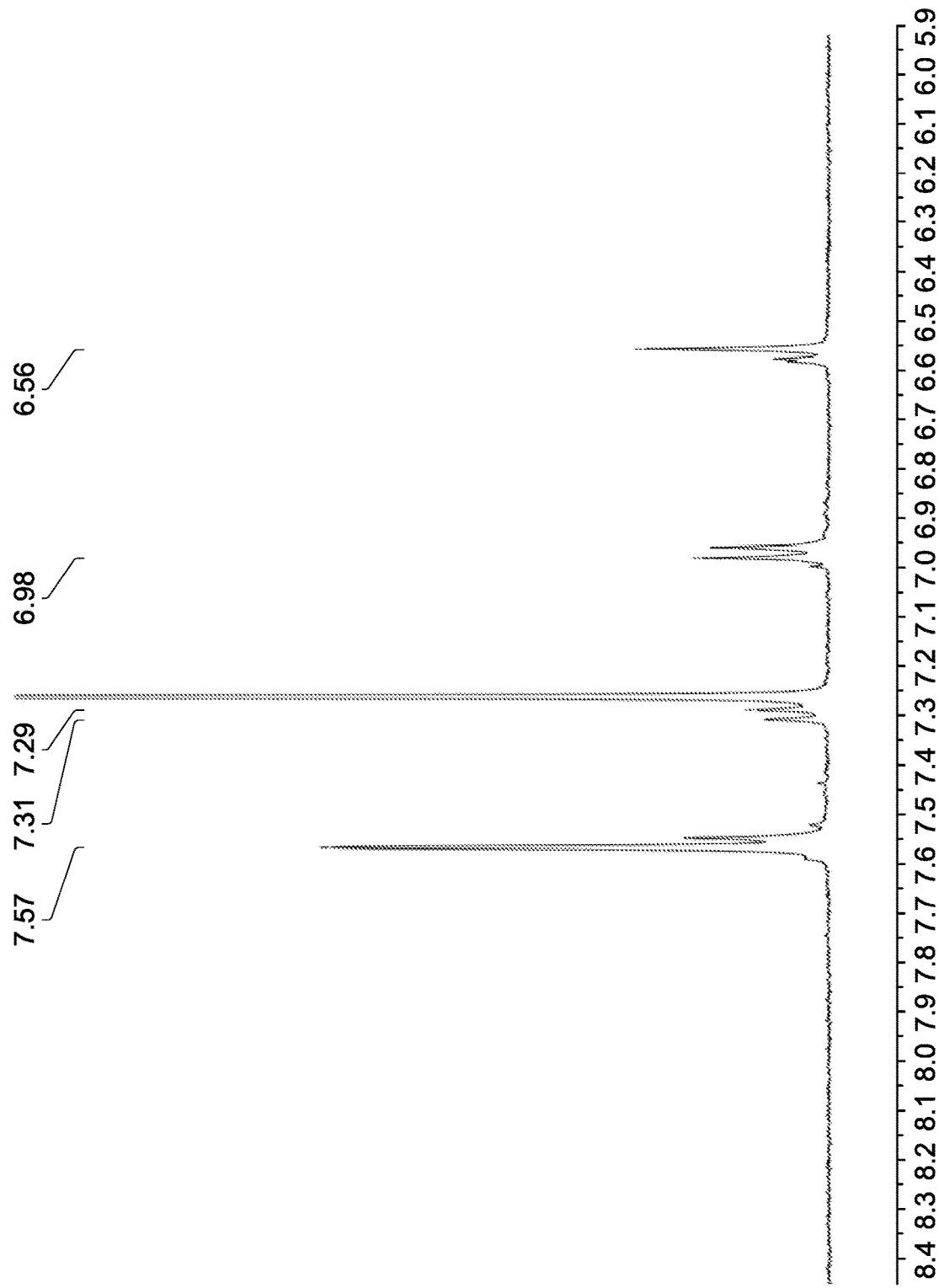
FIG. 7 shows an expansion of the aromatic region of the $^1$H NMR spectrum shown in FIG. 6.
Figure 8:
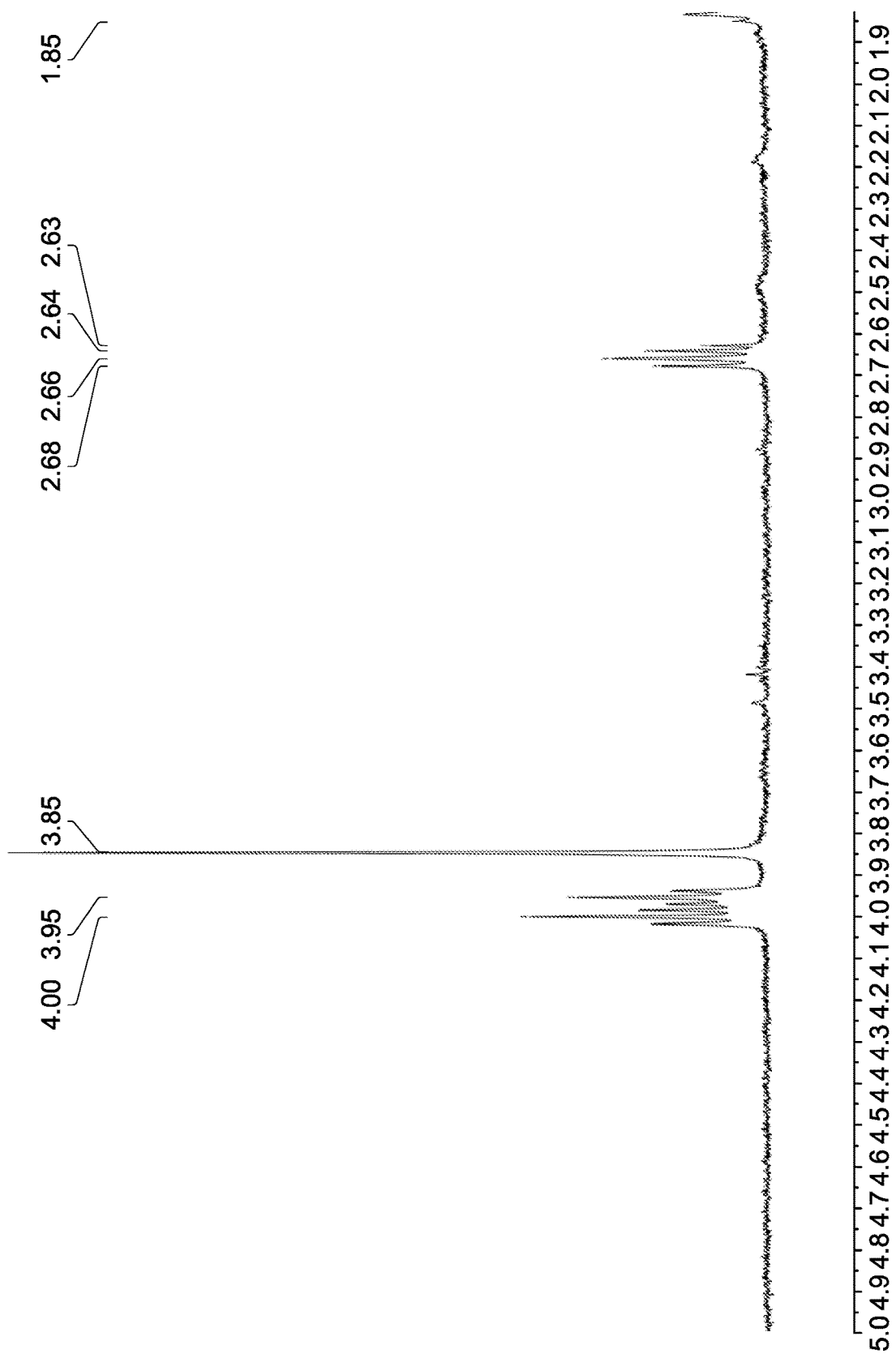
FIG. 8 shows an expansion of the methylenoxy and methoxy region of the $^1$H NMR spectrum shown in FIG. 6.
Figure 9:
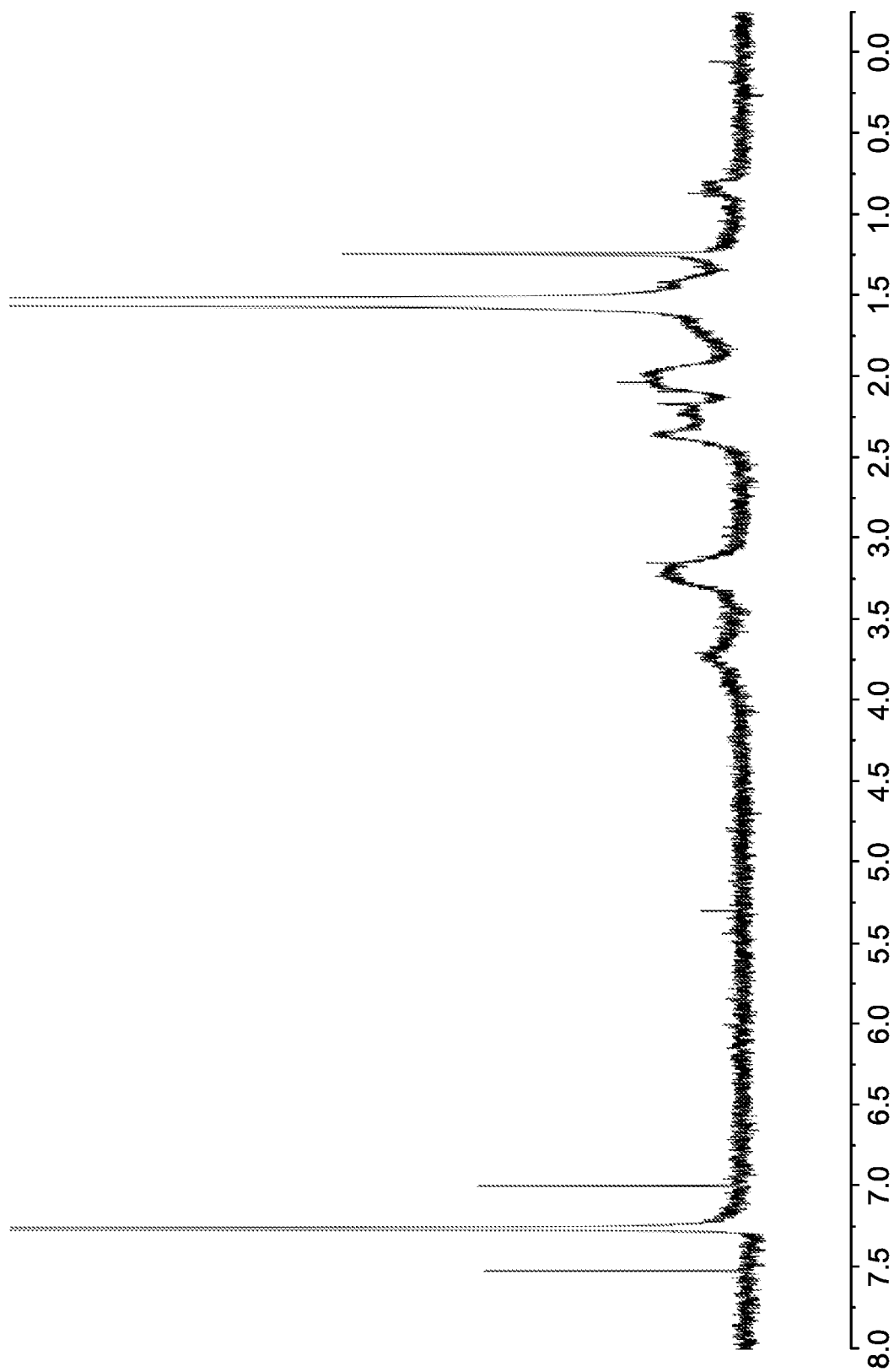
FIG. 9 shows a $^1$H NMR spectrum (CDCl$_3$) of gold nanoparticles attached to non-mesogenic ligands (octadecanethiol, ODT).

First, $^1$H NMR spectra were recorded for purified compounds and nanocrystals before ligand exchange. FIG. 6 shows a $^1$H NMR spectrum (CDCl$_3$) of an exemplary thiol terminated ligand (L26); FIG. 7 shows an expansion of the aromatic region of the $^1$H NMR spectrum shown in FIG. 6; FIG. 8 shows an expansion of the methylenoxy and methoxy region of the $^1$H NMR spectrum shown in FIG. 6; and FIG. 9 shows a $^1$H NMR spectrum (CDCl$_3$) of gold nanoparticles attached to non-mesogenic ligands (octadecanethiol, ODT). The thiol-terminated mesogenic ligand (L26) has three benzene moieties, thus this compound shows the aromatic protons in the 6.56 to 7.57 ppm region (e.g., see FIG. 6 and FIG. 7) On the other hand, the $^1$H NMR spectrum of the ligand attached to the ODT ligand does not contain any aromatic protons, so does not display signals in the 6 to 8 ppm region (e.g., see FIG. 9).

Figure 10:
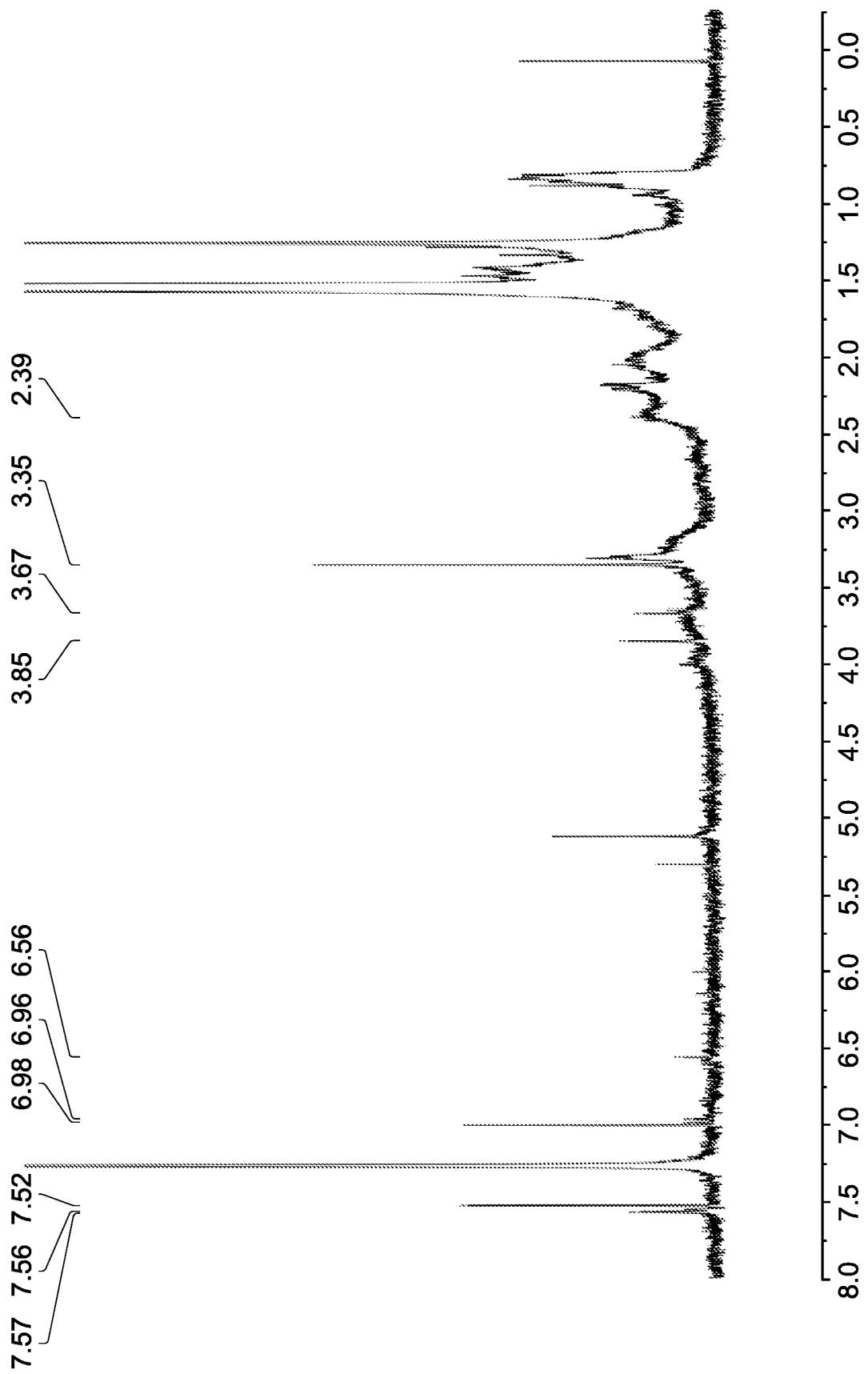
FIG. 10 shows a $^1$H NMR spectrum (CDCl$_3$) of gold nanoparticles attached to non-mesogenic ligands (octadecanethiol, ODT) and an exemplary thiol terminated ligand (L26).
Figure 11:
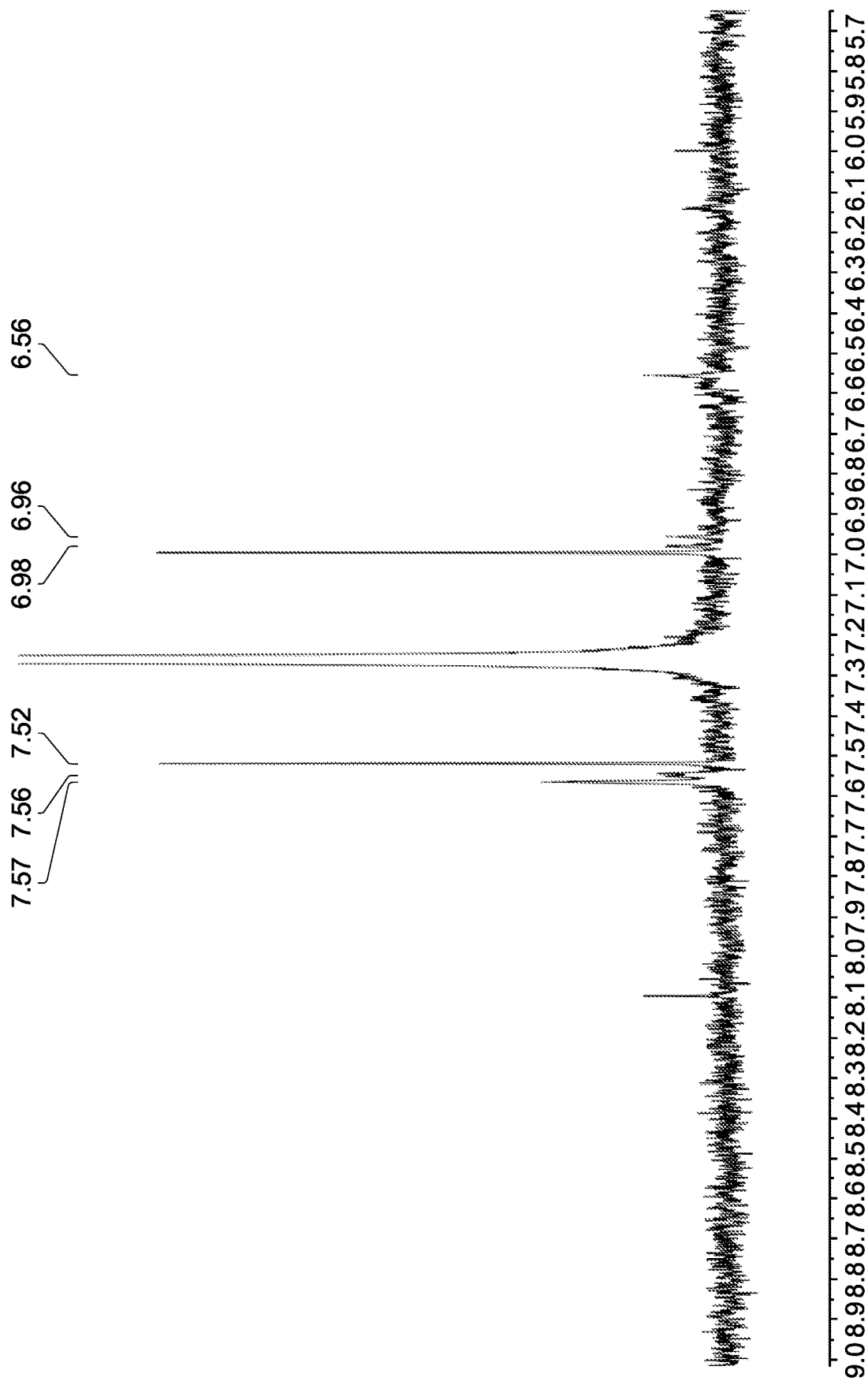
FIG. 11 shows an expansion of the aromatic region of the $^1$H NMR spectrum shown in FIG. 10.
Figure 12:
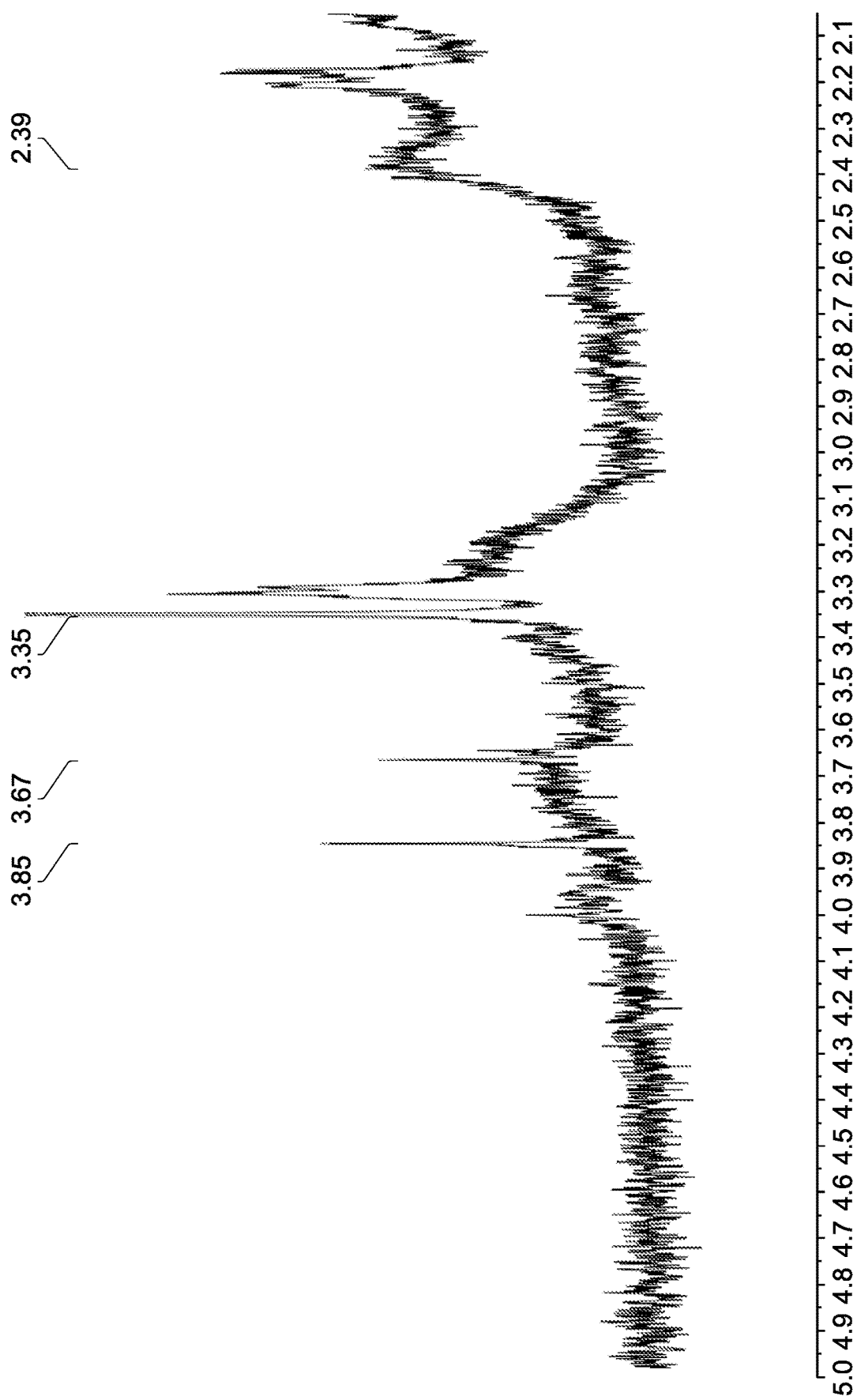
FIG. 12 shows an expansion of the methylenoxy and methoxy region of the $^1$H NMR spectrum shown in FIG. 10.

The octadecanethiol surface ligands (ODT) of the commercial gold nanoparticles were exchanged with mesogenic ligand L26 (FIG. 10 to FIG. 12). After ligand exchange, peaks were observed in the 6.56 to 7.57 ppm region of the $^1$H NMR spectrum, which corresponded to the benzene rings of the thiol ligand. Accordingly, these signals were part of the thiol ligand attached to the gold nanoparticle.

Of note was the shielding of the electrons observed after being attached to the metal nanoparticles. As a result of this shielding effect, the $^1$H NMR spectrum for the ligand exchange sample displayed peaks at lower ppm than the for the free mesogenic ligand (L26). This effect was observed for the OCH$_2$ peaks and OCH$_3$ peak, e.g., for (L26), the OCH$_2$ peaks appeared at 4.00 and 3.95 ppm, whereas for the ligand exchange sample they appeared at 3.85 and 3.67 ppm, respectively; and the OCH$_3$ peak from (L26) appeared at 3.85 ppm but it moved upfield to 3.35 ppm after being attached to the gold nanoparticle (see and compare FIG. 8 and FIG. 12). Also, the triplet that appeared at 2.66 ppm for (L26), corresponding to the methylene group (CH$_2$) closer in proximity to the sulfur (see FIG. 8), had shifted to about 2.39 ppm for the ligand exchange sample (FIG. 12). It is noted that this signal overlaps with peaks from the ODT ligands.

Accordingly, it was observed that the thiol containing mesogenic ligand (L26) was attached to the gold nanoparticle based on the peak signals and chemical shifts experienced by certain peaks in the $^1$H NMR spectra.

Example 2

Foam Formation

Different amounts of mesogenic-modified QDs in toluene (0.075-0.3 wt %) were mixed with 5CB and bath sonicated at 43° C. (in isotropic phase for the 5CB host) for 3-8 hrs. After which time, a homogeneous dispersion of particles was produced in the liquid crystal and residual toluene evaporated. For low QD concentrations (below 0.1 wt %), the amount of added toluene evaporated within 2 hours of sonication. Toluene removal was verified by checking the isotropic to nematic phase transition temperature. At higher QD concentrations, it was important to test this transition temperature to ensure adequate solvent removal. After dispersion, the mixtures were moved to an oven heated to 50° C.

To prepare the QD microstructures, clean glass slides and cover slips were coated with an alignment layer to produce the desired LC orientation. For planar alignment (molecules lie parallel to the glass) glass was dip coated with a 1 wt % aqueous PVA solution, dried and rubbed with a velvet cloth to induce an alignment direction. The thickness between glass slide and cover slip was tuned to ~120 µm, using a spacer film. All microscope slides were assembled at 50° C. to maintain the system's isotropic phase above 34.3° C. Cooling rate was carefully controlled in these experiments using a Linkham LTS350 hot stage equipped with an in-house designed liquid nitrogen cooled-air system. We used several different cooling rates; 7° C./min, 15° C./min, 20° C./min, and 30° C./min with this apparatus. In addition, we used a room temperature "quenching" method to achieve a cooling rate of ~200° C./min. This was carried out by removing the microscope slide from the hot stage and placing it on a room temperature lab bench. QD fluorescence and the corresponding LC textures were observed using a Leica DM2500P upright microscope equipped with a Q-image Retiga camera. Experiments were performed at three different QD concentrations in liquid crystal; 0.075 wt %, 0.15 wt %, and 0.3 wt %.

Structural Characterization

Fluorescence microscopy was used to image the spatial distribution of the mesogenic-ligand functionalized QDs in the liquid crystal. In all experiments presented here CdSe/ZnS core shell QDs with an emission wavelength centered at 620 nm were used. Fluorescence imaging was carried out on an upright Leica DM2500P microscope with 20× objective. To quantify the relationship between cooling rate, concentration, and structure size, a large number of shells and foam droplets were imaged, measuring their diameters using lmagej. Samples were mounted on standard glass slides under a cover slip, planar liquid crystal alignment was achieved using a rubbed PVA surface coating, as outlined above.

Figure 2:
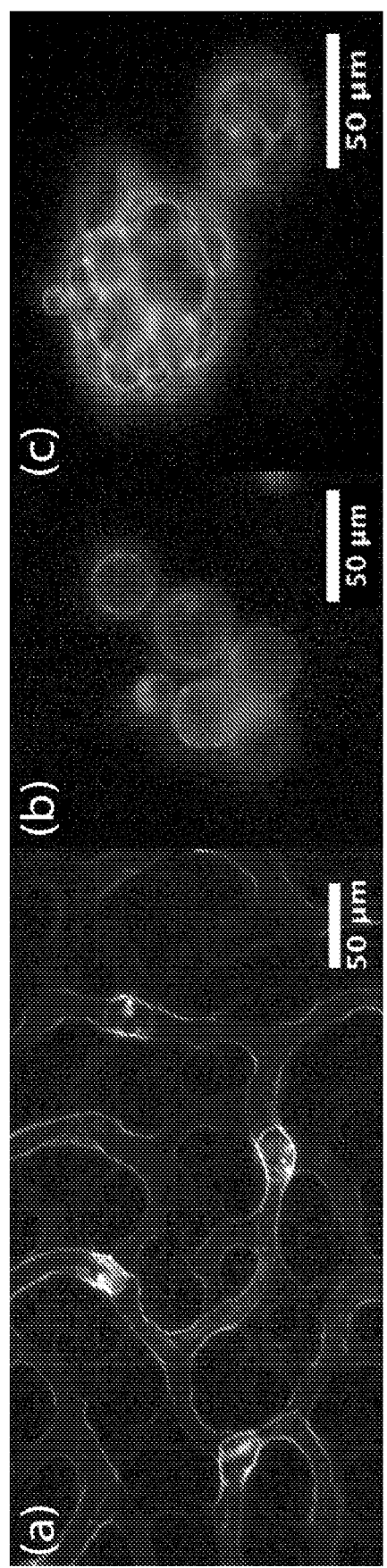
FIG. 2, panel A, shows a fluorescence microscopy image of nanoparticle branching network of tube-like structures formed at a cooling rate of 1° C./min.

FIG. 2 shows representative fluorescence images of the three distinct nanoparticle micro-morphologies observed: branching network of tube-like structures (FIG. 2, panel A); hollow capsules with a thin wall FIG. 2, panel B); and multi-compartment droplets of closed-cell foam (FIG. 2, panel C). The structures were imaged suspended in nematic liquid crystal immediately after formation. In the case of the individual capsules and the foam, liquid crystal was present throughout the structure (inside and outside the enclosed structures, verified by cross-polarized microscopy). These formed structures exhibited stable shapes and were insensitive to thermal fluctuations. The walls were formed from densely packed nanoparticles, providing solid walls.

FIG. 3 demonstrates how macrostructure morphology depends on particle concentration and cooling rate. In FIG. 3, panels A-C and FIG. 3, panels D-F respectively, representative fluorescence images of the hollow shell morphology indicate the dependence of shell size on concentration and cooling rates.

The two graphs in FIG. 3, panels G-H, plot separately the dimensions of the assembled structures as a function of cooling rate and particle concentration. Shell diameters were measured, and an average taken over all shells formed under the same conditions. For each data point shown on the graphs, the total number of measured shells, N, varied from 20-283. In some cases, low numbers were measured because of the particularly large size shells (e.g. >50 µm in diameter at 7° C./min, 0.3 wt %, FIG. 3, panel A).

FIG. 3, panel I, shows the phase diagram for structure morphology as a function of cooling rate and particle concentration. From this diagram two important trends were observed. Firstly, structural morphology was strongly dependent on system cooling rate, and secondly, particle concentration was a factor in morphological size control. At high cooling rates (~200° C./min) predominantly single hollow shells were formed, and at the lowest cooling rates, individual macrostructures did not stabilize, and the network morphology was observed. The intermediate range was, however, the most interesting. Between cooling rates of 7° C./min and 30° C./min, a remarkable new structure was observed: discrete compartmentalized 'droplets' suspended in the nematic host phase, with a closed-cell solid foam morphology.

Figure 4:
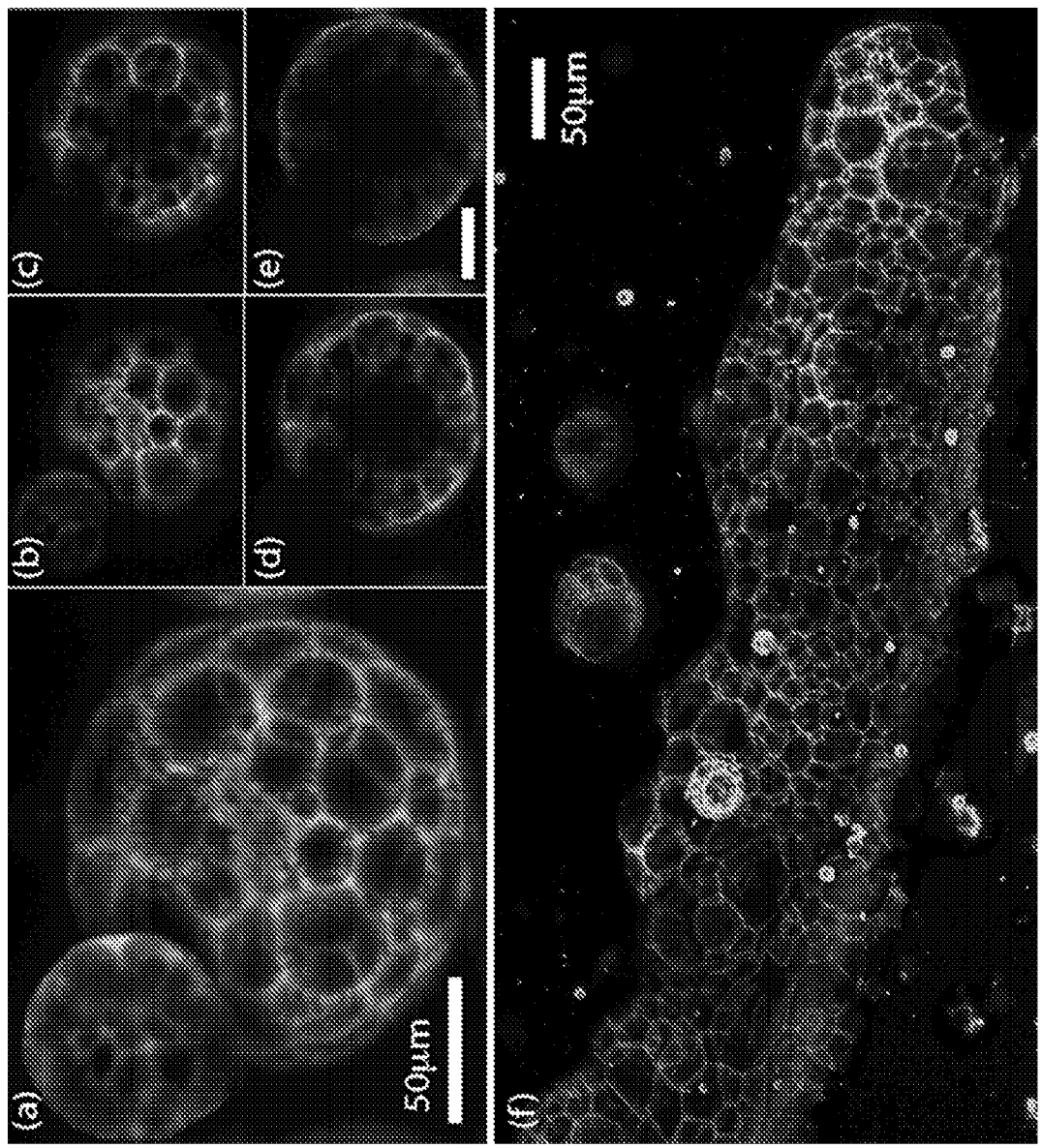
FIG. 4, panels A-E, show confocal microscope z-projection images of a quantum dot foam droplet (z depth=23.13 microns, panel A) with four representative slices (panels B-E) at z intervals of 0.665 microns.

The multi-compartment solid foams were either observed as discrete smaller droplets (FIG. 4, panel A), or as more extended "bulk" foams, particularly near the coverslip edges (FIG. 4, panel F).

Mechanism for Foam Formation

Figure 5:
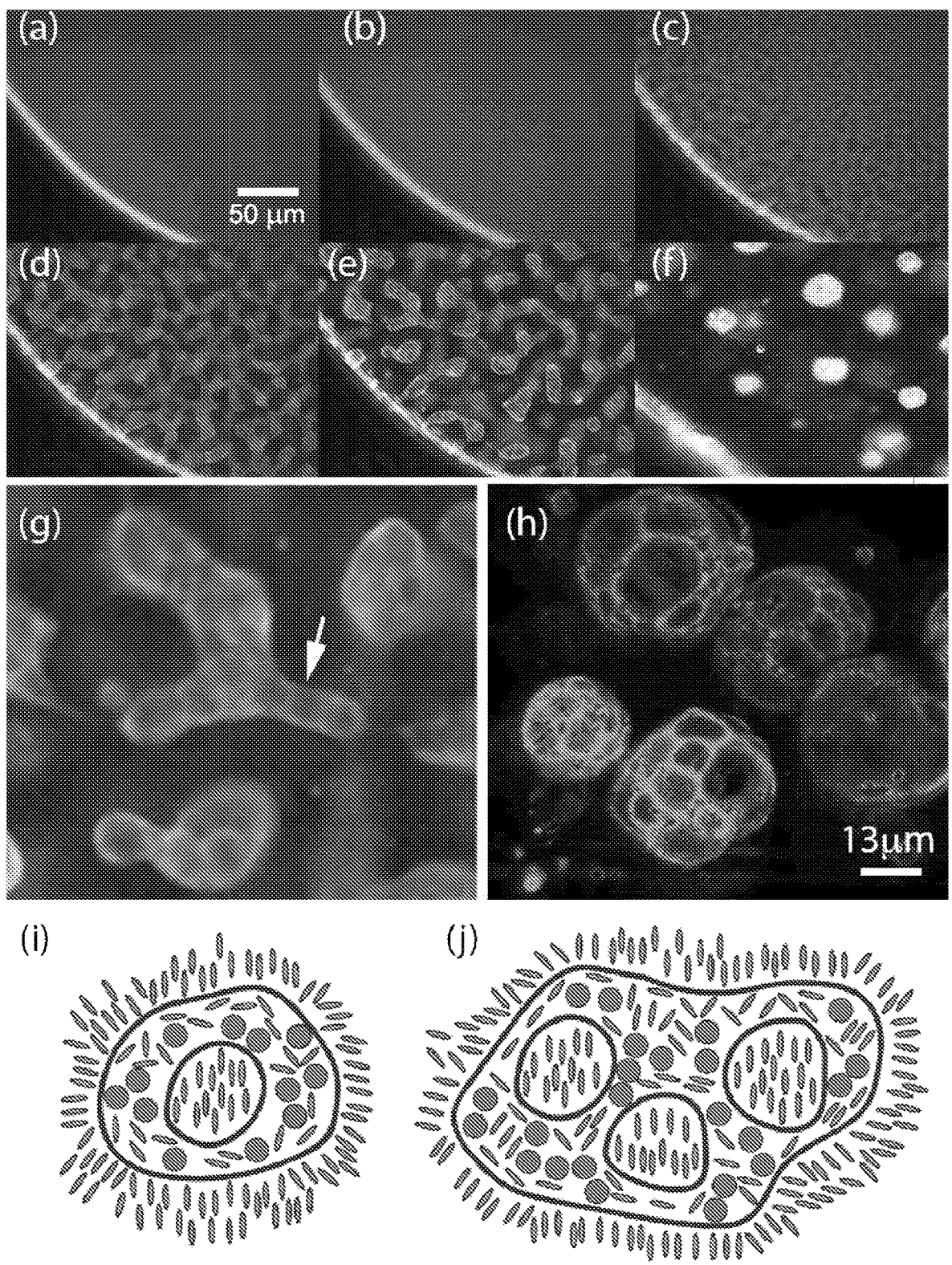
FIG. 5, panels A-F, show a series of snapshots taken from a fluorescence microscopy movie demonstrating the solid cell foam formation process from quantum dots dispersed in liquid crystal.

FIG. 5 presents a time sequence in which foam droplet formation can be clearly seen (FIG. 5 panels A-F and close up, panel G). A confocal fluorescence image of several foam droplets is also shown (FIG. 5, panel H).

During multi-compartment solid foam formation, initially phase transition sorting proceeded similarly to that of the spherical single compartment capsules: QDs were sorted into shrinking isotropic domains. However, in the later stages of the process an important difference was observed. Multiple nematic domains were observed to nucleate separately within the shrinking isotropic domain before it adopted a spherical shape (see FIG. 5, panel J). Arrest then took place as those internal domains grew individually, pushing the particles together at multiple interior interfaces. This process resulted in the formation of multiple thin-walled cells within a larger droplet and hence a solid-walled foam-like morphology (see for example, FIG. 4, panel A).

In the cases where foams were observed, the cooling rate used was lower than for a single compartment capsule (see FIG. 2, panel C). More generally, it was observed that fast cooling rates (e.g. 200° C./min) resulted in single compartment capsule formation and carefully controlled slow cooling rates (e.g. 7° C./min to 30° C./min) resulted in solid multi-compartment foams. Without being bound to any particular theory, a critical factor appears to be the timing of interior domain nucleation with respect to the overall shape evolution and arrest of the solid nanoparticle packed walls. FIG. 5, panel G, reveals interior nematic domains forming inside the shrinking isotropic domain at an earlier time than seen for single compartment capsules. It was hypothesized that single compartment capsules may form when a single domain nucleates (usually close to the final spherical shape, see FIG. 5, panel I), whereas multi-compartment foams may form when multiple domains nucleate and grow from the inside simultaneously as the isotropic domain continues to shrink (see FIG. 5, panels G and J).

In the general assembly process it appears that secondary nematic domains nucleate within the shrinking isotropic domains at a late time, producing isotropic particle rich shells that eventually template the solid structures. This effect may be understood by considering the effect of impurities on the isotropic to nematic phase transition temperature. The nanoparticles used in this experiment were ~6 nm in size, a comparable lengthscale to the length of the host nematic molecules, therefore these nanoparticles can be considered impurities. Impurities have been shown to depress the I-N transition temperature (D. E. Martire, G. A. Oweimreen, G. I. Ågren, S. G. Ryan, and H. T. Peterson, *The Journal of Chemical Physics* 64, 1456 (1976)), and given the high concentration of QDs in the shrinking isotropic domains one may expect those interior particle-rich regions to transition last during a quench. This effect may explain the time lag between QD-rich isotropic domain formation and inner domain nucleation in both the spherical single compartment capsules and the subject foam structures.

As observed herein, late inner domain nucleation was combined with a lower rate of cooling to produce multi-compartment solid foam structures. As a result, the odd shaped foam domain shrinks down a bit to form an amorphous shape. After some time (but not enough for the domain to shrink to a sphere) inner domains nucleate—this happens sooner than in the spherical single compartment capsule case because the concentration inside is not as high as that under fast cooling.

In the subject liquid crystal system, the nucleation of the fluid nematic phase is used to expel nanoparticles. In the subject methods, the sorting process proceeds as a response to the nematic order parameter and its repulsive effect on the dispersed radially symmetric particles.

There is an interfacial tension between the nematic and isotropic phases, and as nematic domains shrink they also minimize their free energy by adopting minimal surface geometries; either spherical single compartment capsules or, in the case of the foam, a network of minimal interfaces (see FIG. 4, panels A-E). These observations indicate that nanoparticles in shrinking domains are in fact in a dispersed fluid state right until the point of arrest, and supports the hypothesis disclosed herein for the formation mechanism.

Although the foregoing embodiments have been described in some detail by way of illustration and example for purposes of clarity of understanding, it is readily apparent to those of ordinary skill in the art in light of the teachings of the present disclosure that certain changes and modifications may be made thereto without departing from the spirit or scope of the appended claims. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. A composite comprising a multi-compartment solid foam comprising:
   mesogenic ligand-functionalized nanoparticles;
   an external wall; and
   a plurality of compartments each comprising an opening in the external wall.

2. The composite of claim 1, wherein the solid foam is a closed-cell foam.

3. The composite of claim 1, wherein the solid foam is an open-cell foam.

4. The composite of claim 1, wherein the solid foam has a dimension of 0.01 μm to 50 μm.

5. The composite of claim 1, wherein the mesogenic ligand-functionalized nanoparticles have an average diameter of 1 nm to 100 nm.

6. The composite of claim 1, wherein the mesogenic ligand-functionalized nanoparticles are composed of a material selected from the group consisting of a semiconductor material, a metal, a metal oxide, a metalloid, a metal coated material, an oxide, a magnetic material, a nanosome, a dielectric material and a polymer, and combinations thereof.

7. The composite of claim 6, wherein the mesogenic ligand-functionalized nanoparticles are composed of cadmium selenide (CdSe), zinc sulfide (ZnS), or combinations thereof.

8. The composite of claim 6, wherein the mesogenic ligand-functionalized nanoparticles are composed of gold nanoparticles.

9. The composite of claim 1, wherein the mesogenic ligand-functionalized nanoparticles further comprise non-mesogenic ligands.

10. The composite of claim 9, wherein the ratio of mesogenic ligands to non-mesogenic ligands on the nanoparticle surface is 9:1.

11. The composite of claim 9, wherein the ratio of mesogenic ligands to non-mesogenic ligands on the nanoparticle surface is 6:4.

12. The composite of claim 1, wherein the mesogenic ligand-functionalized nanoparticles each comprise mesogenic ligands each having a structure of formula (I):

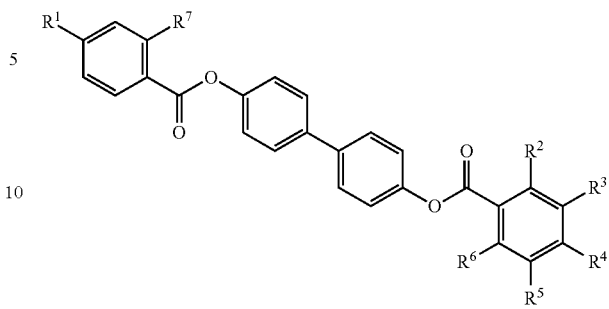

(I)

wherein $R^1$ and $R^7$ are each independently selected from, $C_1$-$C_8$ alkoxy, and $C_1$-$C_8$ alkoxy substituted with an amine or thiol group; and $R^2$, $R^3$, $R^4$, $R^5$ and $R^6$ are each independently selected from the group consisting of H, halogen, hydroxyl, azido, alkyl, substituted alkyl, alkenyl, substituted alkenyl, alkynyl, substituted alkynyl, $C_1$-$C_{12}$ alkoxy, substituted alkoxy, amino, substituted amino, cycloalkyl, substituted cycloalkyl, heterocycloalkyl, substituted heterocycloalkyl, aryl, substituted aryl, heteroaryl and substituted heteroaryl and combinations thereof.

13. The composite of claim 12, wherein each mesogenic ligand is selected from the group consisting of:

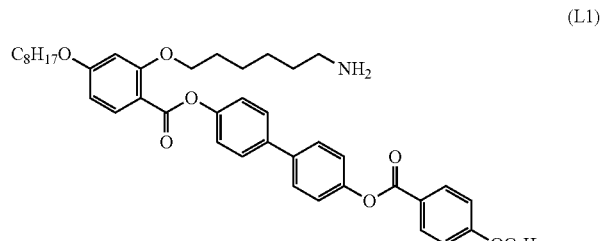

(L1)

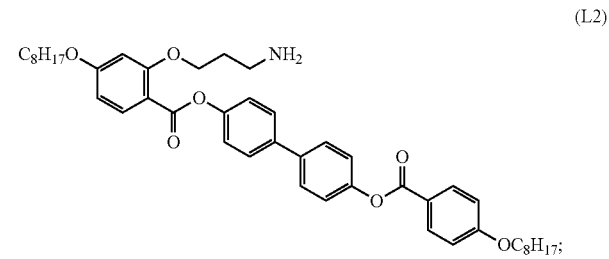

(L2)

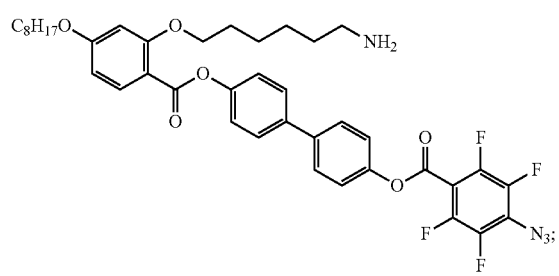

(L3)

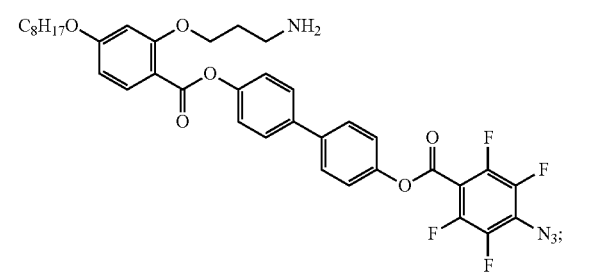

(L4)

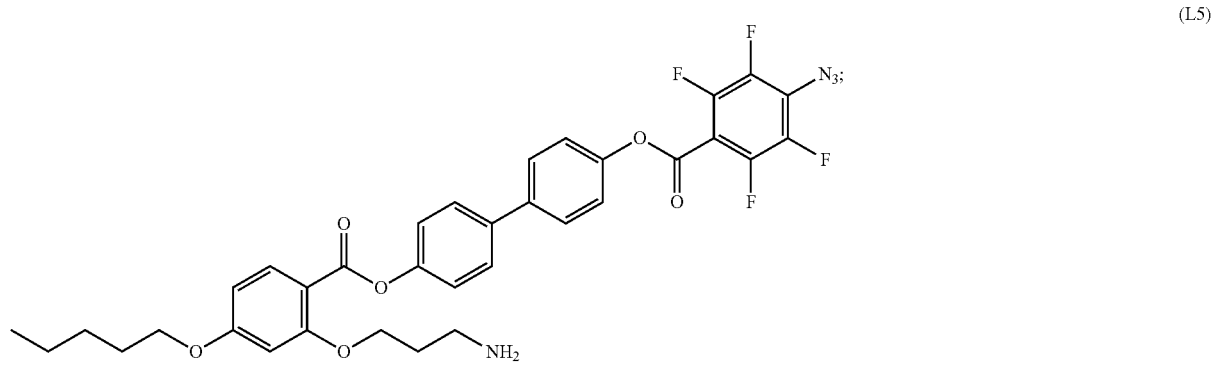

(L5)

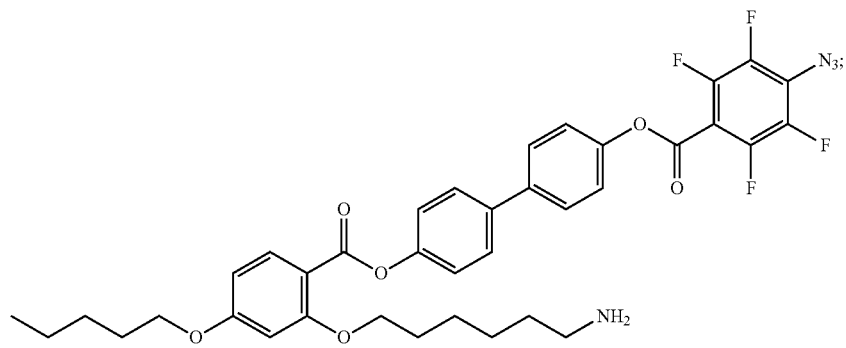
(L6)
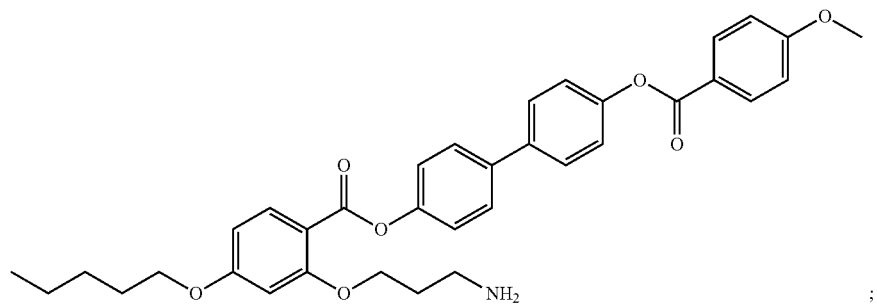
(L7)
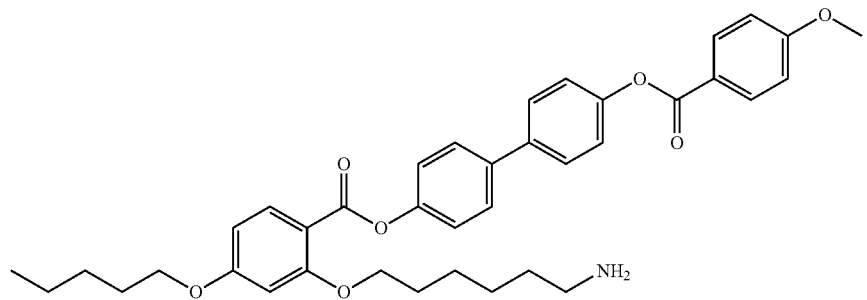
(L8)
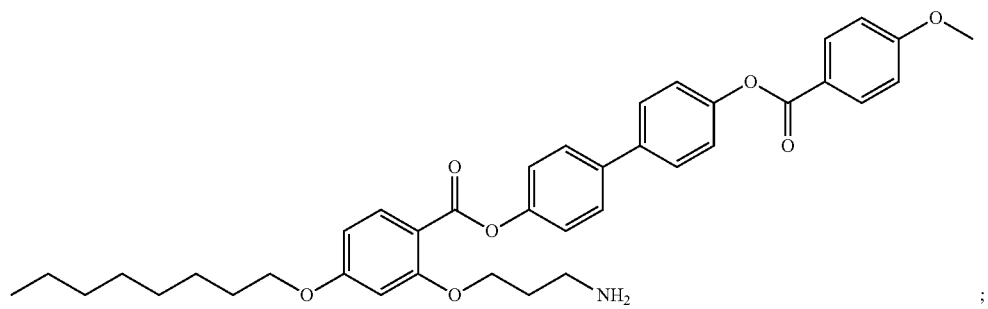
(L9)
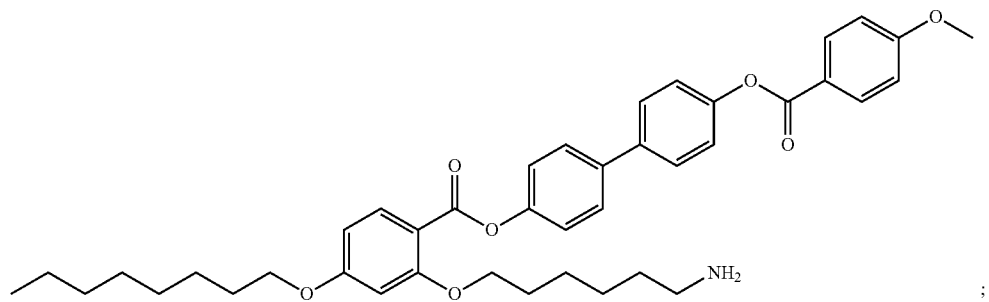
(L10)

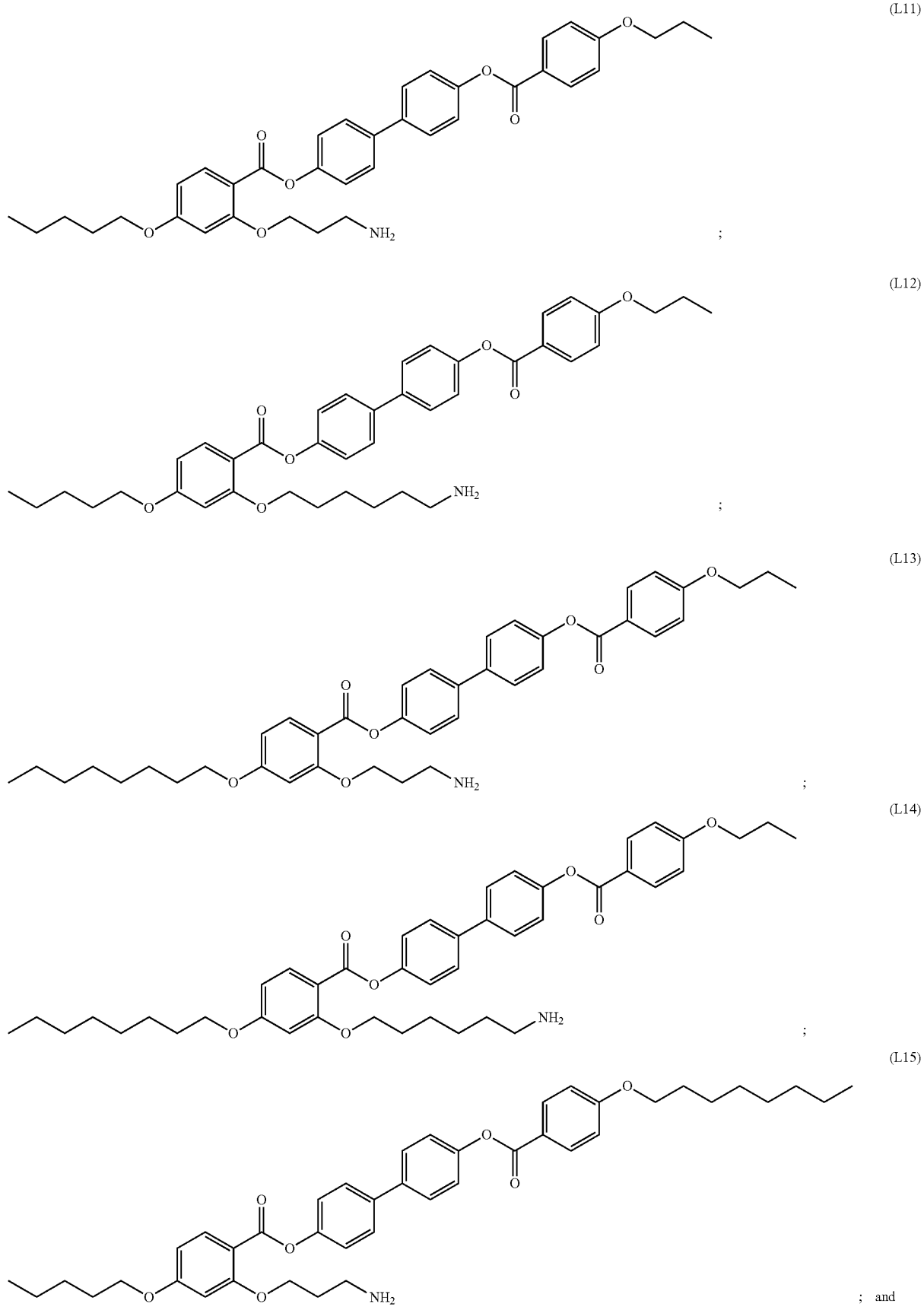

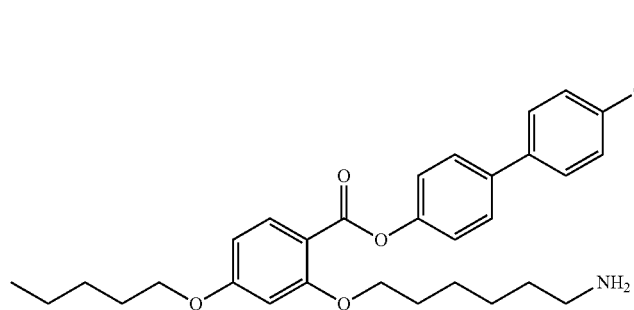
(L16)

14. The composite of claim 1, wherein the mesogenic ligand-functionalized nanoparticles each comprise mesogenic ligands each having a structure of formula (II):

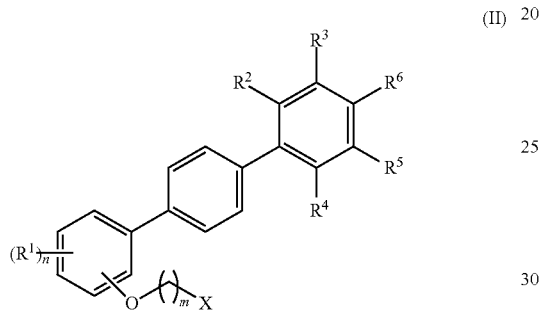
(II)

wherein:

$R^1$ are each independently selected H, halogen, hydroxyl, azido, alkyl, substituted alkyl, alkenyl, substituted alkenyl, alkynyl, substituted alkynyl, alkoxy, substituted alkoxy, amino, and substituted amino;

$R^2$, $R^3$, $R^4$, $R^5$ and $R^6$ are each independently selected from the group consisting of H, halogen, hydroxyl, azido, alkyl, substituted alkyl, alkenyl, substituted alkenyl, alkynyl, substituted alkynyl, alkoxy, substituted alkoxy, amino, substituted amino, cycloalkyl, substituted cycloalkyl, heterocycloalkyl, substituted heterocycloalkyl, aryl, substituted aryl, heteroaryl, substituted heteroaryl, phosphate, substituted phosphate, phosphoryl, substituted phosphoryl, thiol and substituted thiol and combinations thereof;

X is an amine or a thiol group;

n is an integer from 1 to 4; and m is an integer from 1 to 14.

15. The composite of claim 14, wherein each mesogenic ligand is selected from the group consisting of:

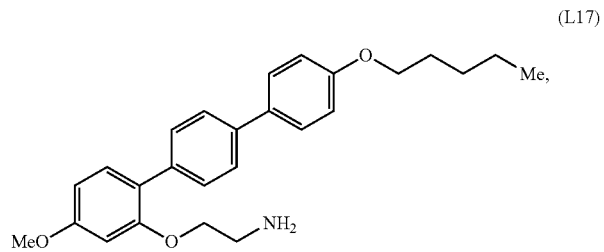
(L17)

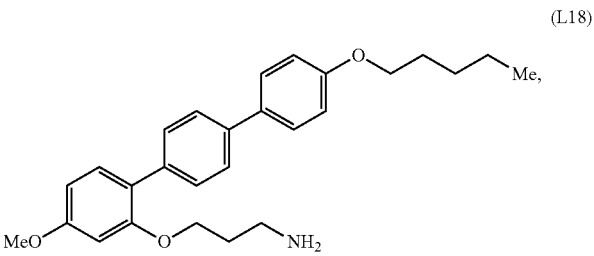
(L18)

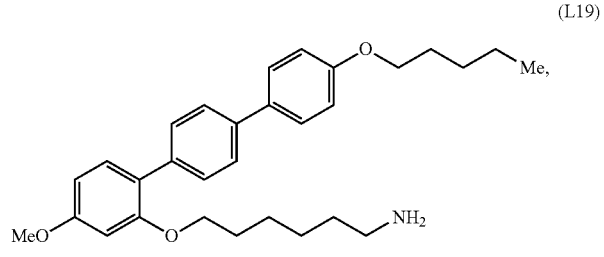
(L19)

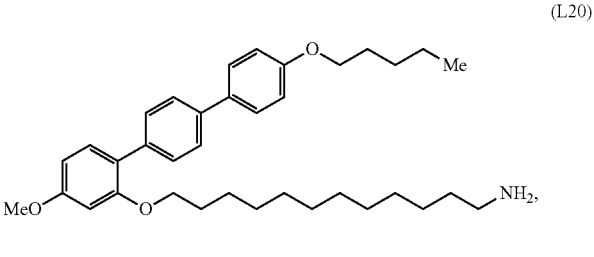
(L20)

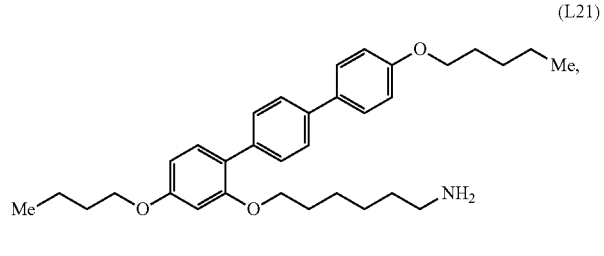
(L21)

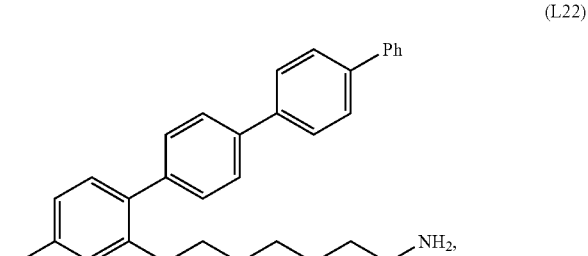
(L22)

-continued

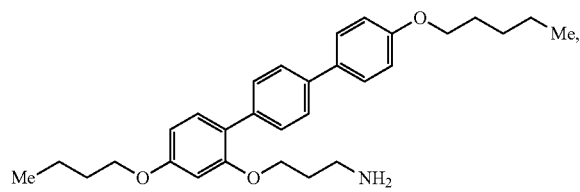
(L23)

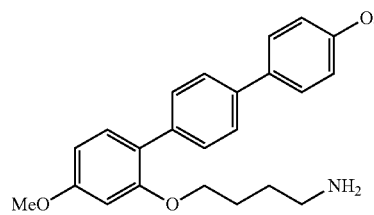
(L24)

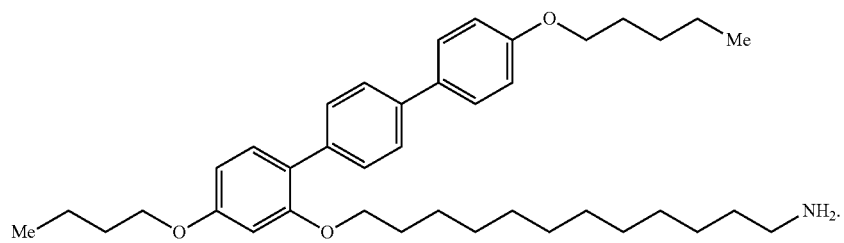
(L25)

16. The composite of claim 14, wherein each mesogenic ligand is of the structure:

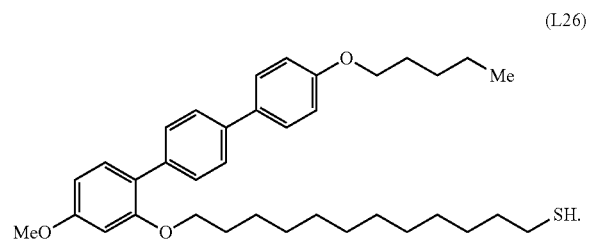 [SMILES: CCCCCOc1ccc(-c2ccc(-c3ccc(OC)cc3OCCCCCCCCCCCCS)cc2)cc1]
(L26)

17. A composition comprising:
a composite according to claim 1; and
a liquid crystalline liquid.

18. The composition of claim 17, wherein the concentration of mesogenic ligand-functionalized nanoparticles in the liquid crystalline liquid is from 0.075 wt % to 0.3 wt %.

19. The composition of claim 17, wherein the solid foam has a droplet configuration suspended in the liquid crystalline liquid.

20. The composition of claim 19, wherein the droplet has a spherical surface.

21. The composition of claim 20, wherein the spherical surface has an average diameter of 1 μm to 50 μm.

22. The composition of claim 20, wherein the spherical surface has an average diameter of 50 μm or greater.

23. A method of producing a multi-compartment solid foam,
wherein the multi-compartment solid foam comprises:
mesogenic ligand-functionalized nanoparticles;
an external wall; and
a plurality of compartments each comprising an opening in the external wall,
wherein the method comprises:
dispersing mesogenic ligand-functionalized nanoparticles in a liquid crystalline liquid;
inducing a phase transition from an isotropic phase to a nematic phase; and
cooling the dispersion at a rate configured to produce the multi-compartment solid foam.

24. The method of claim 23, wherein the mesogenic ligand-functionalized nanoparticles each comprise mesogenic ligands each having a structure of formula (I):

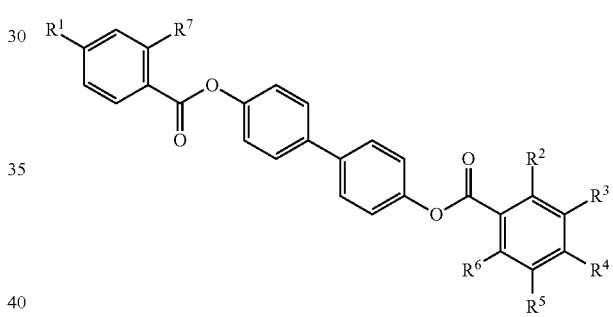
(I)

wherein
$R^1$ and $R^7$ are each independently selected from, $C_1$-$C_8$ alkoxy, and $C_1$-$C_8$ alkoxy substituted with an amine or thiol group; and
$R^2$, $R^3$, $R^4$, $R^5$ and $R^6$ are each independently selected from the group consisting of H, halogen, hydroxyl, azido, alkyl, substituted alkyl, alkenyl, substituted alkenyl, alkynyl, substituted alkynyl, $C_1$-$C_{12}$ alkoxy, substituted alkoxy, amino, substituted amino, cycloalkyl, substituted cycloalkyl, heterocycloalkyl, substituted heterocycloalkyl, aryl, substituted aryl, heteroaryl and substituted heteroaryl and combinations thereof.

25. The method of claim 23, wherein multiple nematic domains nucleate within the shrinking isotropic phase during the phase transition from the isotropic phase to the nematic phase.

26. The method of claim 23, wherein the cooling rate is from 7° C./min to 30° C./min.

27. The method of claim 26, wherein the cooling rate is 7° C./min.

28. The method of claim 26, wherein the cooling rate is 15° C./min.

29. The method of claim 26, wherein the cooling rate is 20° C./min.

30. The method of claim 26, wherein the cooling rate is 30° C./min.

31. The method of claim 23, wherein the concentration of mesogenic ligand-functionalized nanoparticles in the liquid crystalline liquid is from 0.075 wt % to 0.3 wt %.

32. The method of claim 31, wherein the concentration of mesogenic ligand-functionalized nanoparticles in the liquid crystalline liquid is 0.075 wt %.

33. The method of claim 31, wherein the concentration of mesogenic ligand-functionalized nanoparticles in the liquid crystalline liquid is 0.15 wt %.

34. The method of claim 31, wherein the concentration of mesogenic ligand-functionalized nanoparticles in the liquid crystalline liquid is 0.3 wt %.

35. The method of claim 23, wherein the dispersing comprises applying sound energy to the mesogenic ligand-functionalized nanoparticles in the liquid crystalline liquid.

36. The method of claim 23, wherein the mesogenic ligand-functionalized nanoparticles are dispersed in a solvent before adding to the liquid crystalline liquid.

37. The method of claim 36, wherein the solvent is selected from the group consisting of toluene, dimethylbenzene, methylisopropylbenzene, chloroform and mixtures thereof.

38. A composition comprising a multi-compartment solid foam comprising mesogenic ligand functionalized nanoparticles, produced by the method of claim 23.

39. A photonic material comprising a composite according to claim 1.

* * * * *